(12) United States Patent
Fleizach et al.

(10) Patent No.: US 11,470,225 B2
(45) Date of Patent: *Oct. 11, 2022

(54) TOUCH ACCOMMODATION OPTIONS

(71) Applicant: Apple Inc., Cupertino, CA (US)

(72) Inventors: Christopher Fleizach, Gilroy, CA (US); Clare Kasemset, Tokyo (JP); Nandini Kannamangalam Sundara Raman, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,997

(22) Filed: Apr. 7, 2021

(65) Prior Publication Data

US 2021/0227099 A1 Jul. 22, 2021

Related U.S. Application Data

(60) Continuation of application No. 16/534,291, filed on Aug. 7, 2019, now Pat. No. 10,986,252, which is a division of application No. 15/924,769, filed on Mar. 19, 2018, now abandoned, which is a continuation of application No. 14/863,195, filed on Sep. 23, 2015, now Pat. No. 9,961,239.

(Continued)

(51) Int. Cl.
*G06F 3/01* (2006.01)
*H04N 3/14* (2006.01)
*G06F 3/0486* (2013.01)
*G06F 3/04883* (2022.01)

(52) U.S. Cl.
CPC ........... *H04N 3/155* (2013.01); *G06F 3/0486* (2013.01); *G06F 3/04883* (2013.01)

(58) Field of Classification Search
CPC ..................................................... G06F 3/048
See application file for complete search history.

(56) References Cited

U.S. PATENT DOCUMENTS

| 4,763,356 A | 8/1988 | Day et al. |
| 5,412,189 A | 5/1995 | Cragun |

(Continued)

FOREIGN PATENT DOCUMENTS

| CA | 2651409 A | 8/2009 |
| CN | 1873602 A | 12/2006 |

(Continued)

OTHER PUBLICATIONS

Applicant Initiated Interview Summary received for U.S. Appl. No. 16/939,922, dated Nov. 23, 2021, 3 pages.

(Continued)

*Primary Examiner* — Joseph R Haley
(74) *Attorney, Agent, or Firm* — Dentons US LLP

(57) ABSTRACT

The present disclosure generally relates to methods and devices for providing touch accommodations to users with tremors or other fine motor impairments to improve the accuracy of such users' touch inputs on touch-sensitive surfaces. Such methods and devices include various approaches for compensating for brief, inadvertent touch inputs; touch inputs with inadvertent motion across the touch-sensitive surface; and/or touch inputs with inadvertent recoil contacts. In some embodiments, the touch accommodations are implemented in a software layer separate from the application layer, such as the operating system.

54 Claims, 27 Drawing Sheets

Related U.S. Application Data

(60) Provisional application No. 62/172,123, filed on Jun. 7, 2015.

(56) References Cited

U.S. PATENT DOCUMENTS

| | | |
|---|---|---|
| 5,543,588 A | 8/1996 | Bisset et al. |
| 5,729,219 A | 3/1998 | Armstrong et al. |
| 5,734,853 A | 3/1998 | Hendricks et al. |
| 5,805,157 A | 9/1998 | Bertram et al. |
| 5,805,159 A | 9/1998 | Bertram et al. |
| 5,812,131 A | 9/1998 | Bertram |
| 5,825,352 A | 10/1998 | Bisset et al. |
| 5,831,664 A | 11/1998 | Wharton et al. |
| 5,870,083 A | 2/1999 | Shieh et al. |
| 5,933,134 A | 8/1999 | Shieh |
| 5,956,025 A | 9/1999 | Goulden et al. |
| 6,002,395 A | 12/1999 | Wagner et al. |
| 6,160,553 A | 12/2000 | Robertson et al. |
| 6,259,436 B1 | 7/2001 | Moon et al. |
| 6,335,725 B1 | 1/2002 | Koh et al. |
| 6,489,951 B1 | 12/2002 | Wong et al. |
| 6,560,612 B1 | 5/2003 | Yamada et al. |
| 6,757,001 B2 | 6/2004 | Allport et al. |
| 6,882,299 B1 | 4/2005 | Allport et al. |
| 7,158,123 B2 | 1/2007 | Myers et al. |
| 7,178,109 B2 | 2/2007 | Hewson et al. |
| 7,296,241 B2 | 11/2007 | Oshiro et al. |
| 7,307,509 B2 | 12/2007 | Chriss et al. |
| 7,383,515 B2 | 6/2008 | Bardon et al. |
| 7,453,442 B1 | 11/2008 | Poynter et al. |
| 7,483,880 B2 | 1/2009 | Rossi et al. |
| 7,673,241 B2 | 3/2010 | Sun et al. |
| 7,703,041 B2 | 4/2010 | Ito et al. |
| 7,730,401 B2 | 6/2010 | Gillespie et al. |
| 7,747,964 B2 | 6/2010 | Morikawa et al. |
| 7,880,728 B2 | 2/2011 | De Los Reyes et al. |
| 7,900,156 B2 | 3/2011 | Andre et al. |
| 8,004,398 B2 | 8/2011 | Chriss et al. |
| 8,079,039 B2 | 12/2011 | Lavoie et al. |
| 8,108,793 B2 | 1/2012 | Nguyen et al. |
| 8,386,965 B2 | 2/2013 | Fleizach et al. |
| 9,116,611 B2 | 8/2015 | Seymour et al. |
| 9,430,128 B2 | 8/2016 | Hayes |
| 9,961,239 B2 | 5/2018 | Fleizach et al. |
| 2002/0057263 A1 | 5/2002 | Keely et al. |
| 2004/0066422 A1 | 4/2004 | Chandane |
| 2005/0024322 A1 | 2/2005 | Kupka |
| 2005/0134578 A1 | 6/2005 | Chambers et al. |
| 2005/0216826 A1 | 9/2005 | Black et al. |
| 2005/0219210 A1 | 10/2005 | Leland et al. |
| 2005/0235206 A1 | 10/2005 | Arend et al. |
| 2005/0235208 A1 | 10/2005 | Arend et al. |
| 2005/0235223 A1 | 10/2005 | Arend et al. |
| 2005/0246665 A1 | 11/2005 | Luke et al. |
| 2005/0278647 A1 | 12/2005 | Leavitt et al. |
| 2006/0007182 A1 | 1/2006 | Sato et al. |
| 2006/0069694 A1 | 3/2006 | Rossi et al. |
| 2006/0105301 A1 | 5/2006 | Chriss et al. |
| 2006/0114224 A1 | 6/2006 | Ninomiya |
| 2006/0123359 A1 | 6/2006 | Schatzberger et al. |
| 2006/0271870 A1 | 11/2006 | Anwar |
| 2006/0294472 A1 | 12/2006 | Cheng et al. |
| 2007/0130538 A1 | 6/2007 | Chiu et al. |
| 2007/0146337 A1 | 6/2007 | Ording et al. |
| 2007/0157094 A1 | 7/2007 | Lemay et al. |
| 2007/0236474 A1 | 10/2007 | Ramstein et al. |
| 2008/0016467 A1 | 1/2008 | Chambers et al. |
| 2008/0016468 A1 | 1/2008 | Chambers et al. |
| 2008/0036743 A1 | 2/2008 | Westerman et al. |
| 2008/0134017 A1 | 6/2008 | Inoguchi et al. |
| 2008/0148181 A1 | 6/2008 | Reyes et al. |
| 2008/0163130 A1 | 7/2008 | Westerman |
| 2008/0165133 A1 | 7/2008 | Blumenberg et al. |
| 2008/0165151 A1 | 7/2008 | Lemay et al. |
| 2008/0192021 A1 | 8/2008 | Lim et al. |
| 2008/0222622 A1 | 9/2008 | Lavoie et al. |
| 2008/0225153 A1 | 9/2008 | Fagans |
| 2008/0229248 A1 | 9/2008 | Fagans et al. |
| 2009/0002335 A1 | 1/2009 | Chaudhri |
| 2009/0005032 A1 | 1/2009 | Lunati et al. |
| 2009/0027334 A1 | 1/2009 | Foulk et al. |
| 2009/0064055 A1 | 3/2009 | Chaudhri et al. |
| 2009/0070710 A1 | 3/2009 | Kagaya et al. |
| 2009/0093242 A1 | 4/2009 | Bhalekar et al. |
| 2009/0100383 A1 | 4/2009 | Sunday et al. |
| 2009/0167700 A1 | 7/2009 | Westerman et al. |
| 2009/0178008 A1 | 7/2009 | Herz et al. |
| 2009/0178011 A1 | 7/2009 | Ording et al. |
| 2009/0213083 A1 | 8/2009 | Dicker et al. |
| 2009/0225042 A1 | 9/2009 | Andrews et al. |
| 2009/0228792 A1 | 9/2009 | Van Os et al. |
| 2009/0228807 A1 | 9/2009 | Lemay |
| 2009/0244019 A1 | 10/2009 | Choi et al. |
| 2009/0256780 A1 | 10/2009 | Small et al. |
| 2009/0289913 A1 | 11/2009 | Chang et al. |
| 2010/0028410 A1 | 2/2010 | Haynie et al. |
| 2010/0041382 A1 | 2/2010 | Van Os et al. |
| 2010/0060586 A1 | 3/2010 | Pisula et al. |
| 2010/0085316 A1 | 4/2010 | Kim et al. |
| 2010/0088654 A1 | 4/2010 | Henhoeffer et al. |
| 2010/0095234 A1 | 4/2010 | Lane et al. |
| 2010/0149090 A1 | 6/2010 | Morris et al. |
| 2010/0149114 A1 | 6/2010 | Li |
| 2010/0185989 A1 | 7/2010 | Shiplacoff et al. |
| 2010/0192102 A1 | 7/2010 | Chmielewski et al. |
| 2010/0214218 A1 | 8/2010 | Vaisanen et al. |
| 2010/0231533 A1 | 9/2010 | Chaudhri |
| 2010/0248787 A1 | 9/2010 | Smuga et al. |
| 2010/0281410 A1 | 11/2010 | Heintze |
| 2010/0299635 A1 | 11/2010 | Oh et al. |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2011/0004853 A1 | 1/2011 | Chang |
| 2011/0007008 A1 | 1/2011 | Algreatly et al. |
| 2011/0018806 A1 | 1/2011 | Yano |
| 2011/0022607 A1 | 1/2011 | Fritzley et al. |
| 2011/0041102 A1 | 2/2011 | Kim |
| 2011/0061056 A1 | 3/2011 | Shu |
| 2011/0078622 A1 | 3/2011 | Missig et al. |
| 2011/0096087 A1 | 4/2011 | Chun |
| 2011/0102464 A1 | 5/2011 | Godavari |
| 2011/0107209 A1 | 5/2011 | Ha et al. |
| 2011/0113364 A1 | 5/2011 | Neil et al. |
| 2011/0117526 A1 | 5/2011 | Wigdor et al. |
| 2011/0119639 A1 | 5/2011 | Tartz |
| 2011/0131515 A1 | 6/2011 | Ono et al. |
| 2011/0145753 A1 | 6/2011 | Prakash et al. |
| 2011/0191666 A1 | 8/2011 | Decker et al. |
| 2011/0231875 A1 | 9/2011 | Lee |
| 2011/0248928 A1 | 10/2011 | Michaelraj |
| 2011/0273380 A1 | 11/2011 | Martin |
| 2011/0300910 A1 | 12/2011 | Choi |
| 2011/0304584 A1 | 12/2011 | Hwang et al. |
| 2012/0069231 A1 | 3/2012 | Chao |
| 2012/0173976 A1 | 7/2012 | Herz et al. |
| 2012/0216150 A1 | 8/2012 | Wernecke |
| 2012/0262489 A1 | 10/2012 | Caliendo et al. |
| 2012/0306748 A1 | 12/2012 | Fleizach et al. |
| 2013/0002576 A1 | 1/2013 | Kim et al. |
| 2013/0019172 A1 | 1/2013 | Kotler et al. |
| 2013/0019182 A1 | 1/2013 | Gil et al. |
| 2013/0166146 A1 | 6/2013 | Tanaka |
| 2013/0204406 A1 | 8/2013 | Andersson et al. |
| 2014/0325407 A1 | 10/2014 | Morris et al. |
| 2014/0380243 A1 | 12/2014 | Furue et al. |
| 2015/0022482 A1 | 1/2015 | Hewitt et al. |
| 2015/0045000 A1 | 2/2015 | Kim et al. |
| 2015/0193585 A1 | 7/2015 | Sunna |
| 2015/0220218 A1 | 8/2015 | Jeon et al. |
| 2015/0363102 A1 | 12/2015 | Seymour et al. |
| 2016/0034093 A1 | 2/2016 | Xie et al. |
| 2016/0188202 A1 | 6/2016 | Seymour et al. |
| 2016/0200195 A1 | 7/2016 | Jun |

(56) References Cited

U.S. PATENT DOCUMENTS

| | | |
|---|---|---|
| 2016/0357281 A1 | 12/2016 | Kasemset et al. |
| 2018/0213126 A1 | 7/2018 | Fleizach et al. |
| 2019/0073121 A1 | 3/2019 | Fleizach et al. |
| 2019/0364173 A1 | 11/2019 | Fleizach et al. |
| 2020/0356256 A1 | 11/2020 | Fleizach et al. |
| 2021/0034233 A1 | 2/2021 | Seymour et al. |

FOREIGN PATENT DOCUMENTS

| | | | |
|---|---|---|---|
| CN | 101520702 A | | 9/2009 |
| CN | 101893984 A | | 11/2010 |
| CN | 102023795 A | | 4/2011 |
| DE | 102009010744 A1 | | 9/2009 |
| EP | 2096524 A2 | | 9/2009 |
| EP | 2175350 A1 | | 4/2010 |
| GB | 2457802 A | | 9/2009 |
| JP | 6-83524 A | | 3/1994 |
| JP | 10-63427 A | | 3/1998 |
| JP | 2002-251637 A | | 9/2002 |
| JP | 2006-24039 A | | 1/2006 |
| JP | 2006-155205 A | | 6/2006 |
| JP | 2006-155313 A | | 6/2006 |
| JP | 2007-286593 A | | 11/2007 |
| JP | 2009-525538 A | | 7/2009 |
| JP | 2009-205685 A | | 9/2009 |
| JP | 2010-97353 A | | 4/2010 |
| JP | 2010-517197 A | | 5/2010 |
| JP | 2011-34451 A | | 2/2011 |
| JP | 2011-257992 A | | 12/2011 |
| JP | 2013-41333 A | | 2/2013 |
| JP | 2013-510370 A | | 3/2013 |
| KR | 10-2011-0016107 A | | 2/2011 |
| KR | 10-2011-0016108 A | | 2/2011 |
| WO | 2007/014064 A2 | | 2/2007 |
| WO | 2007/089766 A2 | | 8/2007 |
| WO | 2008/094791 A2 | | 8/2008 |
| WO | 2009/108584 A2 | | 9/2009 |
| WO | 2010/050477 A1 | | 5/2010 |
| WO | 2010/050693 A2 | | 5/2010 |
| WO | 2010/080498 A1 | | 7/2010 |
| WO | 2010/120878 A2 | | 10/2010 |
| WO | 2011/056387 A1 | | 5/2011 |
| WO | 2012/170426 A2 | | 12/2012 |

OTHER PUBLICATIONS

Applicant-Initiated Interview Summary received for U.S. Appl. No. 17/074,396, dated Dec. 17, 2021, 2 pages.
Office Action received for Australian Patent Application No. 2020230308, dated Sep. 8, 2021, 3 pages.
Office Action received for Chinese Patent Application No. 201810008374.6, dated Jun. 25, 2021, 26 pages (4 pages of English Translation and 22 pages of Official Copy).
Notice of Allowance received for Japanese Patent Application No. 2020-131850, dated Mar. 1, 2021, 4 pages (1 page of English Translation and 3 pages of Official Copy).
Office Action received for Chinese Patent Application No. 201810008374.6, dated Mar. 24, 2021, 35 pages (8 pages of English Translation and 27 pages of Official Copy).
Non-Final Office Action received for U.S. Appl. No. 16/939,922, dated Aug. 31, 2021, 21 pages.
Notice of Acceptance received for Australian Patent Application No. 2020230308, dated Jan. 4, 2022, 3 pages.
Advisory Action received for U.S. Appl. No. 14/833,439, dated Jan. 11, 2019, 3 pages.
Applicant-Initiated Interview Summary received for U.S. Appl. No. 14/833,439, dated May 27, 2020, 3 pages.
Applicant-Initiated Interview Summary received for U.S. Appl. No. 14/833,439, dated Oct. 21, 2019, 3 pages.
Applicant-Initiated Interview Summary received for U.S. Appl. No. 16/179,545, dated Feb. 4, 2020, 4 pages.
Applicant-Initiated Interview Summary received for U.S. Appl. No. 16/534,291, dated Oct. 14, 2020, 5 pages.
Brief Communication regarding Oral Proceedings received for European Patent Application No. 11704865.2, mailed on Jan. 10, 2020, 12 pages.
Corrected Notice of Allowance received for U.S. Appl. No. 15/061,651, dated Aug. 27, 2018, 2 pages.
Decision to Grant received for European Patent Application No. 12727533.7, dated Jul. 30, 2020, 2 pages.
Decision to Refuse received for European Patent Application No. 11704865.2, dated Feb. 12, 2020, 13 pages.
Final Office Action received for U.S. Appl. No. 13/217,654, dated Mar. 27, 2014, 21 pages.
Final Office Action received for U.S. Appl. No. 14/833,439, dated Feb. 21, 2020, 14 pages.
Final Office Action received for U.S. Appl. No. 14/833,439, dated Oct. 2, 2018, 10 pages.
Final Office Action received for U.S. Appl. No. 15/924,769, dated Apr. 24, 2019, 4 pages.
Intention to Grant received for European Patent Application No. 12727533.7, dated Mar. 18, 2020, 8 pages.
International Preliminary Report on Patentability received for PCT Patent Application No. PCT/US2011/21010, dated Jul. 26, 2012, 18 pages.
International Preliminary Report on Patentability received for PCT Patent Application No. PCT/US2012/040920, dated Dec. 27, 2013, 22 pages.
International Search Report and Written Opinion received for PCT Patent Application No. PCT/US2011/21010, dated Aug. 19, 2011, 20 pages.
International Search Report and Written Opinion received for PCT Patent Application No. PCT/US2012/040920, dated Feb. 12, 2013, 27 pages.
Minutes of the Oral Proceedings received for European Patent Application No. 11704865.2, mailed on Feb. 11, 2020, 3 pages.
Non-Final Office Action received for U.S. Appl. No. 12/688,558, dated Jun. 8, 2012, 20 pages.
Non-Final Office Action received for U.S. Appl. No. 13/217,654 dated Sep. 25, 2015, 31 pages.
Non-Final Office Action received for U.S. Appl. No. 13/217,654, dated Jan. 16, 2015, 21 pages.
Non-Final Office Action received for U.S. Appl. No. 13/217,654, dated Sep. 9, 2013, 46 pages.
Non-Final Office Action received for U.S. Appl. No. 13/436,340, dated Nov. 6, 2014, 16 pages.
Non-Final Office Action received for U.S. Appl. No. 14/833,439, dated Aug. 8, 2019, 10 pages.
Non-Final Office Action received for U.S. Appl. No. 14/833,439, dated Jan. 25, 2019, 9 pages.
Non-Final Office Action received for U.S. Appl. No. 14/833,439, dated Mar. 8, 2018, 8 pages.
Non-Final Office Action received for U.S. Appl. No. 14/863,195, dated May 4, 2017, 9 pages.
Non-Final Office Action received for U.S. Appl. No. 15/061,651, dated Feb. 9, 2018, 12 pages.
Non-Final Office Action received for U.S. Appl. No. 15/924,769, dated Jan. 24, 2019, 6 pages.
Non-Final Office Action received for U.S. Appl. No. 16/179,545, dated Nov. 18, 2019, 12 pages.
Non-Final Office Action received for U.S. Appl. No. 16/534,291, dated May 15, 2020, 9 pages.
Notice of Acceptance received for Australian Patent Application No. 2012268384, dated Feb. 8, 2016, 2 pages.
Notice of Acceptance received for Australian Patent Application No. 2013257534, dated Jan. 5, 2016, 2 pages.
Notice of Acceptance received for Australian Patent Application No. 2016203253, dated May 2, 2018, 3 pages.
Notice of Acceptance received for Australian Patent Application No. 2018217331, dated Jun. 2, 2020, 3 pages.
Notice of Allowance Action received for U.S. Appl. No. 14/863,195, dated Jan. 2, 2018, 7 pages.
Notice of Allowance received for Chinese Patent Application No. 201280027757.9, dated Oct. 25, 2017, 2 pages.

(56) References Cited

OTHER PUBLICATIONS

Notice of Allowance received for Chinese Patent Application No. 201710576007.1, dated Apr. 13, 2020, 2 pages.
Notice of Allowance received for Japanese Patent Application No. 2014-513803, dated Jan. 5, 2016, 3 pages.
Notice of Allowance received for Japanese Patent Application No. 2016-020183, dated Jul. 7, 2017, 3 pages.
Notice of Allowance received for Japanese Patent Application No. 2017-152690, dated Oct. 26, 2020, 4 pages.
Notice of Allowance received for Korean Patent Application No. 10-2012-7021301, dated Jul. 28, 2014, 2 pages.
Notice of Allowance received for Korean Patent Application No. 10-2013-7034793, dated Nov. 30, 2015, 3 pages.
Notice of Allowance received for Korean Patent Application No. 10-2015-7016587, dated May 18, 2018, 3 pages.
Notice of Allowance received for Korean Patent Application No. 10-2016-7027346, dated Dec. 22, 2017, 3 pages.
Notice of Allowance received for U.S. Appl. No. 12/688,558, dated Dec. 28, 2012, 5 pages.
Notice of Allowance received for U.S. Appl. No. 13/217,654, dated Aug. 12, 2016, 5 pages.
Notice of Allowance received for U.S. Appl. No. 13/436,340, dated Apr. 20, 2015, 5 pages.
Notice of Allowance received for U.S. Appl. No. 14/833,439, dated Jun. 24, 2020, 5 pages.
Notice of Allowance received for U.S. Appl. No. 15/061,651, dated Jul. 2, 2018, 6 pages.
Notice of Allowance received for U.S. Appl. No. 16/179,545, dated May 4, 2020, 7 pages.
Notice of Allowance received for U.S. Appl. No. 16/534,291, dated Dec. 9, 2020, 7 pages.
Office Action received for Australian Patent Application No. 2012238305, dated Aug. 13, 2013, 5 pages.
Office Action received for Australian Patent Application No. 2012268384, dated Feb. 5, 2015, 3 pages.
Office Action received for Australian Patent Application No. 2013257534, dated Jan. 6, 2015, 2 pages.
Office Action received for Australian Patent Application No. 2016202360, dated Feb. 23, 2018, 4 pages.
Office Action received for Australian Patent Application No. 2016202360, dated Mar. 20, 2017, 3 pages.
Office Action received for Australian Patent Application No. 2016203253, dated Jul. 21, 2017, 3 pages.
Office Action received for Australian Patent Application No. 2018217331, dated Nov. 21, 2019, 4 pages.
Office Action received for Chinese Patent Application No. 201280027757.9, dated Apr. 12, 2017, 6 pages.
Office Action received for Chinese Patent Application No. 201280027757.9, dated Aug. 5, 2016, 6 pages.
Office Action Received for Chinese Patent Application No. 201280027757.9, dated Nov. 18, 2015, 14 pages.
Office Action received for Chinese Patent Application No. 201710576007.1, dated Oct. 23, 2019, 12 pages.
Office Action received for Chinese Patent Application No. 201810008374.6, dated Sep. 29, 2020, 17 pages.
Office Action received for European Patent Application No. 11704865.2, dated May 24, 2018, 7 pages.
Office Action Received for European Patent Application No. 11704865.2, dated Oct. 22, 2015, 8 pages.
Office Action received for European Patent Application No. 12727533.7 dated Dec. 15, 2015, 4 pages.
Office Action received for European Patent Application No. 12727533.7, dated Jul. 5, 2017, 6 pages.
Office Action received for European Patent Application No. 12727533.7, dated Jun. 4, 2018, 5 pages.
Office Action Received for Japanese Patent Application No. 2014-513803, dated Jan. 9, 2015, 7 pages.
Office Action received for Japanese Patent Application No. 2016020183, dated Dec. 22, 2016, 6 pages.
Office Action received for Japanese Patent Application No. 2017-152690, dated Apr. 3, 2020, 6 pages.
Office Action received for Japanese Patent Application No. 2017-152690, dated Apr. 8, 2019, 8 pages.
Office Action received for Japanese Patent Application No. 2017-152690, dated Jun. 8, 2018, 9 pages.
Office Action received for Japanese Patent Application No. 2020-131850, dated Oct. 12, 2020, 6 pages.
Office Action received for Korean Patent Application No. 10-2013-7034793, dated Jan. 21, 2015, 4 pages.
Office Action received for Korean Patent Application No. 10-2015-7016587, dated Jan. 31, 2018, 6 pages.
Office Action received for Korean Patent Application No. 10-2015-7016587, dated Mar. 31, 2016, 5 pages.
Office Action received for Korean Patent Application No. 10-2015-7016587, dated Mar. 31, 2017, 7 pages.
Office Action received for Korean Patent Application No. 1020167027346, dated Jun. 21, 2017, 7 pages.
Pocketables, "No pinch to zoom on my new Streak", Pocketables Forum, http://www.pocketables.com/forum/showthread.php?t=6939, Aug. 18, 2010, 2 pages.
Savov, "iPhone and Magic Mouse linked up by BT stack", (video) Jan. 4, 2010, http://www.engadget.com/2010/01/04/iphone-and-magic-mouse-linked-up-by-btstack-video/, 5 pages.
Summons to attend oral proceedings received for European Patent Application No. 11704865.2, mailed on Aug. 26, 2019, 6 pages.
Swartzfager B, "Google's new virtual room service (Lively) may have potential", Thought Delimited, http://www.thoughtdelimited.org/thoughts/post.cfm/google-s-new-virtual-room-service-lively-may-have-potential, Jul. 10, 2008, 2 pages.
Totalcontrol, "TotalControl-Iphone-Itouch-Ipad Vidcam Edition OS4 Update", Intelligent Designs Group, LLC, http://totalcontrolapp.com/index.php?option=com_myblog&show=Iphone-Itouch-Ipad-Vidcam-Edition-OS4-Update.html&ItemId=87, Jul. 12, 2010, 2 pages.
Non-Final Office Action received for U.S. Appl. No. 17/074,396, dated Oct. 6, 2021, 15 pages.
Corrected Notice of Allowance received for U.S. Appl. No. 16/939,922, dated Feb. 23, 2022, 2 pages.
Notice of Allowance received for U.S. Appl. No. 16/939,922, dated Feb. 7, 2022, 13 pages.
Non-Final Office Action received for U.S. Appl. No. 17/074,396, dated Mar. 7, 2022, 15 pages.
Applicant-Initiated Interview Summary received for U.S. Appl. No. 17/074,396, dated May 5, 2022, 3 pages.

Hold Duration Criteria Met—
Scroll Application UI

Hold Duration Criteria Not
Met—Move UI Element

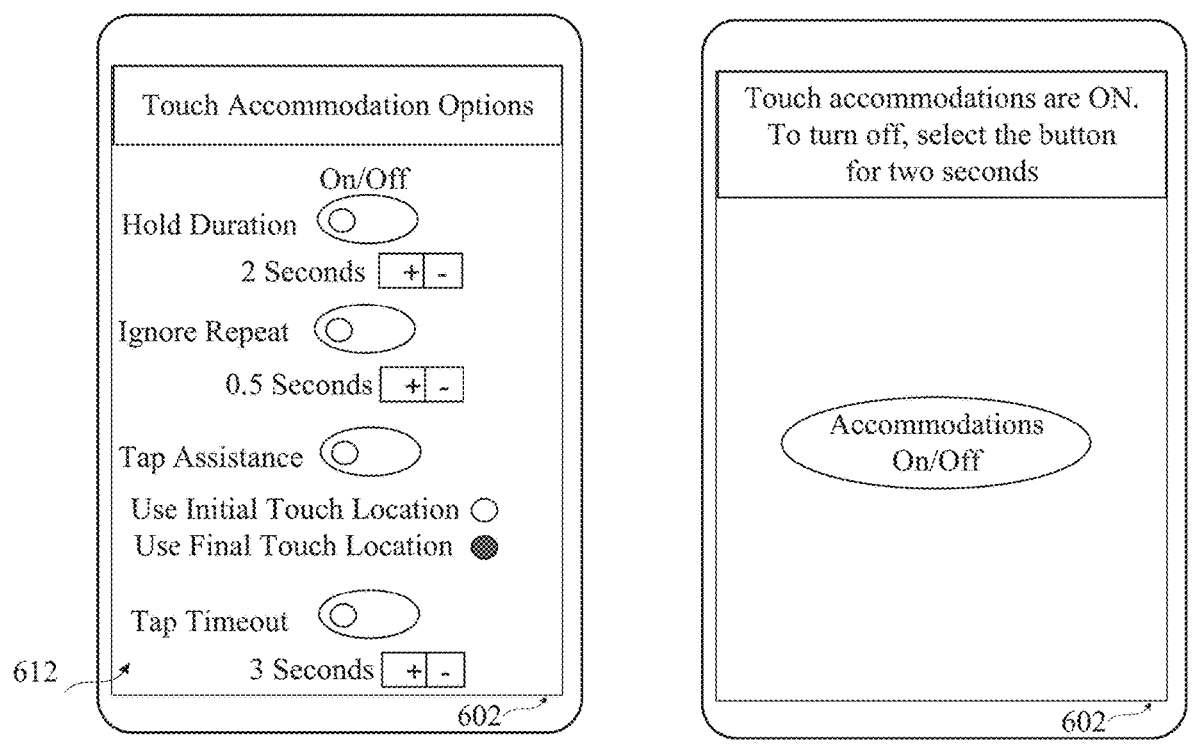
*FIG. 6G*          *FIG. 6H*

TOUCH ACCOMMODATION OPTIONS

CROSS-REFERENCE TO RELATED APPLICATIONS

This application is a continuation of U.S. application Ser. No. 16/534,291, entitled "Touch Accommodation Options," filed Aug. 7, 2019, which is a divisional of U.S. application Ser. No. 15/924,769, entitled "Touch Accommodation Options," filed Mar. 19, 2018, which is a continuation of U.S. application Ser. No. 14/863,195, entitled "Touch Accommodation Options," filed Sep. 23, 2015, which claims priority to U.S. Provisional Application Ser. No. 62/172,123, entitled "Touch Accommodation Options," filed Jun. 7, 2015, each of which are hereby incorporated by reference in their entirety.

FIELD

The present disclosure relates generally to computer user interfaces, and more specifically to techniques for providing touch accommodations for users who may have difficulty providing accurate touch inputs on touch-sensitive surfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Such surfaces may rely on numerous characteristics of the touch input, such as touch duration (e.g., tap versus tap-and-hold), touch motion (e.g., tap versus swipe), and frequency of touch repeats (e.g., tap versus double tap) to map the touch input to a function or command.

SUMMARY

Some users have difficulty performing accurate touch inputs on a touch screen, for a variety of reasons. For example, users experiencing tremors or other motor control difficulties may inadvertently touch a touch screen multiple times when they were only intending to touch it once (or not at all), or may have difficulty maintaining a contact in a single position on the screen, without inadvertently moving the contact across the screen. As a result, such users may have difficulty operating touch-based user interfaces. The present invention provides for user interfaces that provide touch accommodations to compensate for such motor control impairments.

Other techniques for processing touch inputs on electronic devices with touch-sensitive surfaces are generally cumbersome and inefficient. For example, existing techniques may not selectively filter touch inputs and provide efficient touch accommodations to users with tremors or other fine motor impairments. Existing techniques can result in frequent unwanted inputs and corresponding unwanted device responses, wasting user time and device energy. This latter consideration is particularly important in battery-operated devices.

The present invention provides for electronic devices with faster, more efficient methods and interfaces for providing touch accommodation options. Such methods and interfaces optionally complement or replace other methods for providing touch accommodations. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at an electronic device with a touch-sensitive surface and a display. The method includes displaying, on the display, a user interface associated with an application. The method includes detecting, on the touch-sensitive surface, a first touch input on the touch-sensitive surface including a first contact on the touch-sensitive surface. The method includes, in response to detecting the first touch input, generating data representing at least a portion of the first touch input. The method includes, in accordance with a determination that a hold duration setting is enabled, determining whether a set of one or more hold duration criteria have been met for the first touch input, wherein the hold duration criteria are based on a hold duration time period that corresponds to the hold duration setting. The method includes, in accordance with a determination that the set of one or more hold duration criteria have been met for the first touch input, wherein the hold duration criteria include a hold duration criterion that is met when a duration of the first contact exceeds the hold duration time period, providing the data representing at least a portion of the first touch input to the application. The method also includes, in accordance with a determination that the set of one or more hold duration criteria have not been met, forgoing providing the data representing at least a portion of the first touch input to the application.

In accordance with some embodiments, a method is performed at an electronic device with a touch-sensitive surface and a display. The method includes displaying, on the display, a user interface associated with an application. The method includes detecting, on the touch-sensitive surface, a first touch input on the touch-sensitive surface including a first contact with the touch-sensitive surface. The method includes, after detecting the first touch input, detecting, on the touch-sensitive surface, a second touch input on the touch-sensitive surface including a second contact with the touch-sensitive surface. The method includes, in response to detecting the second touch input, generating second data representing at least a portion of the second touch input. The method includes, in accordance with a determination that an ignore-repeat duration setting is enabled, determining whether the second touch input meets a set of one or more ignore-repeat criteria based on an ignore-repeat duration time period that corresponds to the ignore-repeat duration setting. The method includes, in accordance with a determination that the second touch input meets the set of one or more ignore-repeat criteria, which include a criterion that is met when the amount of time between the first touch input and the second touch input is less than the ignore-repeat duration time period, forgoing providing the second data to the application. The method also includes, in accordance with a determination that the second touch input does not meet the set of one or more ignore-repeat criteria, providing the second data to the application.

In accordance with some embodiments, a method is performed at an electronic device with a touch-sensitive surface and a display. The method includes displaying, on the display, a user interface associated with an application. The method includes detecting a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface. The method includes, in response to detecting at least a portion of the touch input on the touch-sensitive surface, and in accordance with a determination that a set of one or more tap-assistance criteria have been met, providing, to the application, data representing the touch input at a single location on the touch-sensitive surface. The method also includes, in response to detecting at least a portion of the touch input on the touch-sensitive surface, and in accordance with a determination that the a set of one or more tap-assistance criteria have not been met, providing, to the application, data representing the touch input including the movement of the contact.

An electronic device, comprising: a display; a touch-sensitive surface; one or more processors; a memory; and one or more programs, wherein the one or more programs are stored in the memory and configured to be executed by the one or more processors, the one or more programs including instructions for: displaying, on the display, a user interface associated with an application; detecting, on the touch-sensitive surface, a first touch input on the touch-sensitive surface including a first contact on the touch-sensitive surface; in response to detecting the first touch input, generating data representing at least a portion of the first touch input; in accordance with a determination that a hold duration setting is enabled: determining whether a set of one or more hold duration criteria have been met for the first touch input, wherein the hold duration criteria are based on a hold duration time period that corresponds to the hold duration setting; in accordance with a determination that the set of one or more hold duration criteria have been met for the first touch input, wherein the hold duration criteria include a hold duration criterion that is met when a duration of the first contact exceeds the hold duration time period, providing the data representing at least a portion of the first touch input to the application; and in accordance with a determination that the set of one or more hold duration criteria have not been met, forgoing providing the data representing at least a portion of the first touch input to the application.

An electronic device, comprising: a display; a touch-sensitive surface; one or more processors; a memory; and one or more programs, wherein the one or more programs are stored in the memory and configured to be executed by the one or more processors, the one or more programs including instructions for: displaying, on the display, a user interface associated with an application; detecting, on the touch-sensitive surface, a first touch input on the touch-sensitive surface including a first contact with the touch-sensitive surface; after detecting the first touch input, detecting, on the touch-sensitive surface, a second touch input on the touch-sensitive surface including a second contact with the touch-sensitive surface; in response to detecting the second touch input, generating second data representing at least a portion of the second touch input; and in accordance with a determination that an ignore-repeat duration setting is enabled: determining whether the second touch input meets a set of one or more ignore-repeat criteria based on an ignore-repeat duration time period that corresponds to the ignore-repeat duration setting; in accordance with a determination that the second touch input meets the set of one or more ignore-repeat criteria, which include a criterion that is met when the amount of time between the first touch input and the second touch input is less than the ignore-repeat duration time period, forgoing providing the second data to the application, and in accordance with a determination that the second touch input does not meet the set of one or more ignore-repeat criteria, providing the second data to the application.

An electronic device, comprising: a display; a touch-sensitive surface; one or more processors; a memory; and one or more programs, wherein the one or more programs are stored in the memory and configured to be executed by the one or more processors, the one or more programs including instructions for: displaying, on the display, a user interface associated with an application; detecting a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; in response to detecting at least a portion of the touch input on the touch-sensitive surface: in accordance with a determination that a set of one or more tap-assistance criteria have been met, providing, to the application, data representing the touch input at a single location on the touch-sensitive surface, and in accordance with a determination that the a set of one or more tap-assistance criteria have not been met, providing, to the application, data representing the touch input including the movement of the contact.

A non-transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect, on the touch-sensitive surface, a first touch input on the touch-sensitive surface including a first contact on the touch-sensitive surface; in response to detecting the first touch input, generate data representing at least a portion of the first touch input; in accordance with a determination that a hold duration setting is enabled: determine whether a set of one or more hold duration criteria have been met for the first touch input, wherein the hold duration criteria are based on a hold duration time period that corresponds to the hold duration setting; in accordance with a determination that the set of one or more hold duration criteria have been met for the first touch input, wherein the hold duration criteria include a hold duration criterion that is met when a duration of the first contact exceeds the hold duration time period, provide the data representing at least a portion of the first touch input to the application; and in accordance with a determination that the set of one or more hold duration criteria have not been met, forgo providing the data representing at least a portion of the first touch input to the application.

A non-transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect, on the touch-sensitive surface, a first touch input on the touch-sensitive surface including a first contact with the touch-sensitive surface; after detecting the first touch input, detect, on the touch-sensitive surface, a second touch input on the touch-sensitive surface including a second contact with the touch-sensitive surface; in response to detecting the second touch input, generate second data representing at least a portion of the second touch input; and in accordance with a determination that an ignore-repeat duration setting is enabled: determine whether the second touch input meets a set of one or more ignore-repeat criteria based on an ignore-repeat duration time period that corresponds to the ignore-repeat duration setting; in accordance with a determination that the second touch input meets the set of one or more ignore-repeat criteria, which include a criterion that is met when the amount of time between the first touch input and the second touch input is less than the ignore-repeat duration time period, forgo providing the second data to the application, and in accordance with a determination that the second touch input does not meet the set of one or more ignore-repeat criteria, provide the second data to the application.

A non-transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; in response to detecting at least a portion of the touch input on the touch-sensitive surface: in accordance with a determination that a set of one or more tap-assistance criteria have been met, provide, to the application, data representing the touch input at a single location on the touch-sensitive surface, and in accordance with a determination that the a set of one or more tap-assistance criteria have not been met, provide, to the application, data representing the touch input including the movement of the contact.

A transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect, on the touch-sensitive surface, a first touch input on the touch-sensitive surface including a first contact on the touch-sensitive surface; in response to detecting the first touch input, generate data representing at least a portion of the first touch input; in accordance with a determination that a hold duration setting is enabled: determine whether a set of one or more hold duration criteria have been met for the first touch input, wherein the hold duration criteria are based on a hold duration time period that corresponds to the hold duration setting; in accordance with a determination that the set of one or more hold duration criteria have been met for the first touch input, wherein the hold duration criteria include a hold duration criterion that is met when a duration of the first contact exceeds the hold duration time period, provide the data representing at least a portion of the first touch input to the application; and in accordance with a determination that the set of one or more hold duration criteria have not been met, forgo providing the data representing at least a portion of the first touch input to the application.

A transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect, on the touch-sensitive surface, a first touch input on the touch-sensitive surface including a first contact with the touch-sensitive surface; after detecting the first touch input, detect, on the touch-sensitive surface, a second touch input on the touch-sensitive surface including a second contact with the touch-sensitive surface; in response to detecting the second touch input, generate second data representing at least a portion of the second touch input; and in accordance with a determination that an ignore-repeat duration setting is enabled: determine whether the second touch input meets a set of one or more ignore-repeat criteria based on an ignore-repeat duration time period that corresponds to the ignore-repeat duration setting; in accordance with a determination that the second touch input meets the set of one or more ignore-repeat criteria, which include a criterion that is met when the amount of time between the first touch input and the second touch input is less than the ignore-repeat duration time period, forgo providing the second data to the application, and in accordance with a determination that the second touch input does not meet the set of one or more ignore-repeat criteria, provide the second data to the application.

A transitory computer-readable storage medium storing one or more programs, the one or more programs comprising instructions, which when executed by one or more processors of an electronic device with a display and a touch-sensitive surface, cause the electronic device to: display, on the display, a user interface associated with an application; detect a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; in response to detecting at least a portion of the touch input on the touch-sensitive surface: in accordance with a determination that a set of one or more tap-assistance criteria have been met, provide, to the application, data representing the touch input at a single location on the touch-sensitive surface, and in accordance with a determination that the a set of one or more tap-assistance criteria have not been met, provide, to the application, data representing the touch input including the movement of the contact.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing touch accommodations, thereby increasing the effectiveness, efficiency, and user satisfaction with such devices. Such methods and interfaces may complement or replace other methods for providing touch accommodations.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6J illustrate exemplary touch accommodations user interfaces in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing touch accommodations for users who experience difficulty performing accurate touch inputs due to the presence of tremors or other motor impairments. For example, a user with tremors may inadvertently provide multiple quick tap inputs on a touch screen when intending to perform only a single tap input, or may have difficulty maintaining a contact in a single position on the touch screen long enough for the contact to be interpreted as a selection of an icon, for example. User interfaces that compensate for such motor impairments can reduce the cognitive burden on a user who has difficulty performing accurate touch inputs, thereby enhancing productivity. Further, such techniques can reduce processor and battery power otherwise wasted on responding to unintended or unwanted user inputs.

Figure 12A:
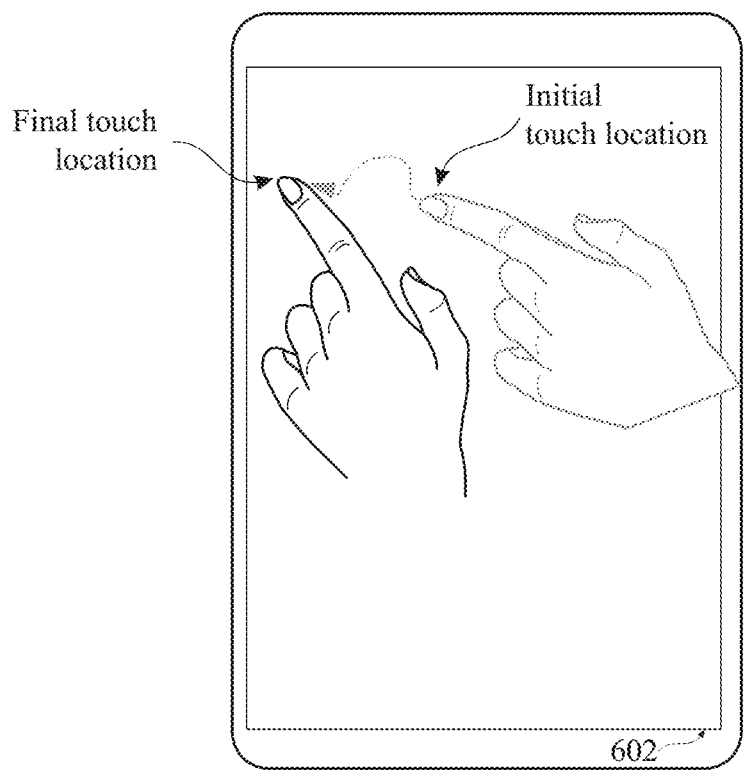
FIGS. 12A-12C illustrate exemplary touch inputs in accordance with some embodiments.
Figure 12B:
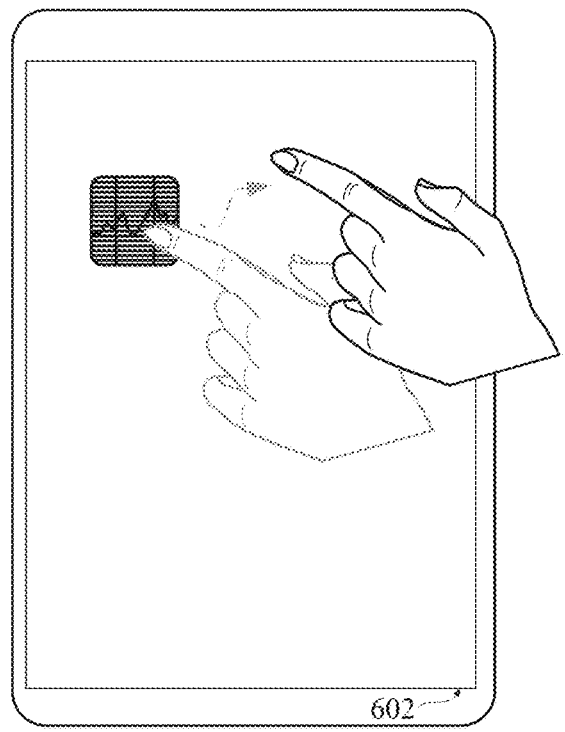
Figure 12C:
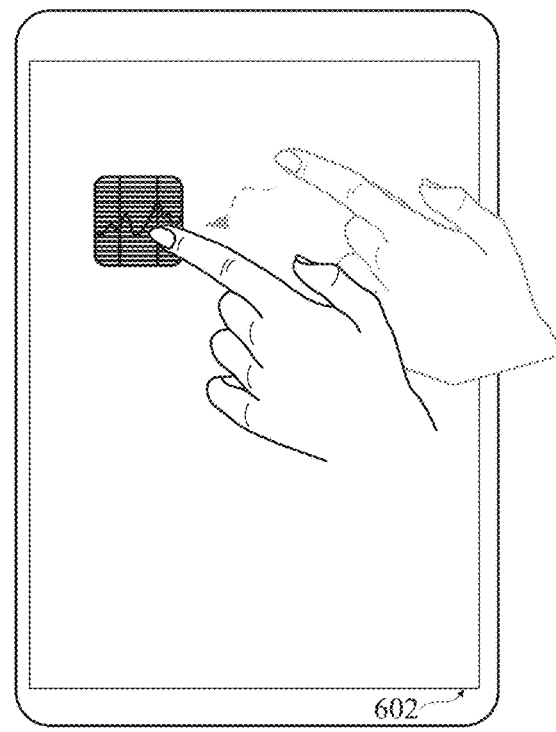

Below, FIGS. 1A-1B, 2, 3, 4A-4B, and 5A-5B provide a description of exemplary devices for performing the described techniques for providing touch accommodations. FIGS. 6A-6J and 9A-9C illustrate exemplary user interfaces for providing touch accommodations. FIGS. 12A-12C illustrate exemplary touch inputs that may be detected on a touchscreen. FIGS. 7A-7B, 10, and 13A-13B are flow diagrams illustrating methods of providing touch accommodations in accordance with some embodiments. The user interfaces depicted in FIGS. 6A-6J and 9A-9C, and touch inputs depicted in FIGS. 12A-12C are used to illustrate the processes described below, including the processes in FIGS. 7A-7B, 10, and 13A-13B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user. In some embodiments, the device can preprocess or filter touch inputs before providing them to an active application.

Figure 1A:
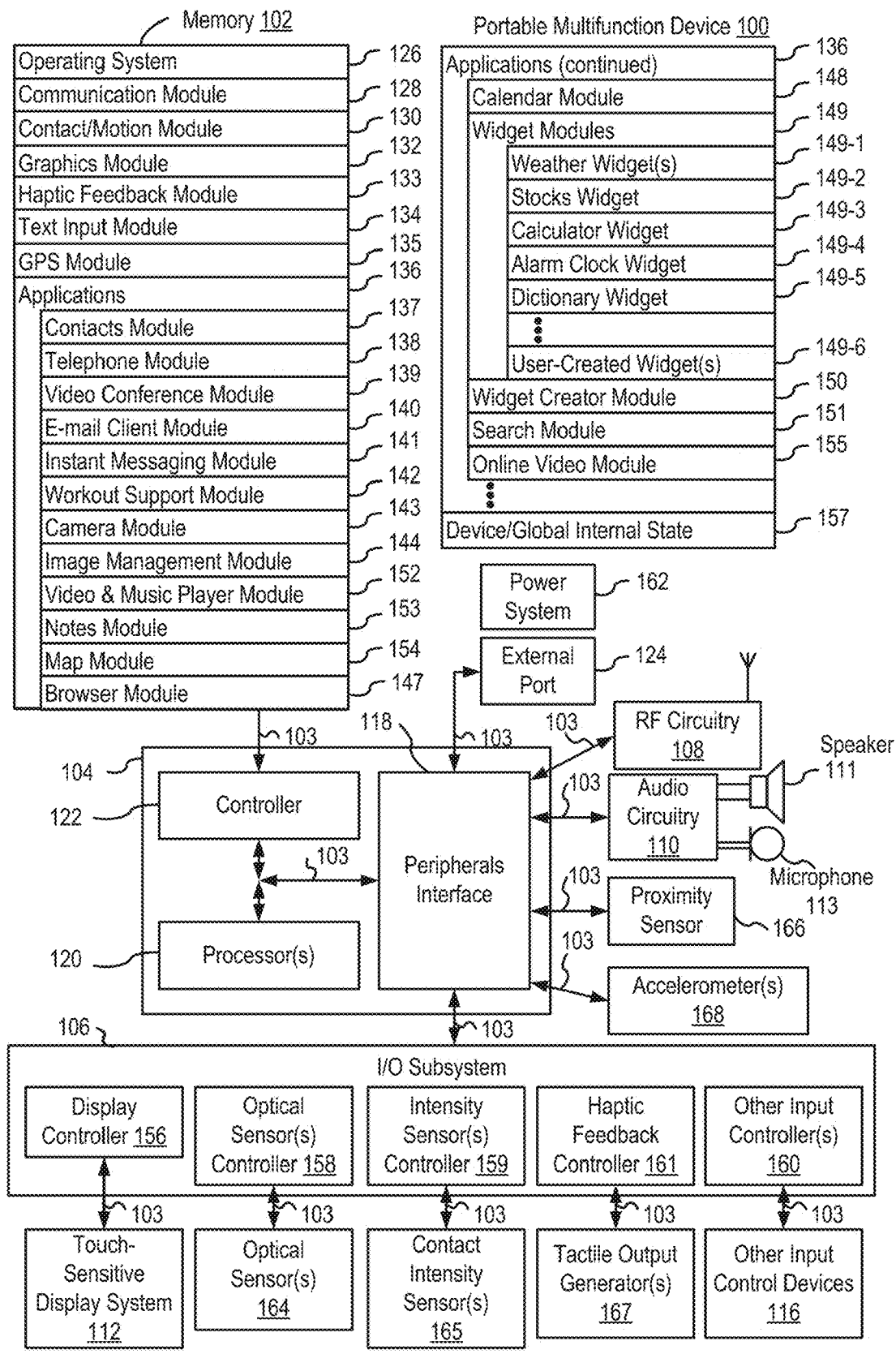
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the device detects that the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
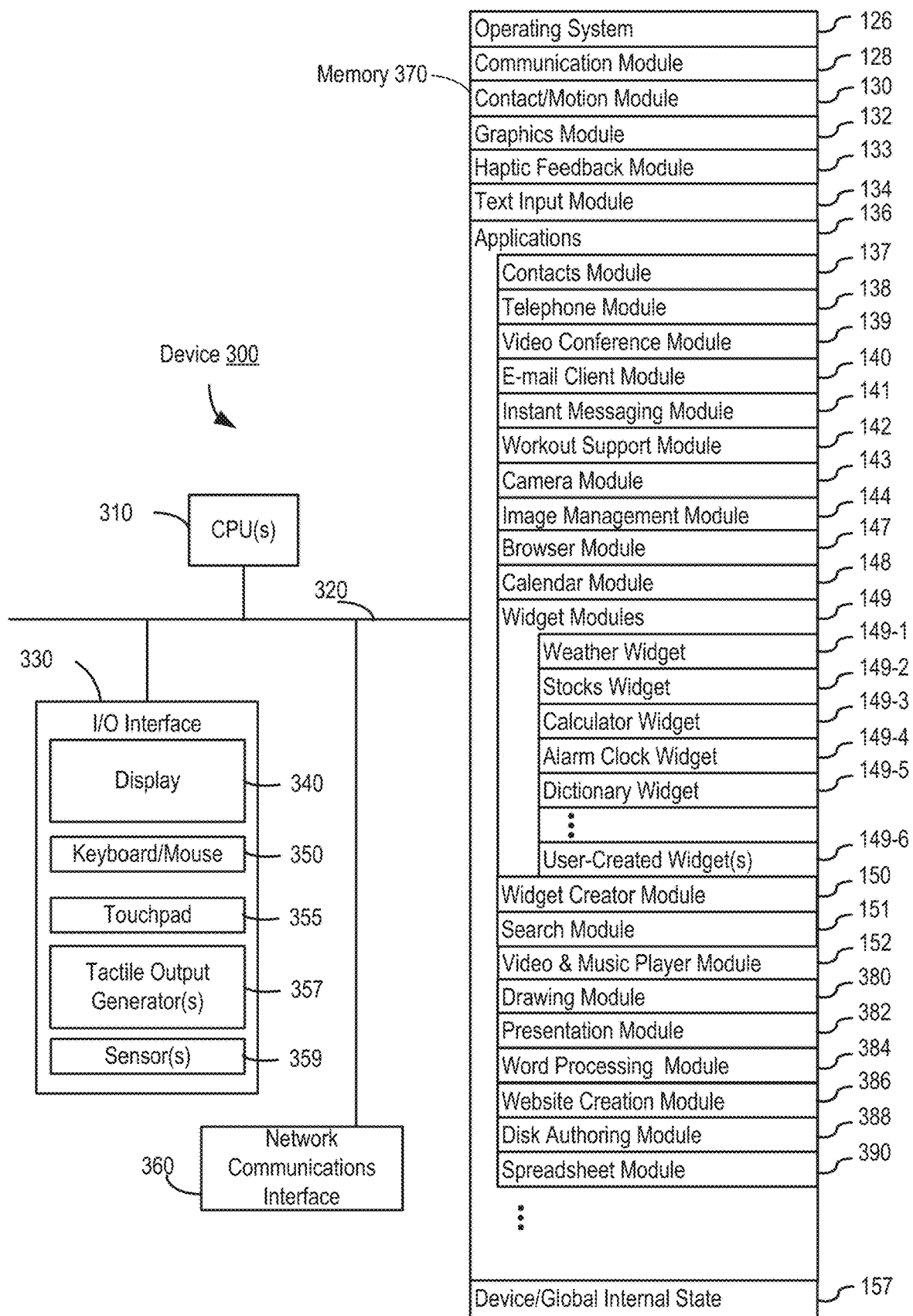
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
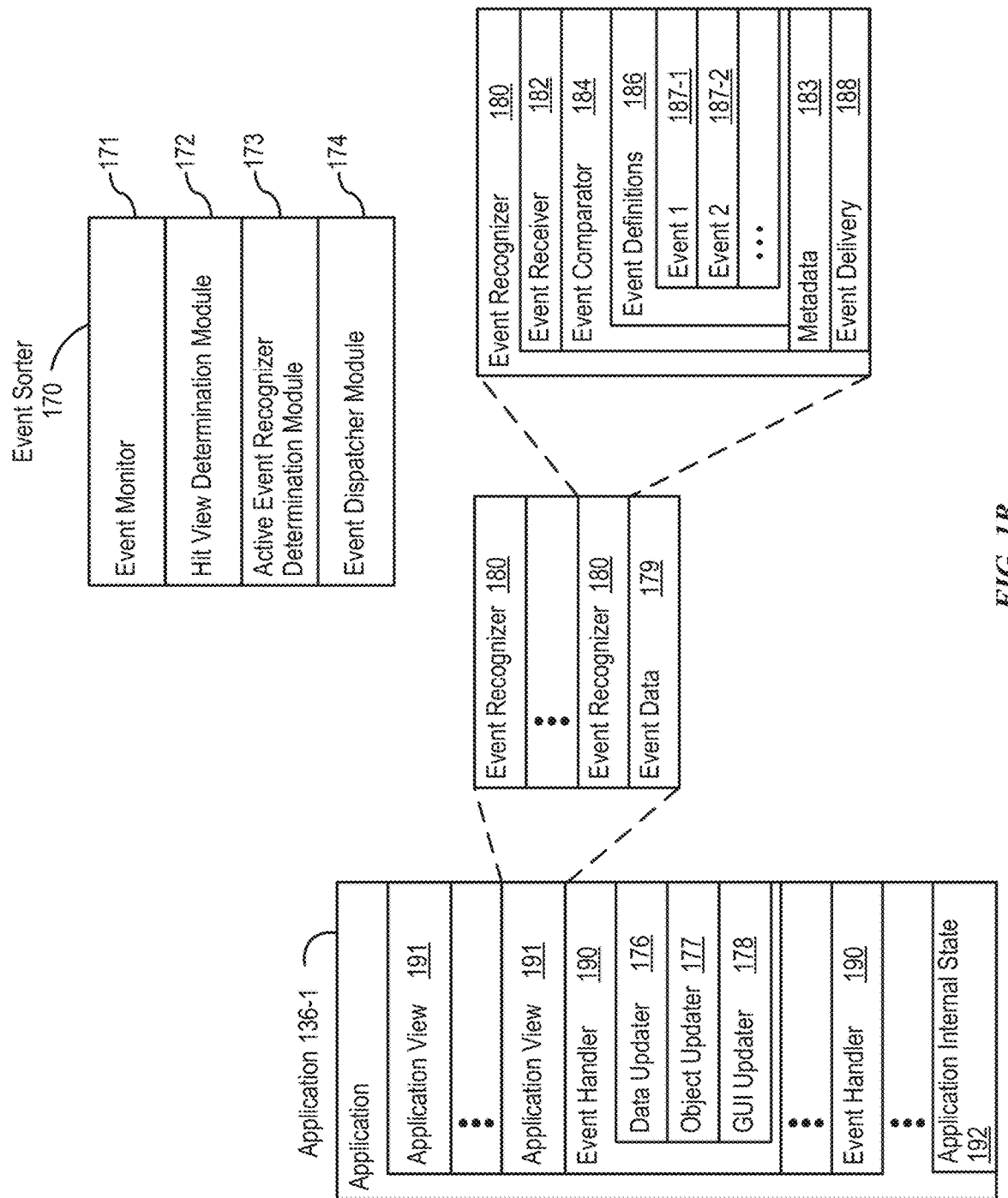
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
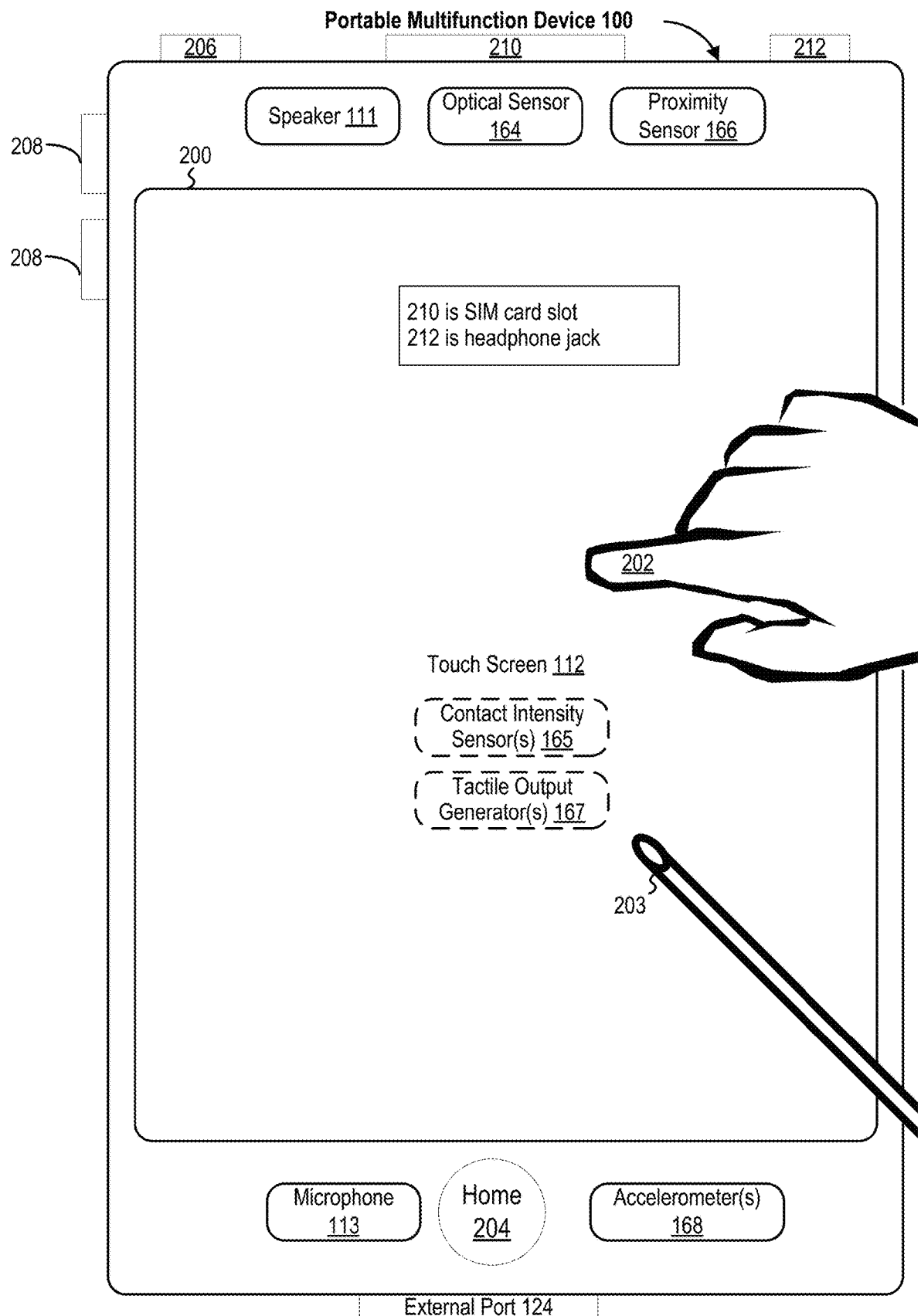
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the device detects that the user has broken contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
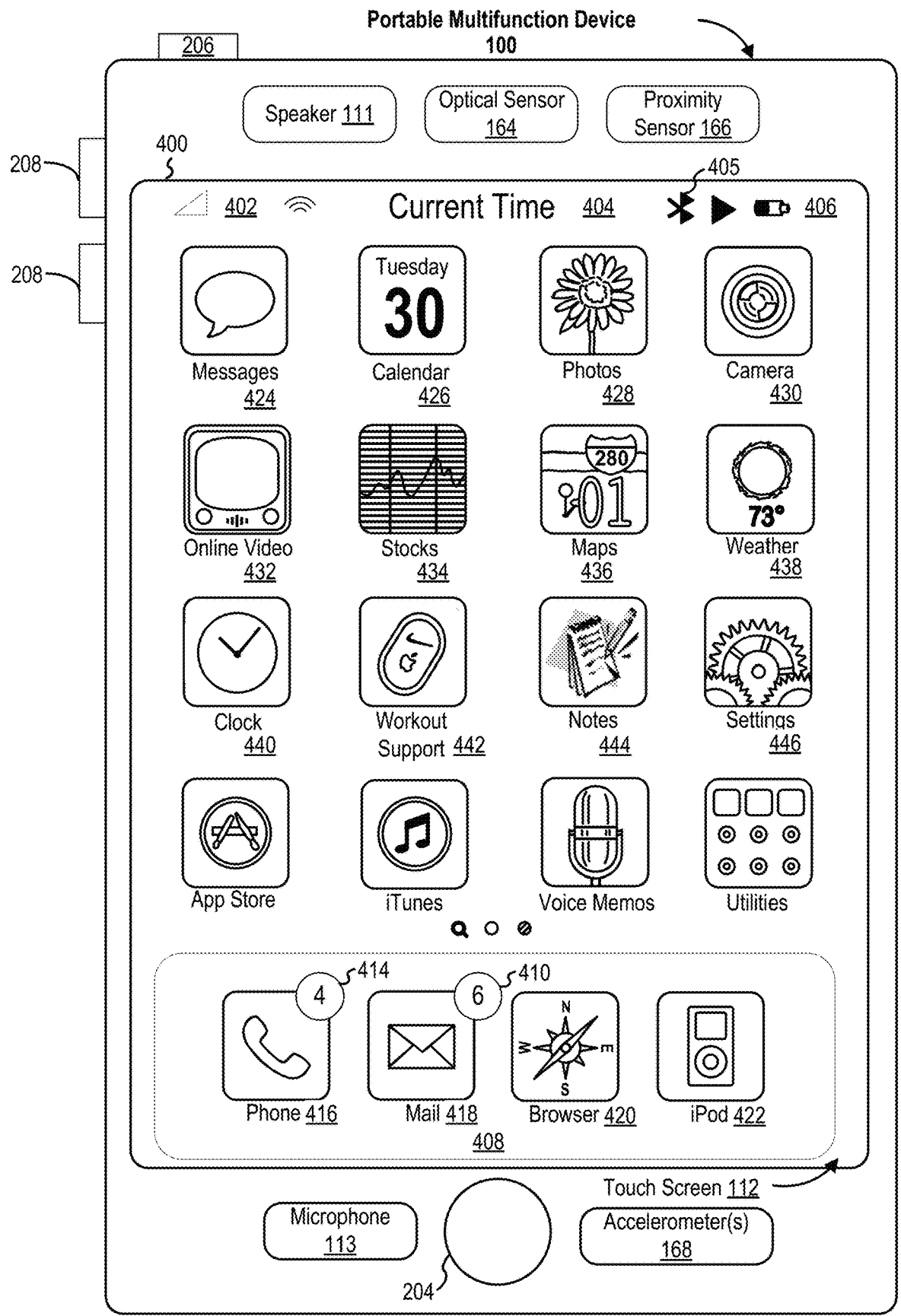
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
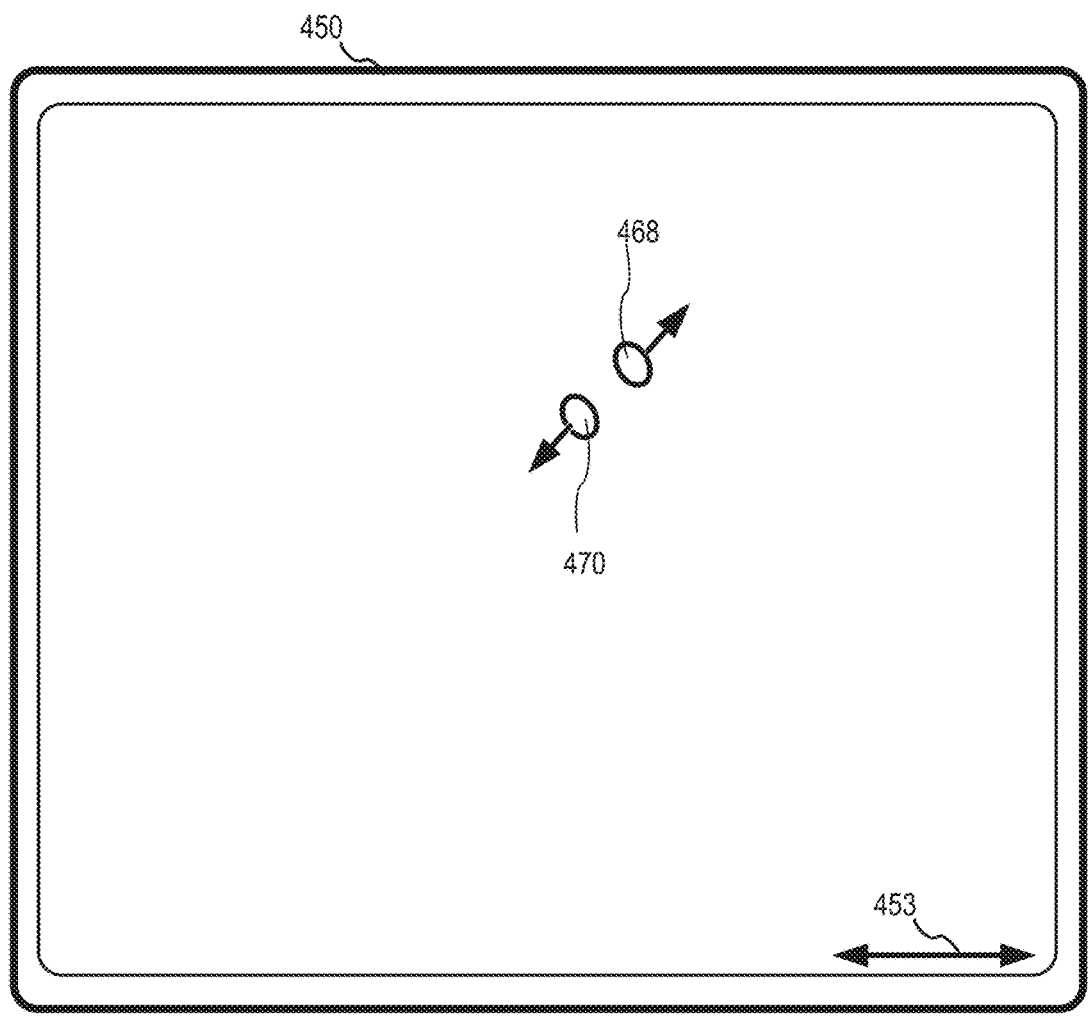
FIG. 4B illustrates an exemplary user interface for a multifunction device with a touch-sensitive surface that is separate from the display in accordance with some embodiments.
Figure 4B:
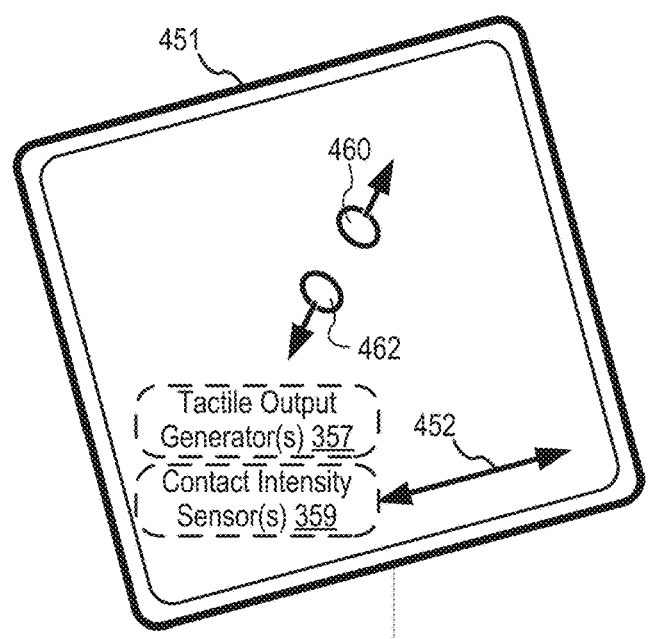

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
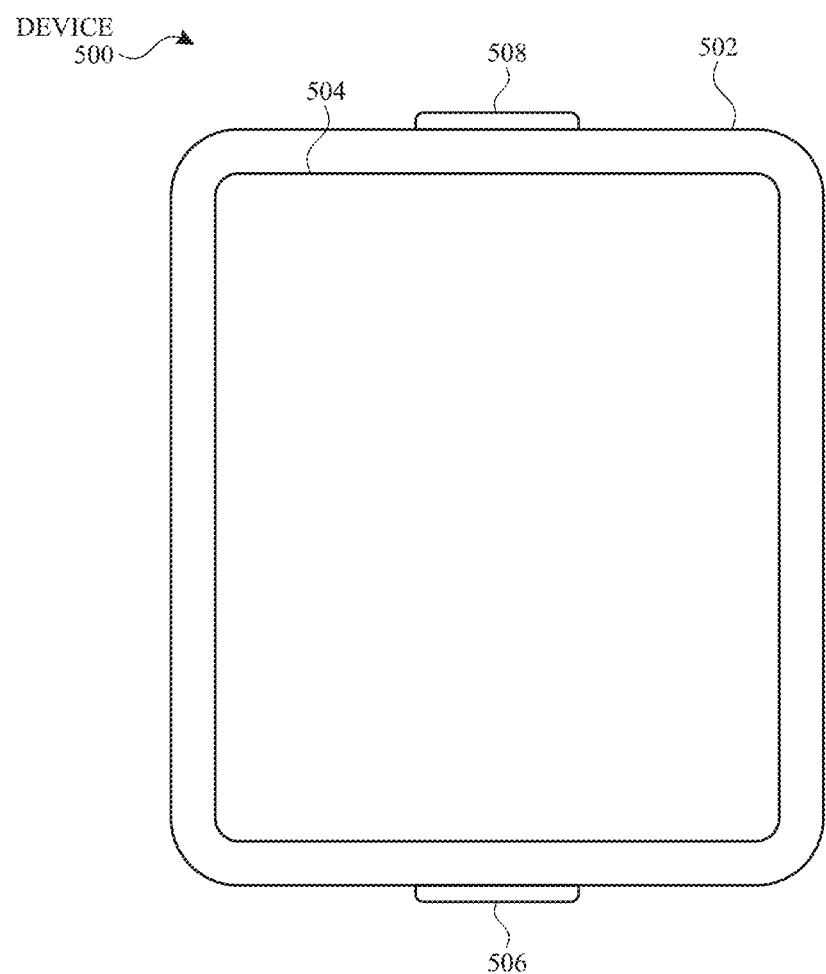
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
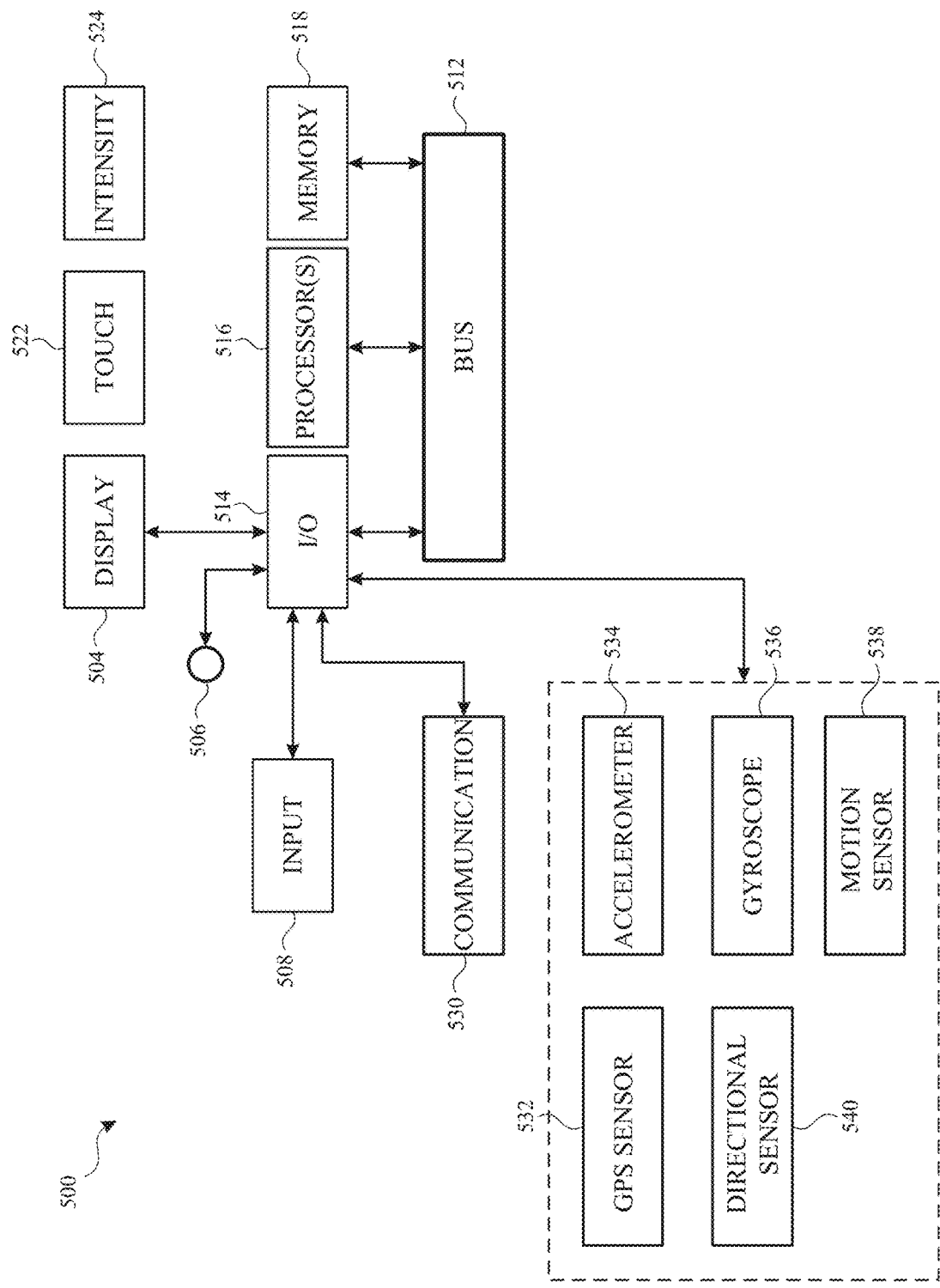
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700, 1000, and/or 1300 (FIGS. 7A-B, FIG. 10, and FIGS. 13A-B). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that may be implemented on an electronic device, such as portable multifunction device 100, device 300, or device 500.

FIGS. 6A-6J illustrate exemplary user interfaces for touch accommodation options, in accordance with some embodiments. The user interfaces in these figures are used to illustrate the processes described below, including the processes in FIGS. 7A-B.

Some users have difficulty performing accurate touch inputs on a touch screen. For example, users with tremors or other motor impairments may make accidental contact with the touch screen when intending only to view the touch screen, or when intending to provide a different touch input. Accordingly, a touch accommodation option that helps to distinguish between accidental and intentional touch inputs can reduce the frustration such users experience when interacting with a touch screen or other touch-sensitive surface.

In some embodiments, a device (e.g., device 100, 300, 500) detects and filters touch inputs before providing a representation of the touch input to an application running on the device. In some embodiments, the device detects and filters touch inputs as part of a software layer that is separate from the application layer, such as in the device's operating system, for example. In some embodiments, the device's operating system includes multiple abstraction layers below the application layer, and the detecting and filtering of touch inputs can be implemented in one or more of these abstraction layers. For example, in some embodiments, touch events are provided to an event handler (e.g., Event Handler 190 in FIG. 1B) by a touch processing layer that resides between a touch-sensitive surface controller and the application.

Figure 6A:
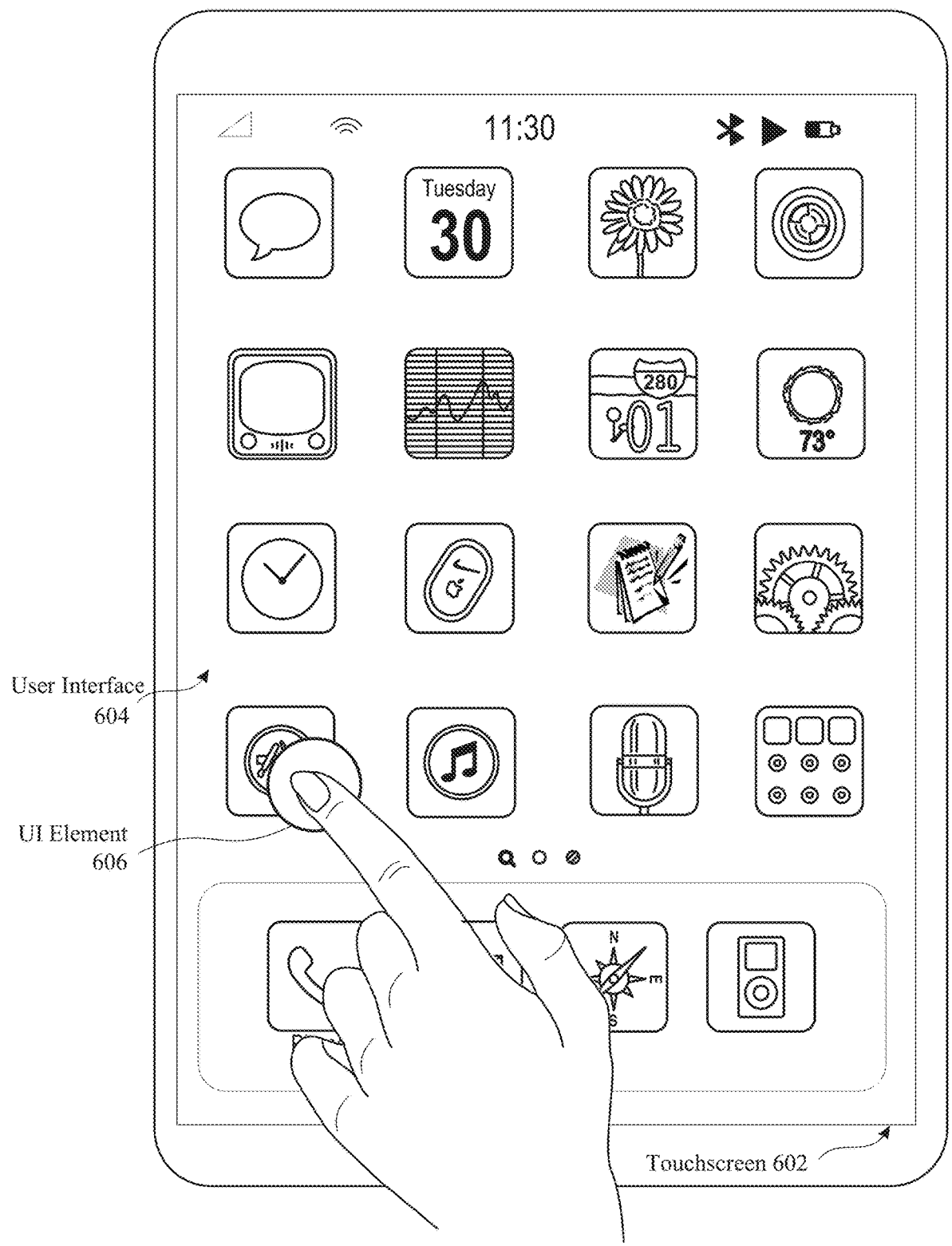

In some embodiments, the application to which a representation of the touch input is provided is an application such as the applications 136 depicted in FIG. 1A. In some embodiments, the application is a native or standard application such as Springboard, released by Apple Inc. A user interface associated with Springboard is depicted in FIGS. 4A and 6A. In some embodiments, the application is a third-party application that is installed on the device, such as a map application, social media application, or health-monitoring application, for example.

By filtering touch inputs in an attempt to reduce the unwanted effects of inaccurate or unintentional inputs, the device can provide touch accommodations to users who have difficulty performing accurate touch inputs. Techniques for defining and selectively ignoring touch events are described in U.S. Pat. No. 8,645,827 "Touch Event Model," filed Mar. 4, 2008, which is hereby incorporated by reference in its entirety.

The above-described approach for implementing touch accommodations in a software layer that is separate from the application layer (e.g., in the operating system) is advantageous in that it does not require modifications to applications installed on the device to implement touch accommodations. Furthermore, the above-described approach can provide consistent touch-accommodation behavior across multiple applications on the device, thus reducing the user's cognitive burden. This approach generally cannot be implemented by, for example, third-party applications, which do not have sufficient authority to implement device-wide touch accommodations (e.g., because they are not allowed to view, intercept, generate, and/or modify touch events that are to be provided to other applications). In contrast, the operating system does have sufficient authority to view, intercept, generate, and/or modify touch events for all of the applications on the system and thus can make system-wide changes in how touch events are handled that will apply to multiple applications running on the system (or, optionally, all applications running on the system).

Specific user-interface touch accommodation options, including Hold Duration, Ignore Repeat, and Tap Assistance, are described in more detail below.

Hold Duration Option

Applications running on electronic devices (e.g., device 100, 300, 500) display user interfaces to allow a user to interact with the application. Such applications include, for example, web browsers, text messaging applications, and various other native or third-party "apps." For devices with touch screens, the user can provide touch inputs to the user interface on a touch screen (or other touch-sensitive surface), where a touch input includes a contact with the touch screen.

Some users with tremors or other motor difficulties can optionally inadvertently make brief contact(s) with a touch screen when intending to perform a different input (e.g., a swipe gesture or button press), or when intending only to view the touch screen.

In some embodiments, a device with a touch-sensitive surface can optionally include a hold duration setting that, when enabled, requires the contact with the touch-sensitive surface to be maintained for a predetermined hold duration time period before a representation of the touch input is provided to the application. The hold duration time period can optionally be 0.25 seconds, 0.5 seconds, 1 second, 2 seconds, 3 seconds, 4 seconds, or 5 seconds, for example, or another value in that range.

In some embodiments, the device interprets a brief or glancing contact detected on the touch-sensitive surface (such as a short touch, tap, or flick) as accidental and the device does not provide any data representing the touch input to the application. In contrast, the device interprets a touch input that includes a contact that is continuously maintained on the touch-sensitive surface for at least the hold duration time period as an intentional input, and therefore the device provides data representing at least a portion of the touch input to the application. Such data can optionally represent, for example, one or more touch events associated with the touch input, such as the touchdown location of the contact, the liftoff location of the contact, and/or a movement of the contact.

In some embodiments, the application to which the data is provided is an active application that is receiving touch inputs from a touch-sensitive surface.

In some embodiments, in response to detecting a touch input on the touch-sensitive surface, the device generates data representing at least a portion of a touch input and provides this data to the application only if the touch input meets a set of one or more hold duration criteria. Such criteria include the above-described requirement for meeting the hold duration time period for the contact, and, in some embodiments, can also include a requirement that the contact is maintained at a single position on the touch screen and/or that no additional touch inputs are detected during the hold duration time period, for example.

As described above, when the hold duration setting is enabled, the device requires a user to maintain a contact on the touch-sensitive surface for the predetermined hold duration time period before providing any data representing the touch input to the application. Thus, while the contact is maintained, but before the hold duration criteria has been met, the application does not receive any indication that a touch input (including a contact) has been detected, and thus does not respond to the touch input. Furthermore, if the device detects that the user has removed the contact before the hold duration time period has elapsed, the device does not provide an indication of the touch input to the application, and thus the application does not respond to the touch input.

In some cases, a user may be confused by the application's failure to respond to the touch input, and may attribute the failure to the device being frozen or locked, for example. To address this potential for confusion, in some embodiments, in response to detecting the touch input, the device provides an immediate visual indication to the user that a touch input has been detected, even before the touch input has met the set of hold duration criteria or has been provided to the application.

As depicted in FIG. 6A, in some embodiments, in response to detecting a touch input on touch screen 602 while the hold duration setting is enabled, the device displays a user interface (UI) element 606 to indicate detection of the touch input, without providing any data representing the touch input to the application. In some embodiments, the device displays the user interface element 606 in response to detecting the touchdown of the contact on touch screen 602.

In some embodiments, the user interface element 606 is not associated with the application; instead, the user interface element 606 is associated with the software layer that is responsible for detecting and filtering the touch input prior to providing data representing the touch input to the application, such as the operating system. In some embodiments, the user interface element 606 is displayed overlaid with the user interface 604 associated with the application, as is depicted in FIG. 6A. The user interface depicted in FIG. 6A is associated with the Springboard application released by Apple Inc. Springboard is a standard application included with the Apple iOS operating system.

In some embodiments, such as shown in FIG. 6A, the user interface element 606 is a circle. In other embodiments, the user interface element can optionally be another shape, such as an ellipse or square, for example, or can optionally be another type of visual indicator. The purpose of the user interface element is to alert the user that the touch input has been detected; a person of skill in the art will appreciate that there are many visual indicators that can achieve this purpose.

In some embodiments, the device displays the user interface element 606 on the touch screen at the location where the contact is initially detected (e.g., at the location of the touchdown of the contact).

Figure 6B:
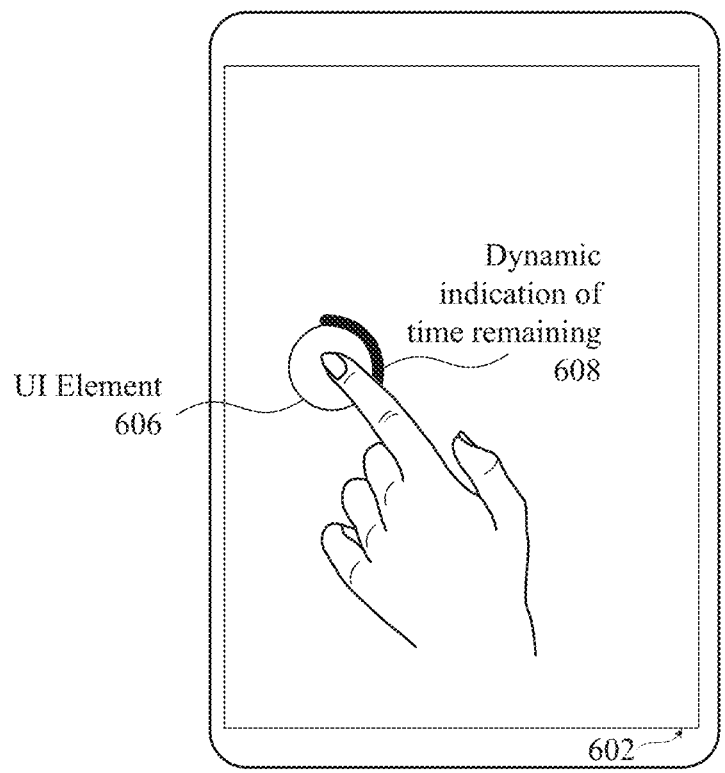

As depicted in FIG. 6B, in some embodiments, the user interface element 606 includes a dynamic indication 608 of the amount of time remaining before the contact exceeds a predetermined time period, such as the hold duration time period. In some embodiments, as depicted in FIG. 6B, the dynamic indication is a progress bar indicating the time remaining that is displayed around the perimeter of the user interface element 606. The progress bar progresses around the perimeter of the circle until it reaches its starting point, indicating that the duration of the contact has reached the predetermined time period, such as the hold duration time period.

In the embodiment depicted in FIG. 6B, when the device detects a touch input on touch screen 602, a circle appears with a progress bar that starts at a point on the circle (e.g., at the top of the circle) and progresses around the circle as the duration of the contact continues, thereby providing the user with a visual indication of how much longer they need to maintain the contact before the touch input will be accepted and provided to the application (assuming that other hold criteria, if any, are also met). In some embodiments, once the progress bar has traversed the full circle, indicating that it has reached 100% progress (e.g., the hold duration time period has elapsed), the device ceases to display the user interface element.

Figure 6C:
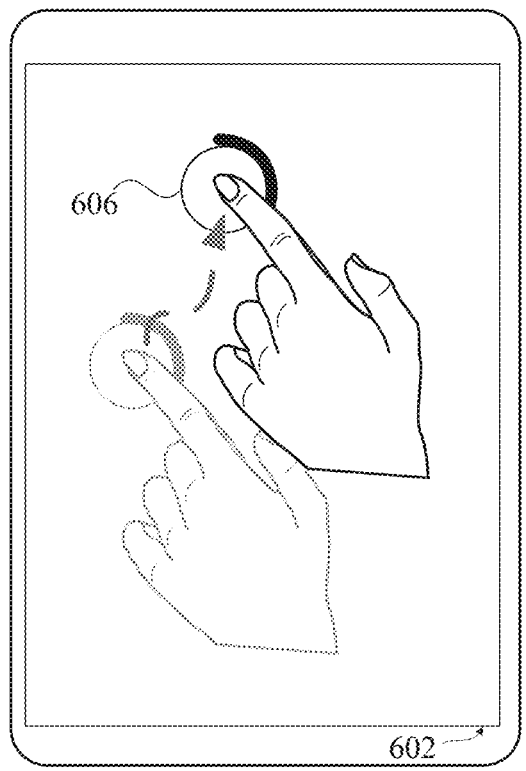

As depicted in FIG. 6C, if the device detects a movement of the contact while displaying user interface element 606, in some embodiments, the device changes the displayed location of the user interface element 606 in accordance with the movement. Thus, in some embodiments, the device causes the displayed user interface element 606 to track the movement of the user's finger across touch screen 602.

Figure 6D:
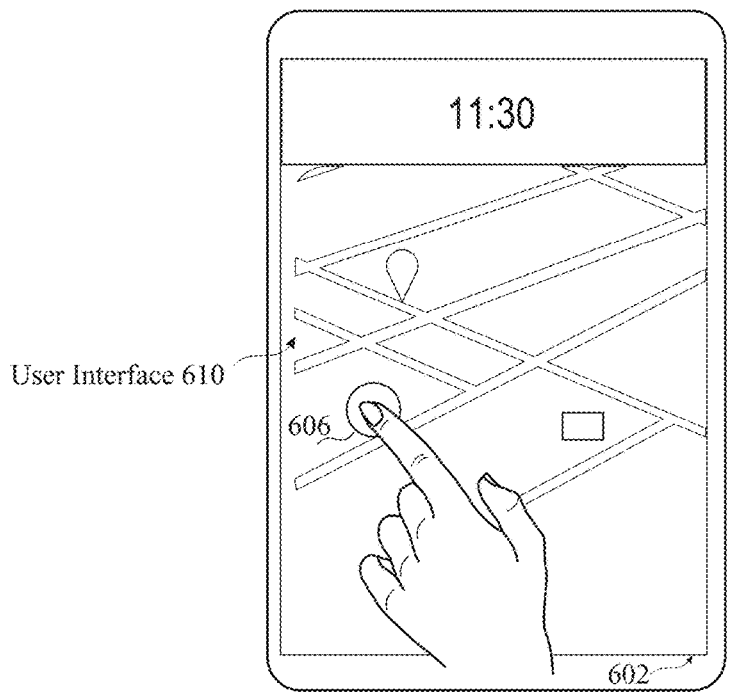
Figure 6E:
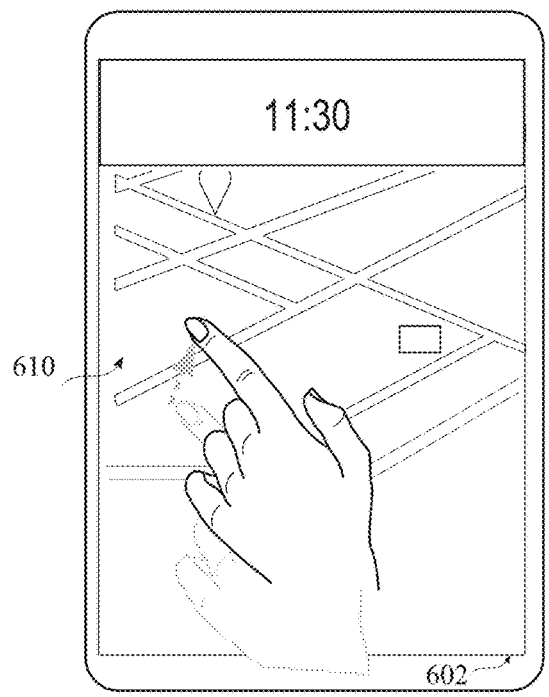
Figure 6F:
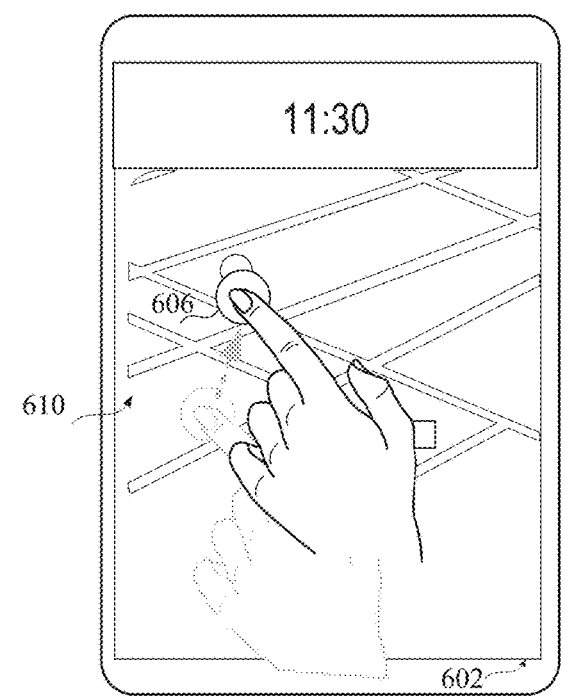

In some embodiments, the device uses the touch input to either control the location of the user interface element 606 or to control the user interface 604 associated with the application, depending on whether the hold criteria has been met or not. As depicted in FIGS. 6D-F, in some embodiments, if the device detects a movement of the contact while displaying the user interface element 606 as in FIG. 6D, the device either changes the displayed location of the user interface element to follow the path of the movement as described above without scrolling the user interface associated with the application (if the hold duration criteria has not yet been met, as in FIG. 6E), or scrolls the user interface associated with the application (if the hold duration criteria has been met, as in FIG. 6F).

Note that, in the embodiment depicted in FIG. 6E, the device does not continue to display the user interface element after the hold duration criteria have been met. In some embodiments, the device ceases to display the user interface element 606 in response to determining that the hold duration criteria have been met.

In some embodiments, the device ceases to display the user interface element 606 in response to determining that a liftoff of the contact has been detected.

In some embodiments, in response to detecting a touch input on the touch-sensitive surface (such as touch screen 602), the device generates data representing at least a portion of the touch input. The touch input may include, for example, a touchdown of the contact at a first position on the touch-sensitive surface, a movement of the contact across the touch-sensitive surface, and/or a liftoff of the contact from a second position on the touch-sensitive surface. The data representing the touch input can optionally represent some or all of these portions of the contact. In some embodiments, the data representing the touch input includes the location of the touchdown of the contact, the specific path of the movement of the contact, and/or the location of the liftoff of the contact.

In some circumstances (e.g., when the contact has moved) the location of the liftoff of the contact is different from the location of the touchdown of the contact; that is, the first position and second position are different.

In some circumstances (e.g., when the contact has not moved or has moved back to its initial location) the location of the liftoff of the contact is the same as the location of the touchdown of the contact; that is, the first position and second position are the same.

In some embodiments, the data provided to the application includes the location of the contact at the time when the hold duration was first met.

In some embodiments, the data includes an intermediate location of the contact, between the location of the touchdown and the location of the liftoff.

In some embodiments, the device "fakes" a new touchdown of the contact at a location other than the location at which the touchdown of the contact was actually detected. The faked touchdown location can optionally be, e.g., at the location of the contact when the hold duration criteria is met, or some intermediate location. In this scenario, the data representing the touch input includes data representing the "fake" touchdown location and, in some embodiments, includes any subsequent movements of the contact. In this scenario, from the application's perspective, the user performed a touch input—such as a tap or swipe—that started at the "fake" touchdown location.

In some embodiments, providing a "fake" touchdown includes providing a "touchbegan" event (or touchdown event) for the contact (e.g., the application is provided with data representing an event that indicates that the contact was just detected on the touch-sensitive surface, even though the contact was not just detected on the touch-sensitive surface).

In some embodiments, the touchbegan event (or touchdown event) is generated by the an accessibility process running on the device that is different from a touch event process that is responsible for generating "real" touch events.

In some embodiments, the "fake" touch event generated by the accessibility process is indistinguishable from "real" touch events generated by the touch event process, so that the application does not need to be modified to be compatible with this accessibility feature.

In some embodiments, the data representing the touch input can optionally include the movement of the contact. For example, the touch input can optionally be represented by the data as a swipe or drag gesture.

Thus, as described above, the characteristics of the detected touch input are selectively represented by the data in an attempt to provide, to the application, data that represents a user's intended input, without necessarily representing the touch input exactly as it was detected. A person of skill in the art will recognize that there are many variations on which portions of a touch input can optionally be represented by the data to achieve this effect.

There are also multiple options for the timing at which the data is provided to the application. In some embodiments, the device provides the data representing the touch input to the application at the time when the hold duration criteria is met.

In some embodiments, the device provides the data to the application at the time when the duration of the contact exceeds the hold duration time period.

In some embodiments, the device provides the data to the application at the time when the device detects a lift-off of the contact from the touch-sensitive surface, after the hold duration criteria has been met. (As previously discussed, in response to detecting a lift-off of the contact before the hold-duration criteria is met—and thus before the contact has been maintained long enough for the touch input to be interpreted as intentional—the device does not provide any data representing the touch input to the application.)

In some embodiments, the device can enable and disable the hold duration setting in response to a user input. When the hold duration setting is enabled the device behaves as described above, and when the setting is disabled, the device operates in its usual mode; that is, typically without requiring a touch input to meet a set of hold duration criteria before providing data representing the touch input to the application.

In some embodiments, the device enables the hold duration setting in response to detecting a selection of an affordance in user interface, such as the user interface 612 depicted in FIG. 6G. In some embodiments, the hold duration time period can optionally be configured by a user via a user interface 612, as depicted in FIG. 6G.

In some embodiments, in response to detecting a request to enable the hold duration setting, the device adds an option for disabling the hold duration setting to a settings menu. In some embodiments, the device accesses the settings menu in response to a user input (such as a triple click on the home button, for example, or a selection of an icon). If there are no other items in the settings menu, then in response to detecting the user input associated with the settings menu, the device immediately disables the hold duration setting without displaying the settings menu. If there are other items in the settings menu, then the device displays the settings menu, which includes an affordance for disabling the hold duration setting.

In some embodiments, the device measures the duration of the contact with a timer that is initiated in response to detecting the touch input. In some embodiments, the device initiates the timer in response to detecting the touchdown of the contact.

Figure 6I:
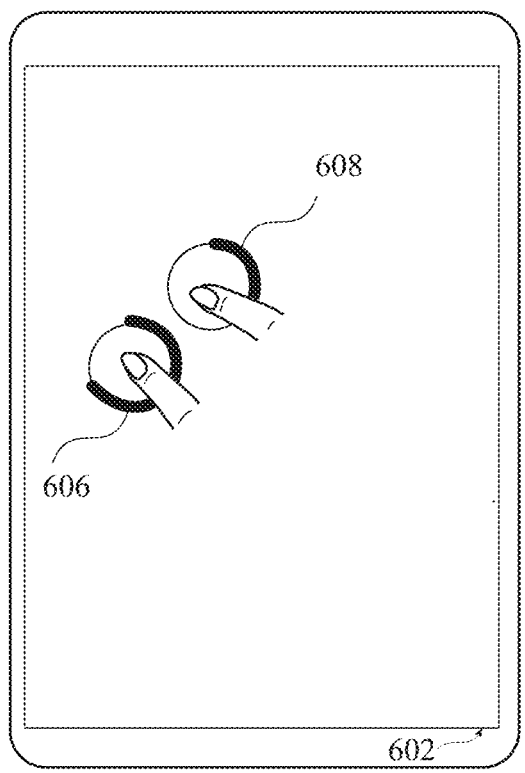

In some embodiments, in response to detecting a second touch input that includes a second contact on the touch-sensitive surface, the device initiates a second timer to measure the duration of the second contact. In some embodiments, as depicted in FIG. 6I, in response to detecting the second touch input, the device displays a second user interface element 610 as described earlier with respect to FIGS. 6A-6B. In some embodiments, a device displays the second user interface element 608 at the location of the second contact, and, optionally, includes a dynamic indication of the amount of time remaining before the second touch input exceeds the hold duration time period. In some embodiments, the set of hold duration criteria for the second contact can optionally be different from the set of hold duration criteria for the first contact. For example, the set of hold duration criteria for the second contact can optionally include a requirement that the duration of the second contact meets a hold duration time period that is different from the hold duration time period required for the first contact.

In some embodiments, in response to detecting the second touch input, the device changes a characteristic of the timer that is measuring the duration of the first touch input. For example, the device can optionally restart the timer, add more time to the timer, or stop the timer entirely such that the hold duration time period is never reached for the first touch input.

Figure 6J:
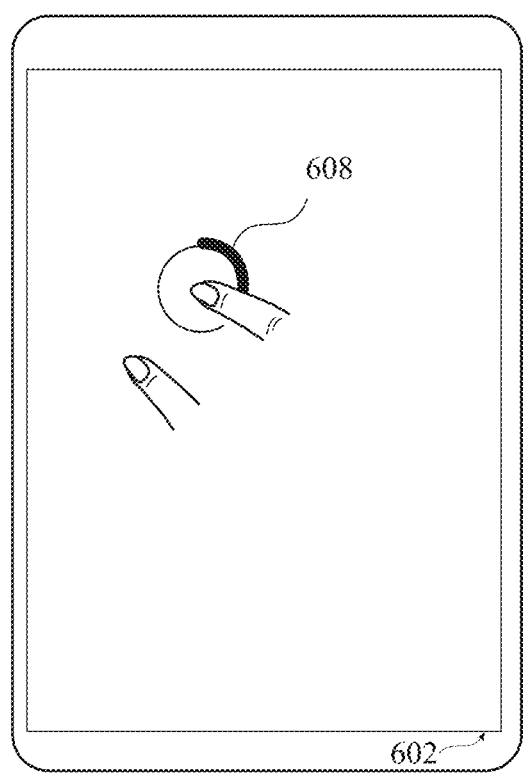

As depicted in FIG. 6J, in some embodiments, in response to detecting the second touch input, the device ceases to display the first user interface element.

In some embodiments, both the first touch input and the second touch input must meet a respective hold duration criteria before the device provides any data representing the first touch input and/or any data representing the second touch input to the application.

Figure 7A:
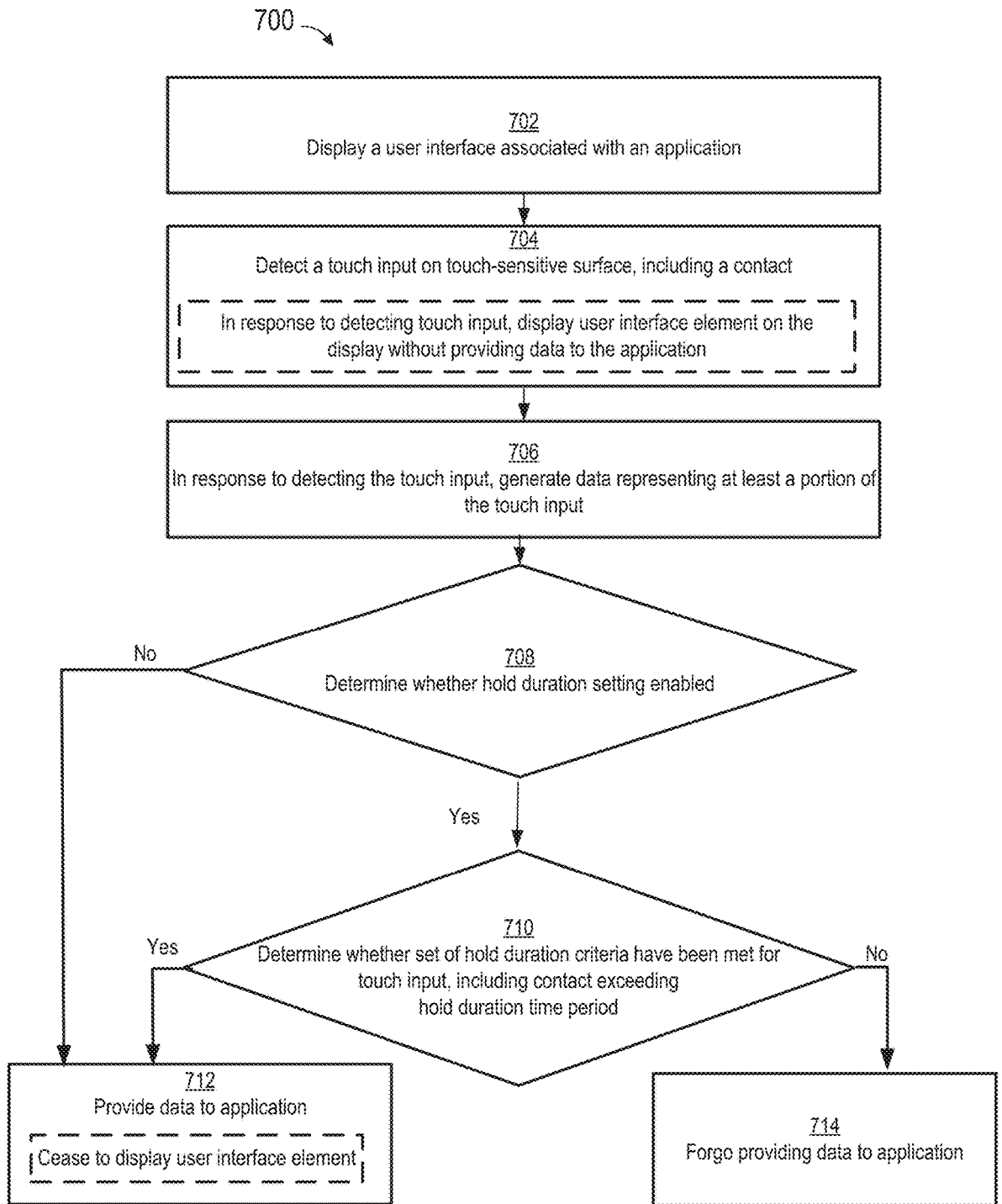
FIGS. 7A-7B are flow diagrams illustrating a process for providing touch accommodations in accordance with some embodiments.

FIG. 7A is a flow diagram illustrating a method for providing touch accommodations using an electronic device in accordance with some embodiments. Method 700 is performed at a device (e.g., 100, 300, 500) with a display and a touch-sensitive surface. Some operations in method 700 can optionally be combined, the order of some operations can optionally be changed, and some operations can optionally be omitted.

As described below, method 700 provides intuitive touch accommodations for users with tremors or other motor impairments. The method reduces the cognitive burden on a user by increasing the accuracy of touch inputs and reducing the frequency of unintended touch inputs, thereby creating a more efficient human-machine interface. For battery-operated computing devices, helping a user provide more accurate touch inputs enables more efficient use of touch-based user interfaces and fewer unwanted device responses, thereby conserving power and increasing the time between battery charges.

At block 702, the device displays, on the display (e.g., on touch screen 602), a user interface associated with an application. For example, FIG. 6A depicts the device displaying a user interface 604 associated with the Springboard application, while FIGS. 6D-6F depict the device displaying a user interface 610 for a mapping application.

At block 704, the device detects, on the touch-sensitive surface (e.g., on touch screen 602), a touch input including a contact on the touch-sensitive surface. For example, FIGS. 6A and 6D depict a touch input including a contact on touch screen 602. Optionally, in response to detecting the touch input, the device displays a user interface element without providing data to the application. For example, FIG. 6A depicts a user interface element 606 that the device can display in response to detecting a contact, and FIG. 6B depicts a user interface element 606 with a dynamic indication of the amount of time remaining 608 before the user interface element exceeds a predetermined time period, such as the hold duration time period.

At block 706, in response to detecting the touch input, the device generates data representing at least a portion of the touch input. At block 708, the device determines whether a hold duration setting is enabled. For example, FIG. 6G depicts a user interface for enabling the hold duration setting. In accordance with a determination that the hold duration setting is enabled, at block 710 the device determines whether a set of hold duration criteria have been met for the touch input. In accordance with a determination that the set of hold duration criteria have been met, at block 712 the device provides the data representing at least a portion of the touch input to the application. For example, after the set of hold duration criteria have been met, the device can provide data representing a single-tap input or other touch input to the Springboard application (FIG. 6A) or the mapping application (FIGS. 6D-6F).

Optionally, the device ceases to display the user interface element after the hold duration criteria have been met. For example, as shown in FIG. 6E, the device ceases to display the user interface element 606 depicted in FIG. 6D after the hold duration criteria have been met. In accordance with a determination that the set of hold duration criteria have not been met for the touch input, at block 714 the device forgoes providing any data representing the touch input to the application.

Figure 7B:
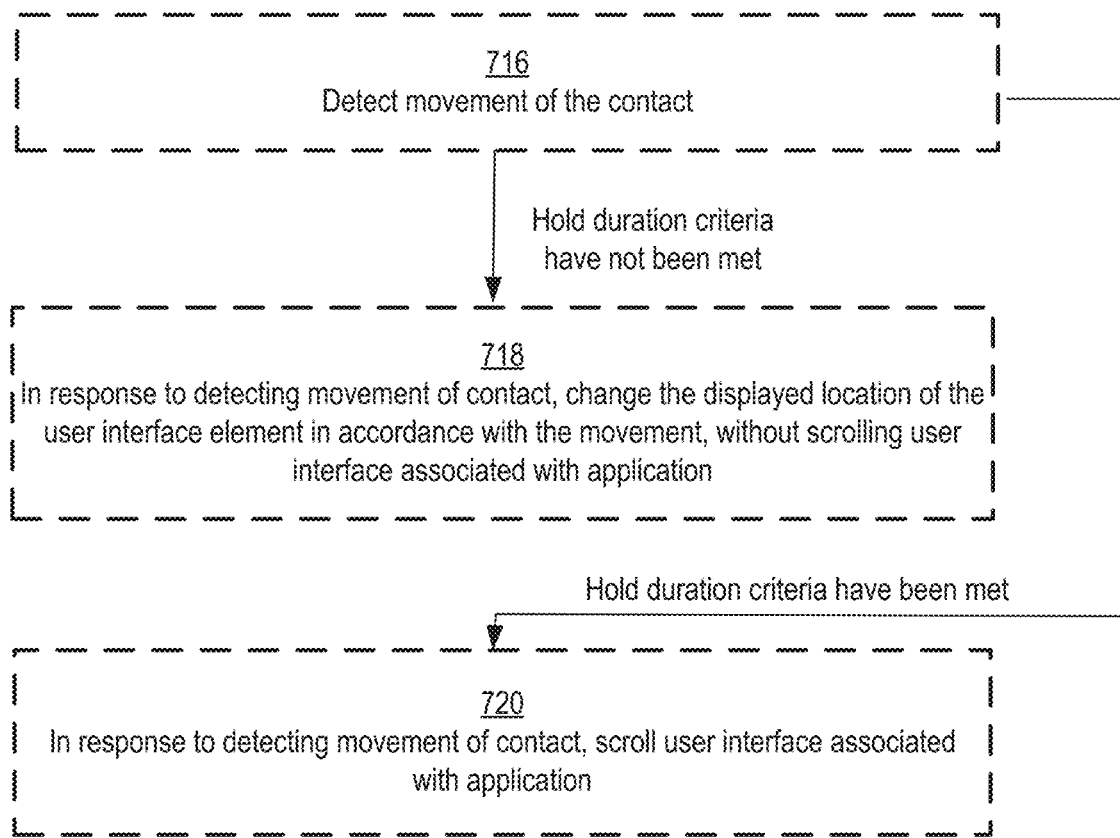

FIG. 7B is a flow diagram illustrating optional sub-processes of process 700 (FIG. 7A) that can optionally occur after detecting a touch input, in some embodiments. At block 716, the device detects a movement of the contact. At block 718, in response to detecting the movement of the contact, and in accordance with a determination that the set of hold duration criteria have not been met, the device changes the displayed location of the user interface element (e.g., user interface element 606) in accordance with the movement, without scrolling the user interface (e.g., user interface 604, 610) associated with the application. For example, FIGS. 6C and 6F depict a movement of the contact on touch screen 602 when the hold duration criteria have not been met, and in response to detecting the movement, the device changes the displayed location of the user interface element 606 to follow the movement of the contact. As shown in FIG. 6F, if the hold criteria have not been met, the device does not scroll the user interface 610 associated with the mapping application in response to detecting the movement.

At block 720, in response to detecting the movement of the contact, and in accordance with a determination that the hold duration criteria have been met, the device scrolls the user interface associated with the application. For example, FIG. 6E depicts the device scrolling the user interface 610 for the mapping application in response to detecting the movement of the contact after the hold duration criteria have been met.

Note that details of the processes described above with respect to method 700 (e.g., FIGS. 7A-7B) are also applicable in an analogous manner to the methods described below. For example, methods 1000 and 1300 can optionally include one or more of the characteristics of the various methods described above with reference to method 700. Additionally, it should be noted that details of other processes described herein with respect to other methods described herein (e.g., methods 1000 and 1300) are also applicable in an analogous manner to method 700 described above with respect to FIGS. 7A-7B. For example, the touch inputs, contacts, user interface elements, user interfaces, settings, and criteria described above with reference to method 700 optionally have one or more of the characteristics of the touch inputs, contacts, user interface elements, user interfaces, settings, and criteria described herein with reference to other methods described herein (e.g., methods 1000 and 1300).

Figure 8:
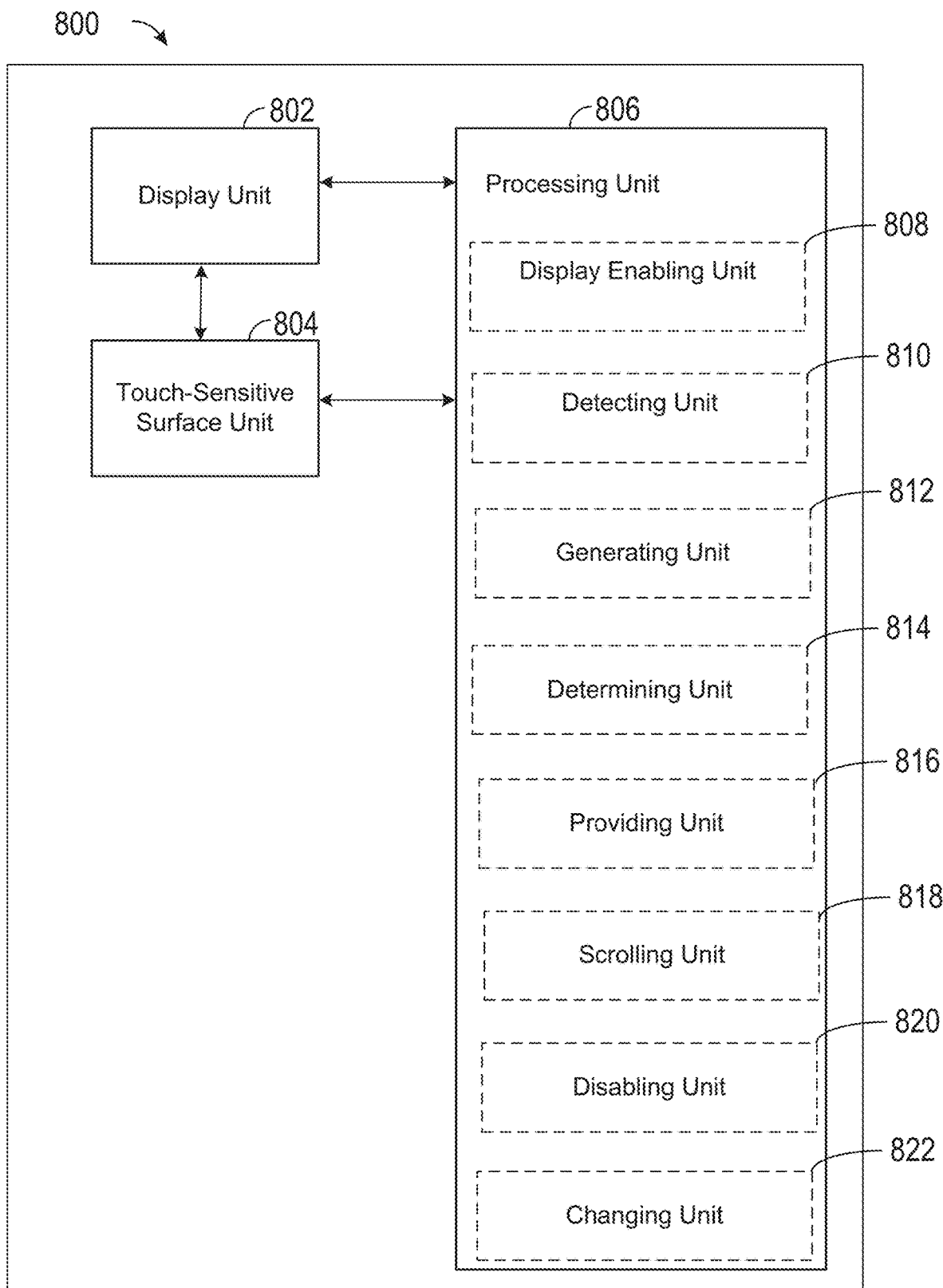
FIG. 8 illustrates a functional block diagram of an electronic device in accordance with some embodiments.

FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 configured to display a user interface associated with an application, a touch-sensitive surface unit 804 configured to receive touch inputs, and a processing unit 806 coupled to the display unit 802 and the touch-sensitive surface unit 804. In some embodiments, the processing unit 806 includes a display enabling unit 808, a detecting unit 810, a generating unit 812, a determining unit 814, a providing unit 816, a scrolling unit 818, a disabling unit 820, and a changing unit 822.

The processing unit 806 is configured to: enable display (e.g., using display enabling unit 808) of a user interface associated with an application on the display unit 802, and detect (e.g., using detecting unit 810), on the touch-sensitive surface unit 804, a first touch input on the touch-sensitive surface unit, including a first contact on the touch-sensitive surface unit. The processing unit 806 is further configured to, in response to detecting the first touch input, generate data (e.g., using generating unit 812) representing at least a portion of the first touch input. The processing unit 806 is further configured to, in accordance with a determination that a hold duration setting is enabled, determine (e.g., using determining unit 814) whether a set of one or more hold duration criteria have been met for the first touch input, wherein the hold duration criteria are based on a hold duration time period that corresponds to the hold duration setting, and in accordance with a determination that the set of one or more hold duration criteria have been met for the first touch input, wherein the hold duration criteria include a hold duration criterion that is met when a duration of the first contact exceeds the hold duration time period, the processing unit 806 is further configured to provide (e.g., using providing unit 816) the data representing at least a portion of the first touch input to the application. In some embodiments, the processing unit 806 is further configured to, in accordance with a determination that the set of one or more hold duration criteria have not been met, forgo providing the data representing at least a portion of the first touch input to the application.

In some embodiments, detecting the first touch input includes detecting a touchdown of the first contact on the touch-sensitive surface unit 804.

In some embodiments, detecting the first touch input includes detecting a movement of the first contact across the touch-sensitive surface unit 804.

In some embodiments, the first touch input is detected when the touchdown of the first contact is detected on the touch-sensitive surface unit 804.

In some embodiments, the data is provided to the application when the hold duration criteria are first met.

In some embodiments, the data is provided to the application in response to detecting a liftoff of the first contact from the touch-sensitive surface unit 804.

In some embodiments, the data provided to the application includes an indication of a location, on the touch-sensitive surface unit 804, of the touchdown of the first contact.

In some embodiments, the data provided to the application includes an indication of a final location, on the touch-sensitive surface unit 804, of the first contact.

In some embodiments, the final location is associated with the location, on the touch-sensitive surface unit 804, where a liftoff of the first contact is detected from the touch-sensitive surface unit 804.

In some embodiments, the final location is associated with a location of the first contact, on the touch-sensitive surface unit 804, when the hold duration criteria is met.

In some embodiments, the data provided to the application does not include an indication of the movement of the first contact across the touch-sensitive surface unit 804.

In some embodiments, the processing unit 806 is further configured to, in response to detecting the first touch input and in accordance with a determination that the hold duration setting is enabled, while the first contact continues to be detected on the touch-sensitive surface unit 804, enable display (e.g., using display enabling unit 808) a first user interface element, on display unit 802, at a location on the display unit that is associated with the location of the first contact on the touch-sensitive surface unit 804, without providing any data representing the first touch input to the application, wherein the first user interface element is not associated with the application.

In some embodiments, the first user interface element is displayed in response to detecting the touchdown, on the touch-sensitive surface unit 804, of the first contact.

In some embodiments, the processing unit 806 is further configured to, in accordance with a determination that the hold duration criteria has been met, cease to enable display of the first user interface element.

In some embodiments, the processing unit 806 is further configured to, in response to detecting a movement of the first contact, and in accordance with a determination that the hold duration criteria have been met, scroll (e.g., using scrolling unit 818) the user interface of the application in accordance with the movement.

In some embodiments, the processing unit 806 is further configured to, in response to detecting the movement of the first contact, and in accordance with a determination that the hold duration criteria have not been met, change the displayed location (e.g., using display enabling unit 808) of the first user interface element, on the display unit 802, in accordance with the movement of the first contact without scrolling the user interface of the application based on the movement.

In some embodiments, the first user interface element is a circle.

In some embodiments, the first user interface element includes a dynamic indication of a time remaining until the duration of the contact exceeds the hold duration time period.

In some embodiments, the processing unit is further configured to, while the first contact continues to be detected on the touch-sensitive surface unit and before the hold duration criteria is met for the first touch input, detect (e.g., using detecting unit 810), on the touch-sensitive surface unit 804, a second touch input including a second contact on the touch-sensitive surface unit, and in response to detecting the second touch input, generate data (e.g., using generating unit 812) representing at least a portion of the second touch input. In some embodiments, the processing unit 806 is further configured to, in accordance with a determination that the hold duration setting is enabled, determine (e.g., using determining unit 814) whether a second set of one or more hold duration criteria have been met for the second touch input, wherein the hold duration criteria are based on the hold duration time period. In some embodiments, the processing unit 806 is further configured to, in accordance with a determination that the second set of one or more hold duration criteria have been met for the second touch input, wherein the hold duration criteria include a hold duration criterion that is met when a duration of the second contact exceeds the hold duration time period, provide (e.g., using providing unit 816) the data representing at least a portion of the second contact to the application. In some embodiments, the processing unit 806 is further configured to, in accordance with a determination that the second set of one or more hold duration criteria have not been met, forgo providing the data representing at least a portion of the second touch input to the application.

In some embodiments, the duration of the contact is measured by a timer that is initiated in response to detecting the first touch input, and the processing unit 806 is further configured to, in response to detecting the second touch input, change (e.g., using changing unit 822) a characteristic of the timer.

In some embodiments, changing the characteristic of the timer includes stopping the timer.

In some embodiments, the processing unit 806 is further configured to, further in response to detecting the second touch input and before the hold duration criteria is met for the second touch input, while the second contact continues to be detected, enable display (e.g., using display enabling unit 808) of a second user interface element, on the display unit 802, at a location on the display unit that is associated with the location of the second contact on the touch-sensitive surface unit 804, without providing any data representing the second touch input to the application, wherein the second user interface element is not associated with the application.

In some embodiments, the processing unit 806 is further configured to, further in response to detecting the second touch input, cease to enable display of the first user interface element on the display unit 802.

In some embodiments, the hold duration setting is enabled in response to detecting a user request.

In some embodiments, the hold duration time period is configured by a user.

In some embodiments, enabling the hold duration setting causes an option for disabling the hold duration setting to be automatically added as an item in a settings menu.

In some embodiments, the processing unit 806 is further configured to, while the hold duration setting is enabled, detect (e.g., using detecting unit 810) a user input, and in response to detecting the user input, determine (e.g., using determining unit 814) whether the settings menu includes at least two items, including the option for disabling the hold duration setting. The processing unit 806 is further configured to, in accordance with a determination that the settings menu does not include at least two items, disable (e.g., using disabling unit 820) the hold duration setting; and in accordance with a determination that the settings menu includes at least two items, enable display (e.g., using display enabling unit 808) of a user interface including a hold-duration affordance associated with the hold duration setting.

In some embodiments, the processing unit 806 is further configured to detect (e.g., using detecting unit 810) a selection of the hold-duration affordance; and in response to detecting the selection of the hold-duration affordance, disable (e.g., using disabling unit 820) the hold-duration setting.

In some embodiments, the application is an active application.

In some embodiments, the processing unit is further configured to, after detecting a liftoff of the contact (e.g., using detecting unit 810), detect a third touch input on the touch-sensitive surface unit 804, including a third contact on the touch-sensitive surface unit. In some embodiments, the processing unit 806 is further configured to, in response to detecting the third touch input, generate (e.g., using generating unit 812) third data representing at least a portion of the third touch input. In some embodiments, the processing unit 806 is further configured to, in accordance with a determination that an ignore-repeat duration setting is enabled, determine (e.g., using determining unit 814) whether the third touch input meets a set of one or more ignore-repeat criteria based on an ignore-repeat duration time period that corresponds to the ignore-repeat duration setting. In some embodiments, the processing unit 806 is further configured to, in accordance with a determination that the third touch input meets the set of one or more ignore-repeat criteria, which include a criterion that is met when an amount of time between the first touch input and the third touch input is less than the ignore-repeat duration time period, forgo providing the third data to the application, and in accordance with a determination that the third touch input does not meet the set of one or more ignore-repeat criteria, determine (e.g., using determining unit 814) whether a third set of one or more hold duration criteria have been met for the third touch input, wherein the hold duration criteria are based on a hold duration time period that corresponds to the hold duration setting. In some embodiments, the processing unit 806 is further configured to, in accordance with a determination that the third set of one or more hold duration criteria have been met for the third touch input, wherein the hold duration criteria include a hold duration criterion that is met when a duration of the third contact exceeds the hold duration time period, provide (e.g., using providing unit 816) the third data to the application, and in accordance with a determination that the third set of one or more hold duration criteria have not been met, forgo providing the third data to the application.

In some embodiments, the processing unit 806 is further configured to, further in accordance with a determination that the third touch input does not meet the set of one or more ignore-repeat criteria, and in response to detecting the third touch input, enable display (e.g., using display enabling unit 808), on the display unit 802, of a third user interface element, wherein the third user interface element is not associated with the application.

In some embodiments, the amount of time between the first touch input and the third touch input is measured from the time at which the contact first meets the hold duration criteria to the time at which a touchdown of the third contact, on the touch-sensitive surface unit 804, is detected.

In some embodiments, the amount of time between the first touch input and the third touch input is measured from the time at which the liftoff of the contact, from the touch-sensitive surface unit 804, is detected to the time at which a touchdown of the third contact, on the touch-sensitive surface unit, is detected.

In some embodiments, the processing unit 806 is further configured to, in accordance with a determination that the hold-duration setting is enabled and the ignore-repeat setting is enabled, enable display (e.g., using display enabling unit 808), on the display unit 802, of an indication that touch accommodation settings are on and instructions for disabling touch accommodation settings.

In some embodiments, the indication is displayed in response to detecting the third touch input and in accordance with a determination that the third touch input meets the set of one or more ignore-repeat criteria.

In some embodiments, detecting the first touch input includes detecting a touchdown of the contact at a first location on the touch-sensitive surface unit 804, movement of the contact across the touch-sensitive surface unit, and liftoff of the contact from the touch-sensitive surface unit at a second location on the touch-sensitive surface unit that is different from the first location on the touch-sensitive surface unit, and the processing unit 806 is further configured to, following a determination that the set of one or more hold duration criteria have been met for the first contact, and in accordance with a determination that a set of one or more tap-assistance criteria have been met, provide (e.g., using providing unit 816), to the application, data representing a touch input at a single location on the touch-sensitive surface, and in accordance with a determination that the set of one or more tap-assistance criteria have not been met, provide (e.g., using providing unit 816), to the application, data representing the first touch input including the movement of the contact.

In some embodiments, the tap-assistance criteria include a criterion that a tap-assistance mode is enabled.

In some embodiments, the tap-assistance criteria include a tap-timeout duration criterion that is met when the duration of the contact does not exceed a tap-timeout duration time period.

In some embodiments, the data representing the first touch input is associated with the location, on the touch-sensitive surface unit 804, of the touchdown of the contact.

In some embodiments, the data representing the first touch input is associated with the location, on the touch-sensitive surface unit 804, of a final location of the first contact.

In some embodiments, the processing unit 806 is further configured to, after detecting liftoff of the first contact, detect (e.g., using detecting unit 810), on the touch-sensitive surface unit 804, a fourth touch input on the touch-sensitive surface unit including a fourth contact on the touch-sensitive surface unit, and in response to detecting the fourth touch input, generate (e.g., using generating unit 812) fourth data representing at least a portion of the fourth touch input. In some embodiments, the processing unit 806 is further configured to, in accordance with a determination that an ignore-repeat duration setting is enabled, determine (e.g., using determining unit 814) whether the fourth touch input meets a set of one or more ignore-repeat criteria based on an ignore-repeat duration time period that corresponds to the ignore-repeat duration setting, and in accordance with a determination that the fourth touch input meets the set of one or more ignore-repeat criteria, which include a criterion that is met when an amount of time between the first touch input and the fourth touch input is less than the ignore-repeat duration time period, forgo providing the fourth data to the application, and in accordance with a determination that the fourth touch input does not meet the set of one or more ignore-repeat criteria, provide (e.g., using providing unit 816) the fourth data to the application.

The operations described above with reference to FIGS. 7A-B are, optionally, implemented by components depicted in FIGS. 1A-1B or FIG. 8. For example, detecting operation 702, determining operations 704, 710, and providing operation 712 can optionally be implemented by operating system 126, event sorter 170, event recognizer 180, and/or event handler 190. Event monitor 171 in event sorter 170 can optionally detect a touch input on touch-sensitive display 112, and event dispatcher module 174 can optionally deliver the event information to operating system 126. A respective event recognizer 180 of operating system 126 can optionally compare the event information to respective event definitions 186, and determine whether the hold duration setting is enabled, and if so, whether the touch input triggers a predefined event or sub event, such as the touch input meeting a set of hold duration criteria. Event handler 190 can optionally provide data representing the touch input to an application (e.g., 137-147). Similarly, it would be clear to a person having ordinary skill in the art how other processes can be implemented based on the components depicted in FIGS. 1A-1B or FIG. 8.

Ignore-Repeat Option

Some users with tremors or other motor difficulties may accidentally perform multiple sequential touch inputs (e.g., multiple taps) on a touch-sensitive surface when intending to perform only a single touch input (e.g., a single tap or swipe). In some embodiments, a device (e.g., device 100, 300, 500) with a touch-sensitive surface includes an ignore-repeat setting that, when enabled, selectively suppresses a touch input that is detected very shortly after a previous touch input, thus filtering out unintentional secondary touch inputs that may occur due to fine-motor recoil.

In some embodiments, while the device is displaying a user interface associated with an application, the device detects a first touch input on the touch-sensitive surface, including a first contact with the touch-sensitive surface. In some embodiments, in response to detecting this first touch input, the device provides data representing the first touch input to the application. In response to detecting a subsequent (second) touch input, the device determines whether the second touch input meets ignore-repeat criteria. Such ignore repeat criteria includes a criterion that is met when the second touch input is detected too soon after the first touch input; e.g., when the amount of time between the first touch input and the second touch input is less than a predetermined ignore-repeat duration time period. The ignore-repeat duration time period can optionally be 0.25 seconds, 0.5 seconds, 1 second, 2 seconds, 3 seconds, 4 seconds, or 5 seconds, for example, or another value in that range.

If the second touch input meets the ignore-repeat criteria (that is, it is detected within a short time period after the first touch input), it is interpreted as an unintentional repeat input and is ignored; the device does not provide, to the application, any data representing the second touch input. In this scenario, the application behaves as it would in the absence of the second touch input, since the application does not receive any indication that a second touch input was detected.

If the second touch input does not meet the ignore-repeat criteria (e.g., the second touch input was detected after a longer period of time relative to the first touch input), the device provides data representing the second touch input to the application. In this case, the second touch input is interpreted as an intentional touch input rather than as an unintentional repeat.

In some embodiments, the device measures the amount of time between the first touch input and the second touch input with respect to the touchdown of the first contact on the touch-sensitive surface. In some embodiments, the device measures the amount of time between the first touch input and the second touch input with respect to the liftoff of the first contact from the touch-sensitive surface. In some embodiments, the device measures the amount of time between the first touch input and the second touch input with respect to the touchdown of the second contact on the touch-sensitive surface. In some embodiments, the amount of time between the first touch input and the second touch input is measured with respect to the liftoff of the second contact from the touch-sensitive surface. Thus, the ignore repeat duration can be determined with respect to the beginning or ending of the first and/or second touch input.

In some embodiments, unlike the approach described earlier with respect to FIGS. 6A-F and 6I-J, the device does not display a user interface element associated in response to detecting either the first touch input or the second touch input, regardless of whether the ignore-repeat setting is enabled or whether the ignore-repeat criteria are met. That is, the device displays the user interface associated with the application, but does not display a user interface element associated with the software layer responsible for filtering the touch inputs.

In some embodiments, when the ignore-repeat duration settings is enabled, each touch input must not meet the ignore-repeat duration criteria (that is, it must not be interpreted as an unintentional repeat input that should be ignored) in order to be provided to the application. For example, in some embodiments, if the device detects a third touch input after the first and second touch inputs, the device determines whether the third touch input meets the ignore-repeat criteria, and only provides data representing the third touch input to the application if the third touch input does not meet the ignore-repeat duration criteria. In this case, the ignore-repeat duration criteria for the third touch input optionally includes a requirement that the amount of time between the third touch input and a previous touch input (which can be either the first or second touch input, depending on the embodiment) is less than the ignore-repeat duration. Thus, in some embodiments, the third touch input must be detected after the ignore-repeat duration time period, relative to a previous touch input, to be accepted and provided to the application.

In some cases, a user may wish to provide a double-tap touch input while the ignore-repeat touch accommodation is enabled. Because the second tap of the double-tap input would typically be ignored when the ignore-repeat setting is enabled, in some embodiments, the device may provide an alternative option for performing a double-tap input.

Figure 9A:
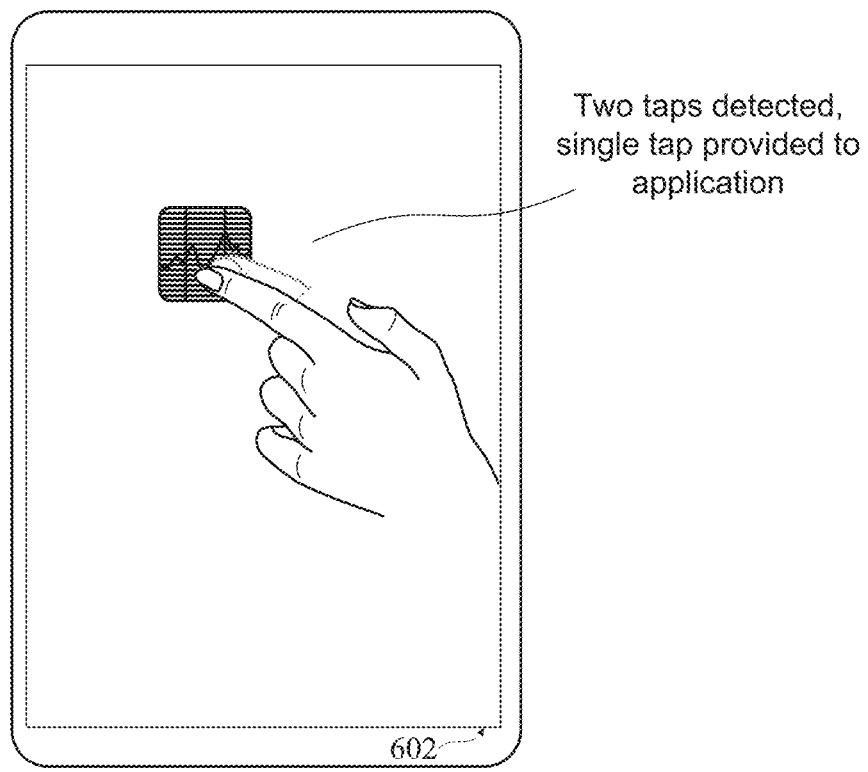
FIGS. 9A-9C illustrate exemplary touch accommodations user interfaces in accordance with some embodiments.
Figure 9B:
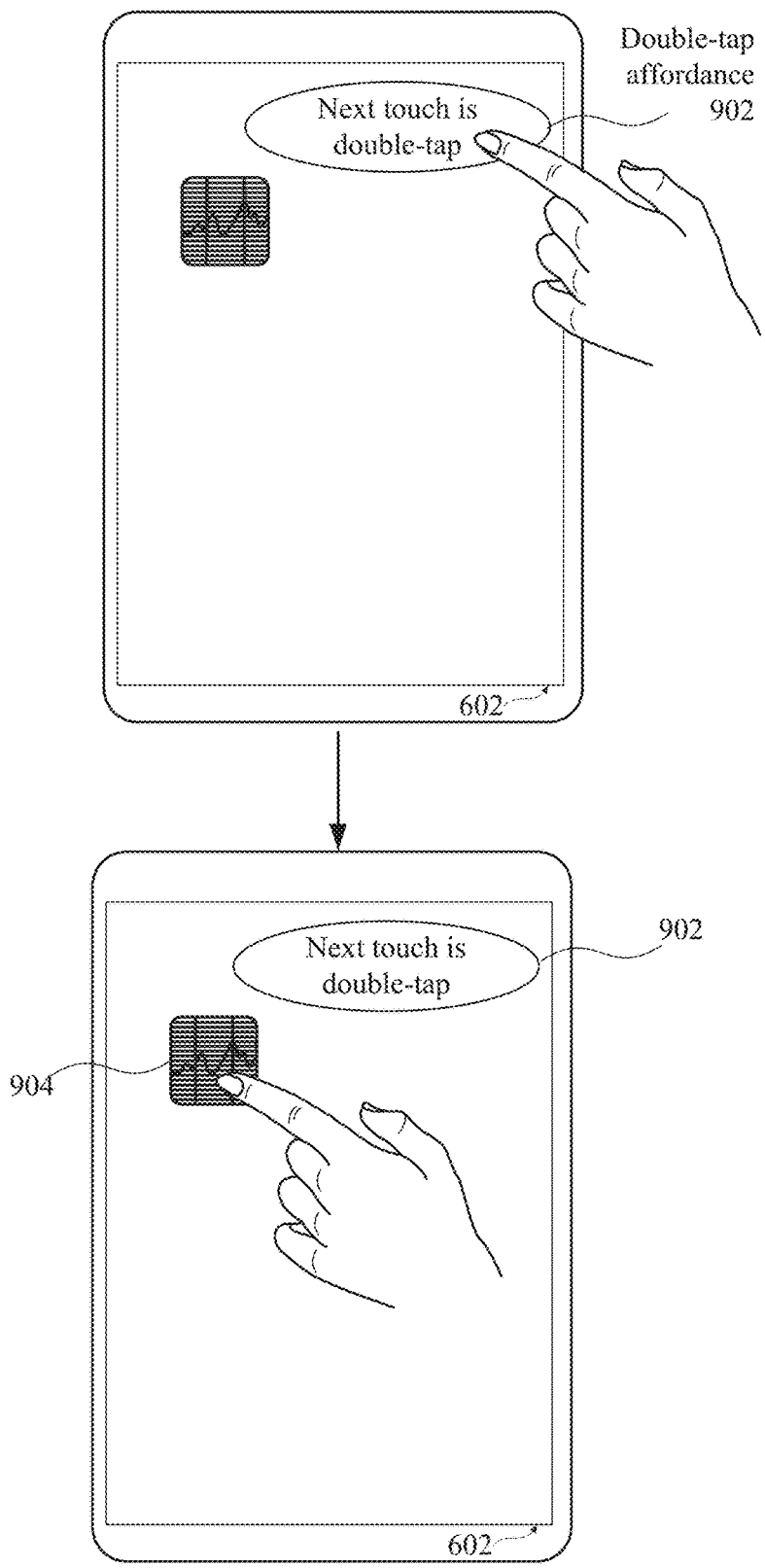

As depicted in FIG. 9B, in some embodiments, the device displays a double-tap affordance 902 for performing a double-tap input while the ignore-repeat setting is enabled. In response to detecting a selection of the double-tap affordance 902, the device interprets the next touch input as a double-tap input. That is, in response to detecting the next touch input on touch screen 602, the device provides, to the application, data representing a double-tap input at the location of the next touch input. The next touch input may be a single tap, for example, or a swipe or flick on touch screen 602. The location of the next touch input may be on an icon 904 associated with the application, for example, or on the double-tap affordance, or elsewhere on the touch screen.

In some embodiments, the device can reposition the double-tap affordance in response to detecting a dragging contact on the touch-sensitive surface from the initial location of the double-tap affordance to a new location, thereby potentially uncovering portions of the user interface associated with the application that were occluded by the affordance.

Figure 9C:
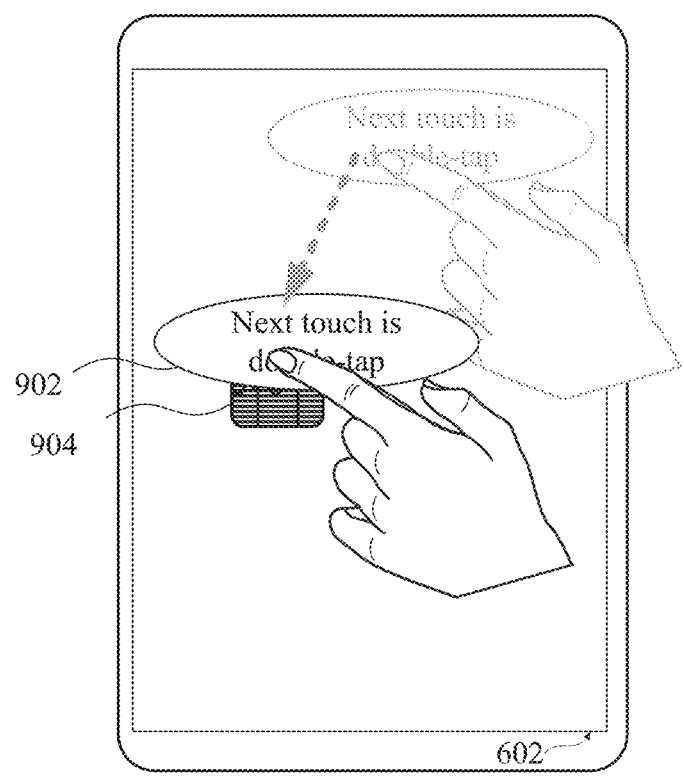

In some embodiments, as depicted in FIG. 9C, in response to detecting a drag contact from the initial display location of the double-tap affordance 902 to the location of an icon 904, the device can move the displayed location of the double-tap affordance 902 over an icon 904. In response to detecting a selection (e.g., a single tap) of the double-tap affordance 902 over the icon 904, the device can provide, to the application, data representing a double-tap input on the icon.

In some embodiments, the device can enable and disable the ignore-repeat setting in response to a user input. When the ignore-repeat setting is enabled the device behaves as described above, and when the setting is disabled, the device operates in its usual mode; that is, without requiring a touch input to not meet a set of ignore-repeat criteria before providing data representing the touch input to the application. In some embodiments, the device enables the ignore-repeat setting in response to detecting a selection of an affordance in a user interface, such as user interface 612 depicted in FIG. 6G.

In some embodiments, the ignore-repeat time period can optionally be configured by a user via a user interface such as user interface 612 depicted in FIG. 6G.

Figure 10:
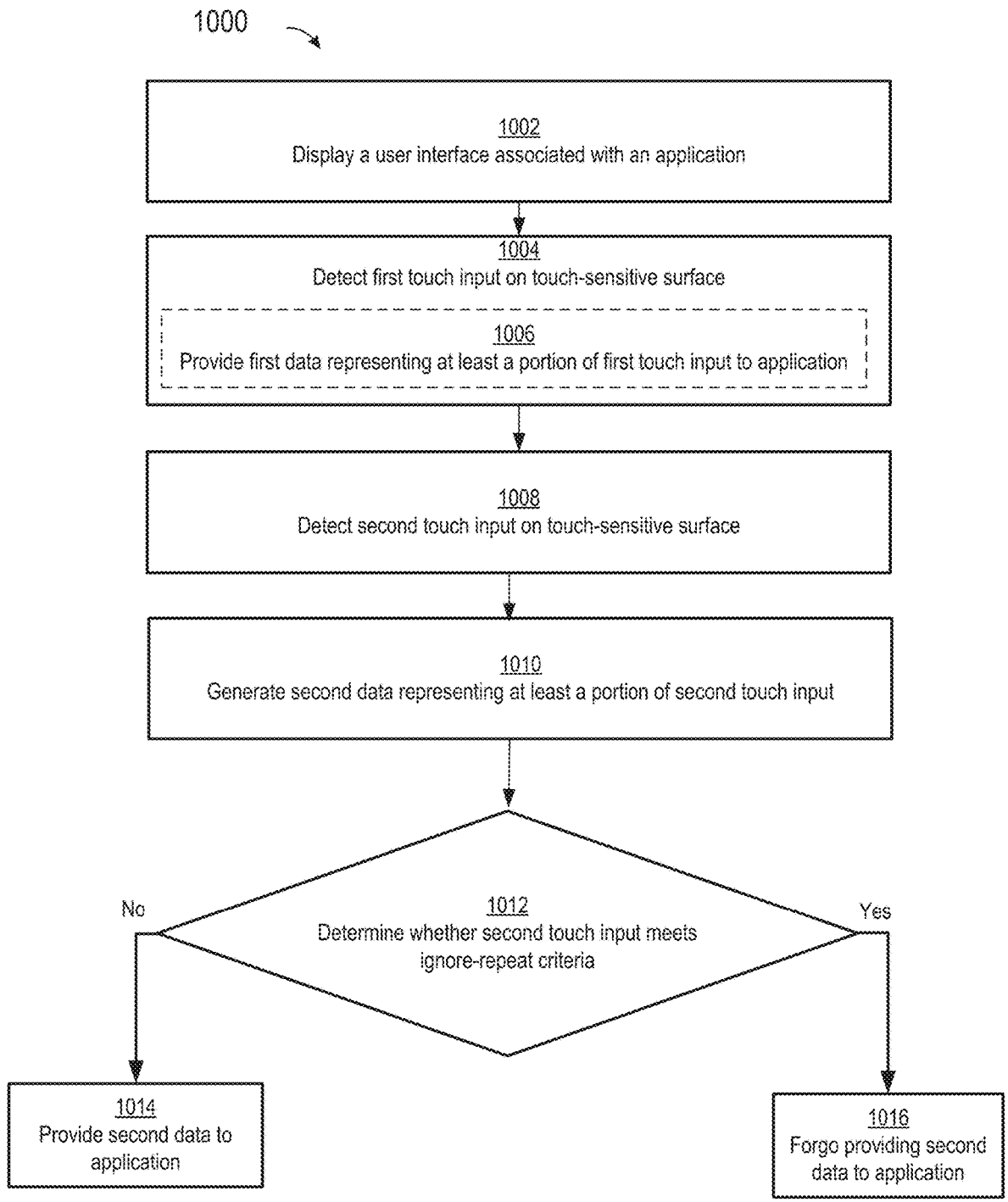
FIG. 10 is a flow diagram illustrating a process for providing touch accommodations in accordance with some embodiments.

FIG. 10 is a flow diagram illustrating a method for providing touch accommodations using an electronic device in accordance with some embodiments. Method 1000 is performed at a device (e.g., 100, 300, 500) with a display and a touch-sensitive surface. Some operations in method 1000 can optionally be combined, the order of some operations can optionally be changed, and some operations can optionally be omitted.

As described below, method 1000 provides intuitive touch accommodations for users with tremors or other motor impairments. The method reduces the cognitive burden on a user by increasing the accuracy of touch inputs and reducing the frequency of unintended touch inputs, thereby creating a more efficient human-machine interface. For battery-operated computing devices, helping a user provide more accurate touch inputs enables more efficient use of touch-based user interfaces and fewer unwanted device responses, thereby conserving power and increasing the time between battery charges.

At block 1002, the device displays, on the display (e.g. touch screen 602), a user interface associated with an application. For example, FIG. 6A depicts the device displaying a user interface 604 associated with the Springboard application, while FIGS. 6D-6F depict the device displaying a user interface 610 associated with a mapping application. At block 1004, the device detects a first touch input on the touch-sensitive surface. For example, the first touch input may be a tap or swipe on touch screen 602. Optionally, at block 1006, the device provides first data representing at least a portion of the first touch input to the application.

At block 1008, the device detects a second touch input on the touch-sensitive surface. For example, the second touch input may be a tap or swipe on touch screen 602. At block 1010, in response to detecting the second touch input, the device generates second data representing at least a portion of the second touch input.

At block 1012, the device determines whether the second touch input meets ignore-repeat criteria, including a criterion that is met when the amount of time between the first touch input and the second touch input is less than the ignore-repeat duration time period, as previously described.

If the second touch input does not meet the ignore-repeat criteria, then at block 1014, the device provides the second data to the application. Thus, as previously discussed, if the second touch input is detected at a sufficiently long time after the first touch input is detected (e.g., the second touch input does not meet the ignore-repeat criteria), then the device interprets the second touch input as an intentional input, and provides data representing the second touch to the application.

If the second touch input does meet the ignore-repeat criteria, however, then at block 1016, the device forgoes providing the data representing the second touch input to the application. For example, as depicted in FIG. 9A, if the device detects two taps on touch screen 602, and the second tap occurs very soon after the first tap (e.g., the second tap meets the ignore-repeat criteria), then the second tap is ignored and the device does not provide any data representing the second tap to the application.

Note that details of the processes described above with respect to method 1000 (e.g., FIG. 10) are also applicable in an analogous manner to the methods described above and/or below. For example, methods 700 and/or 1300 can optionally include one or more of the characteristics of the various methods described above with reference to method 1000. Additionally, it should be noted that details of other processes described herein with respect to other methods described herein (e.g., methods 700 and 1300) are also applicable in an analogous manner to method 1000 described above with respect to FIG. 10. For example, the touch inputs, contacts, user interface elements, user interfaces, settings, and criteria described above with reference to method 700 optionally have one or more of the characteristics of the touch inputs, contacts, user interface elements, user interfaces, settings, and criteria described herein with reference to other methods described herein (e.g., methods 700 and 1300).

Figure 11:
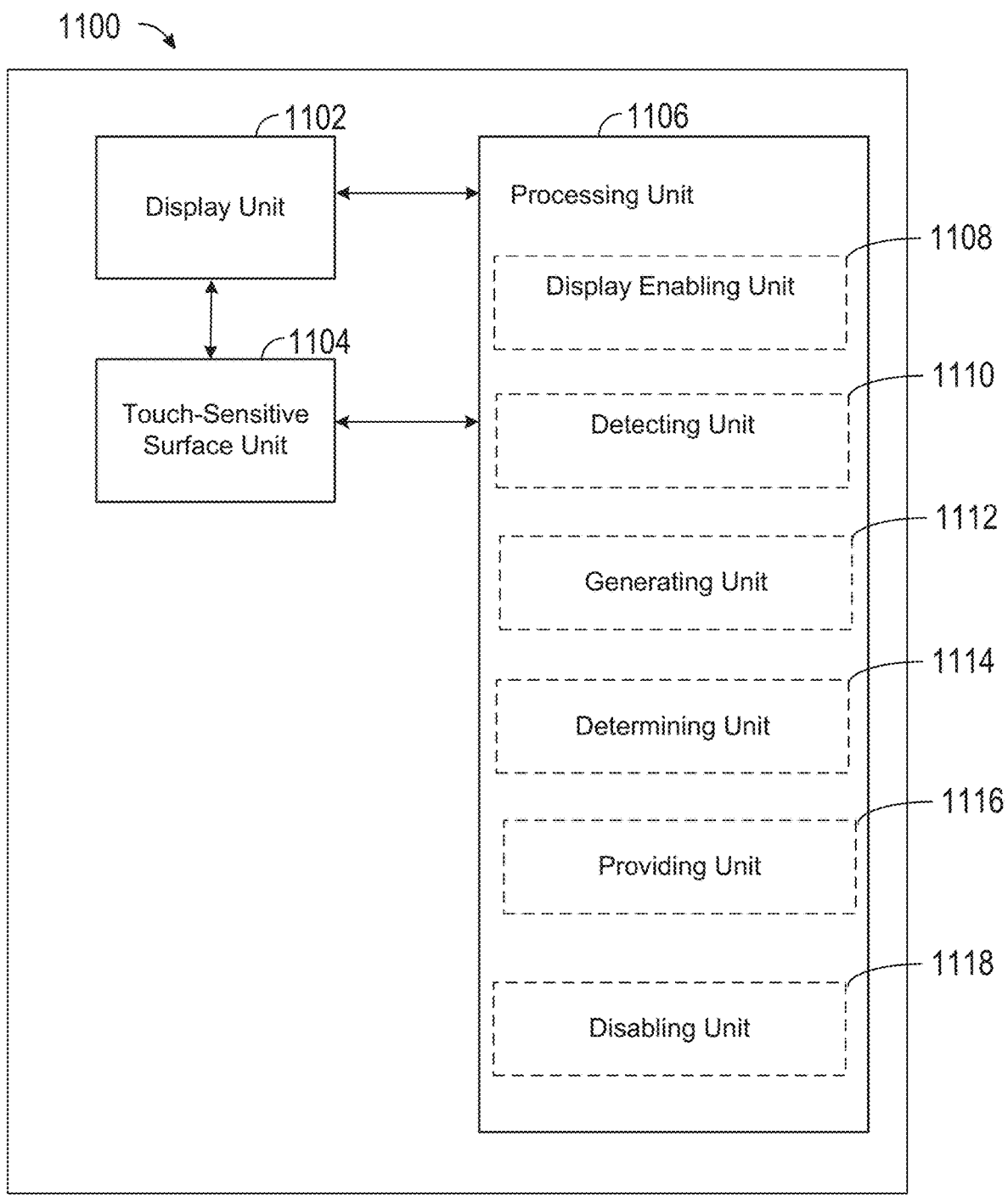
FIG. 11 illustrates a functional block diagram of an electronic device in accordance with some embodiments.

FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a user interface associated with an application, a touch-sensitive surface unit 1104 configured to receive touch inputs, and a processing unit 1106 coupled to the display unit 1102 and the touch-sensitive surface unit 1104. In some embodiments, the processing unit 1106 includes a display enabling unit 1108, a detecting unit 1110, a generating unit 1112, a determining unit 1114, and a providing unit 1116.

The processing unit 1106 is configured to: enable display (e.g., using display enabling unit 1108), on the display unit 1102, of a user interface associated with an application; detect (e.g., using detecting unit 1110), on the touch-sensitive surface unit 1104, a first touch input on the touch-sensitive surface unit including a first contact with the touch-sensitive surface unit; after detecting the first touch input, detect (e.g., using detecting unit 1110), on the touch-sensitive surface unit 1104, a second touch input on the touch-sensitive surface unit including a second contact with the touch-sensitive surface unit; and in response to detecting the second touch input, generate (e.g., using generating unit 1112) second data representing at least a portion of the second touch input. The processing unit 1106 is further configured to, in accordance with a determination that an ignore-repeat duration setting is enabled, determine (e.g., using determining unit 1114) whether the second touch input meets a set of one or more ignore-repeat criteria based on an ignore-repeat duration time period that corresponds to the ignore-repeat duration setting. The processing unit 1106 is further configured to, in accordance with a determination that the second touch input meets the set of one or more ignore-repeat criteria, which include a criterion that is met when the amount of time between the first touch input and the second touch input is less than the ignore-repeat duration time period, forgo providing the second data to the application. The processing unit 1106 is further configured to, in accordance with a determination that the second touch input does not meet the set of one or more ignore-repeat criteria, provide (e.g., using providing unit 1116) the second data to the application.

In some embodiments, the processing unit 1106 is further configured to, in response to detecting the first touch input, provide (e.g., using providing unit 1116) first data representing at least a portion of the first touch input to the application.

In some embodiments, the amount of time between the first touch input and the second touch input is measured starting from the time at which a liftoff of the first contact is detected.

In some embodiments, the amount of time between the first touch input and the second touch input is measured ending at the time at which a touchdown of the second contact is detected.

In some embodiments, the processing unit 1106 does not enable display, in response to detecting the second touch input, a user interface element indicating detection of the second touch input, prior to providing the data representing at least a portion of the second touch input to the application.

In some embodiments, the second touch input is a tap on the touch-sensitive surface.

In some embodiments, the processing unit 1106 is further configured to, after determining that the second touch input meets the set of one or more ignore-repeat criteria, detect (e.g., using detecting unit 1110), on the touch-sensitive surface unit 1104, a third touch input on the touch-sensitive surface unit, and in response to detecting the third touch input, generate (e.g., using generating unit 1112) third data representing at least a portion of the third touch input. In some embodiments, the processing unit 1106 is configured to, in accordance with a determination that the ignore-repeat duration setting is enabled, determine (e.g., using determining unit 1114) whether the third touch input meets a second set of one or more ignore-repeat criteria based on the ignore-repeat duration time period. In some embodiments, the processing unit 1106 is further configured to, in accordance with a determination that the third touch input meets the second set of one or more ignore-repeat criteria, which include a criterion that is met when the amount of time between the third touch input and at least a portion of a previous touch input is less than the ignore-repeat duration time period, forgo providing the third data to the application. In some embodiments, the processing unit 1106 is further configured to, in accordance with a determination that the third touch input does not meet the second set of one or more ignore-repeat criteria, provide (e.g., using providing unit 1116) the third data to the application.

In some embodiments, the previous touch input is the first touch input.

In some embodiments, the previous touch input is the second touch input.

In some embodiments, the processing unit 1106 is further configured to, while the ignore-repeat duration setting is enabled, enable display (e.g., using display enabling unit 1108), on the display unit 1102, of a double-tap affordance. In some embodiments, the processing unit 1106 is further configured to detect (e.g., using detecting unit 1110) a selection of the double-tap affordance, and after detecting a selection of the double-tap affordance, detect (e.g., using detecting unit 1110, on the touch-sensitive surface unit 1104, a fourth touch input at a location on the touch-sensitive surface unit; and in response to detecting the fourth touch input, provide (e.g., using providing unit 1116), to the application, data representing a double-tap input at the location of the fourth touch input.

In some embodiments, the fourth touch input is a single tap on the touch-sensitive surface.

In some embodiments, the double-tap affordance can be repositioned, on the display, in response to detecting a drag contact on the touch-sensitive surface at a location corresponding to the displayed location of the double-tap affordance.

In some embodiments, detecting the first touch input includes detecting a touchdown of the first contact at a first location on the touch-sensitive surface unit 1104, movement of the first contact across the touch-sensitive surface unit, and liftoff of the first contact from the touch-sensitive surface unit at a second location on the touch-sensitive surface unit that is different from the first location on the touch-sensitive surface unit. In some embodiments, providing first data representing at least a portion of the first contact to the application includes: in accordance with a determination that the set of one or more tap-assistance criteria have been met, providing, to the application, data representing the touch input at a single location on the touch-sensitive surface unit, and in accordance with a determination that the set of one or more tap-assistance criteria have not been met, providing, to the application, data representing the touch input including the movement of the first contact.

In some embodiments, the tap-assistance criteria include a tap-timeout duration criterion that is met when the liftoff of the contact is detected before the contact has been detected on the touch-sensitive surface for longer than a predefined tap-timeout duration.

In some embodiments, the data representing at least a portion of the first contact is associated with the location, on the touch-sensitive surface unit 1104, of the touchdown of the first contact.

In some embodiments, the data representing at least a portion of the first contact is associated with the location, on the touch-sensitive surface unit 1104, of a final location of the first contact.

In some embodiments, the ignore-repeat duration setting is enabled in response to detecting a user request.

In some embodiments, the ignore-repeat duration time period is configured by a user.

In some embodiments, enabling the ignore-repeat duration setting causes an option for disabling the hold duration setting to be automatically added as an item in a settings menu.

In some embodiments, the processing unit 1106 is further configured to, while the ignore-repeat duration setting is enabled, detect (e.g., using detecting unit 1110) a user input, and in response to detecting the user input, determine (e.g., using determining unit 1114) whether the settings menu includes at least two items, including the option for disabling the ignore-repeat duration setting. The processing unit 1106 is further configured to, in accordance with a determination that the settings menu does not include at least two items, disable (e.g., using disabling unit 1118) the ignore-repeat duration setting; and in accordance with a determination that the settings menu includes at least two items, enable display (e.g., using display enabling unit 1108) of a user interface including an ignore-repeat affordance associated with the ignore-repeat duration setting.

In some embodiments, the processing unit 1106 is further configured to detect (e.g., using detecting unit 1110) a selection of the ignore-repeat affordance; and in response to detecting the selection of the ignore-repeat affordance, disable (e.g., using disabling unit 1118) the hold-duration setting.

In some embodiments, the application is an active application.

The operations described above with reference to FIG. 10 are, optionally, implemented by components depicted in FIGS. 1A-1B or FIG. 11. For example, detecting operations 1004, 1008, determining operation 1012, and providing operation 1014 can optionally be implemented by operating system 126, event sorter 170, event recognizer 180, and/or event handler 190. Event monitor 171 in event sorter 170 can optionally detect a first touch input on touch-sensitive display 112, then can optionally detect a second touch input on touch-sensitive display 112. Event dispatcher module 174 can optionally deliver the event information to operating system 126. A respective event recognizer 180 of operating system 126 can optionally compare the event information to respective event definitions 186, and determine whether the ignore-repeat setting is enabled, and if so, whether the second touch input triggers a predefined event or sub event, such as the touch input meeting a set of ignore-repeat criteria. When a respective predefined event or sub-event is detected, event recognizer 180 can optionally activate an event handler 190 associated with the detection of the event or sub-event. If the ignore-repeat criteria are not met, event handler 190 can optionally provide data representing the touch input to an application (e.g., 137-147). Similarly, it would be clear to a person having ordinary skill in the art how other processes can be implemented based on the components depicted in FIGS. 1A-1B or FIG. 11.

Tap Assistance Option

Some users with tremors or other motor difficulties may have difficulty performing a stationary touch input, and may instead unintentionally drag the contact either before or after arriving at an intended destination on the touch-sensitive surface. Furthermore, some users have difficulty performing an accurate touch input at a specific location on the touch-sensitive surface, and may instead touch down at the wrong location and drag the contact over to the intended destination. Thus, a user may intend, for example, to provide a single-tap input on an icon to select the icon, but may instead accidentally perform a swipe or flick that starts or ends on the icon. Typically, such an input would be ignored by an application (or would result in an unwanted response from the application, such as scrolling) because the user did not perform the correct touch input for selecting the icon.

In some embodiments, a device (e.g., device 100, 300, 500) with a touch-sensitive surface includes a tap-assistance setting that, when enabled, ignores movement of a contact and interprets a touch input with movement as a tap input rather than as a swipe or drag gesture.

In some embodiments, while operating in a tap-assistance mode, if the device detects a touch input that includes a movement of the contact across the touch screen, the device provides, to the application, data representing a single-tap input at a specific location on the touch-sensitive surface. As depicted in FIG. 12A, the specific location can be either the initial (e.g., touchdown) location of the contact on the touch-sensitive surface or the final (e.g., liftoff) location of the contact from the touch-sensitive surface. In some embodiments, the choice of whether to use the initial or final location is configured by a user. FIG. 6G depicts a user interface 612 that the device can display to enable a user to enable the tap-assistance mode and choose whether to use the initial or final location.

In some embodiments, if the tap-assistance setting is not enabled, the device provides, to the application, data representing the touch input—including the movement—to the application. Thus, if the tap-assistance setting is enabled, the device interprets the touch input as a tap in spite of the device having detected a movement of the contact. If the tap-assistance setting is disabled, the device interprets the touch input as a swipe, drag, flick, or other type of gesture, as it would during normal operation without touch accommodations.

As previously discussed with respect to the Hold Duration setting, in some embodiments, the device fakes a new touchdown of the contact at a location other than the location at which the touchdown of the contact was actually detected, which can optionally include providing data that includes a "touchbegan" event that is generated by the an accessibility process running on the device. As previously discussed, in some embodiments, the "fake" touch event generated by the accessibility process is indistinguishable from "real" touch events generated by the touch event process, so that the application does not need to be modified to be compatible with this accessibility feature.

There may be occasions when a user wishes to perform an intentional swipe or drag gesture while the tap-assistance setting is enabled. For example, a user may wish to enable the tap-assistance setting to help them accurately select icons, but then may wish to perform a swipe gesture for scrolling a document. As described above, however, when the tap-assistance setting is enabled, the device provides swipe and drag gestures to the application as single-tap inputs. To accommodate the need to perform these inputs while the tap-assistance setting is enabled, in some embodiments, the device can optionally include a tap-timeout setting that can be used in conjunction with the tap-assistance setting.

The tap-timeout setting, when enabled, causes the device to interpret a touch input as a swipe or drag gesture if the device detects that the contact is maintained for a tap-timeout time period prior to the movement. That is, if the device detects that the duration of a contact on the touch-sensitive surface has been maintained for the tap-timeout time period, the device interprets a subsequent movement of the contact as a swipe or drag gesture (depending on the specifics of the touch input). In this case, the device provides data representing the touch input—including the movement—to the application. If the device determines that the contact has not been maintained for the tap-timeout time period prior to the movement, then the device interprets the touch input as a single tap at a specific location, as described above. The tap-timeout time period can optionally be 0.25 seconds, 0.5 seconds, 1 second, 2 seconds, 3 seconds, 4 seconds, or 5 seconds, for example, or another value in that range.

In some embodiments, the data representing the touch input includes the movement of the touch input only if the amount of movement would be sufficient, in the absence of the tap-assistance setting, to classify the touch input as a swipe or drag gesture.

In some embodiments, any movement of the contact that occurs during the tap-timeout time period is ignored, and only movements that occur after the tap-timeout time period has elapsed are represented by the data provided to the application. Thus, even if a user is unable to maintain a stationary contact during the tap-timeout time period, the device can provide touch accommodations to enable the user to provide an intentional swipe gesture after the time period has elapsed.

In some embodiments, the data provided to the application includes the location of the contact when the tap-timeout duration was reached. In this scenario, the device interprets the touch input as a swipe that started from the location of the contact at the time when the tap-timeout duration was reached.

In some embodiments, the device provides the data representing the touch input to the application at the time when the liftoff of the contact is detected. In some embodiments, the device provides the data at the time when duration of the contact exceeds the tap-timeout duration.

In some embodiments, in response to detecting the touch input while the tap-timeout duration setting is enabled, the device displays a user interface element in a manner similar to described above with respect to FIG. 6B. The user interface element provides an indication, to the user, that the touch has been detected along with dynamic indication of the amount of time remaining until the tap-timeout duration is reached and a swipe or drag gesture will be accepted. The dynamic indication can optionally be a progress bar, as described with respect to FIG. 6B.

In some embodiments, when the tap-assistance criteria have not been met, the device provides, to the application, data representing a touch input including a movement, but the application ignores the data because either: (i) the user touched down on a user interface element (such as an icon) but then moved off of it before lifting off the contact and thus canceled the input, or (ii) the user touched down outside of the user interface element and thus failed to activate it, even though the user subsequently moved the contact onto the UI element before liftoff (as discussed earlier with respect to FIG. 2).

In the context of touch accommodations for users with motor impairments, these application responses can optionally be undesirable, and provide an example of the scenarios that the tap-assistance setting is intended to mitigate. Scenario (i) can be addressed by enabling tap-assistance with the initial location setting, and scenario (ii) can be addressed by enabling tap-assistance with the final location setting. FIG. 12B depicts an example of scenario (i), and FIG. 12C depicts an example of scenario (ii).

In some embodiments, the device can enable and disable the tap-assistance setting in response to a user input. When the tap-assistance setting is enabled the device behaves as described above, and when the setting is disabled, the device operates in its usual mode; that is, without representing a touch input with a movement as a single-tap input. In some embodiments, the device enables the tap-assistance setting in response to detecting a selection of an affordance in a user interface 612 as depicted in FIG. 6G, for example.

In some embodiments, the tap-timeout time period can be configured by a user via a user interface 612, as depicted in FIG. 6G.

Figure 13A:
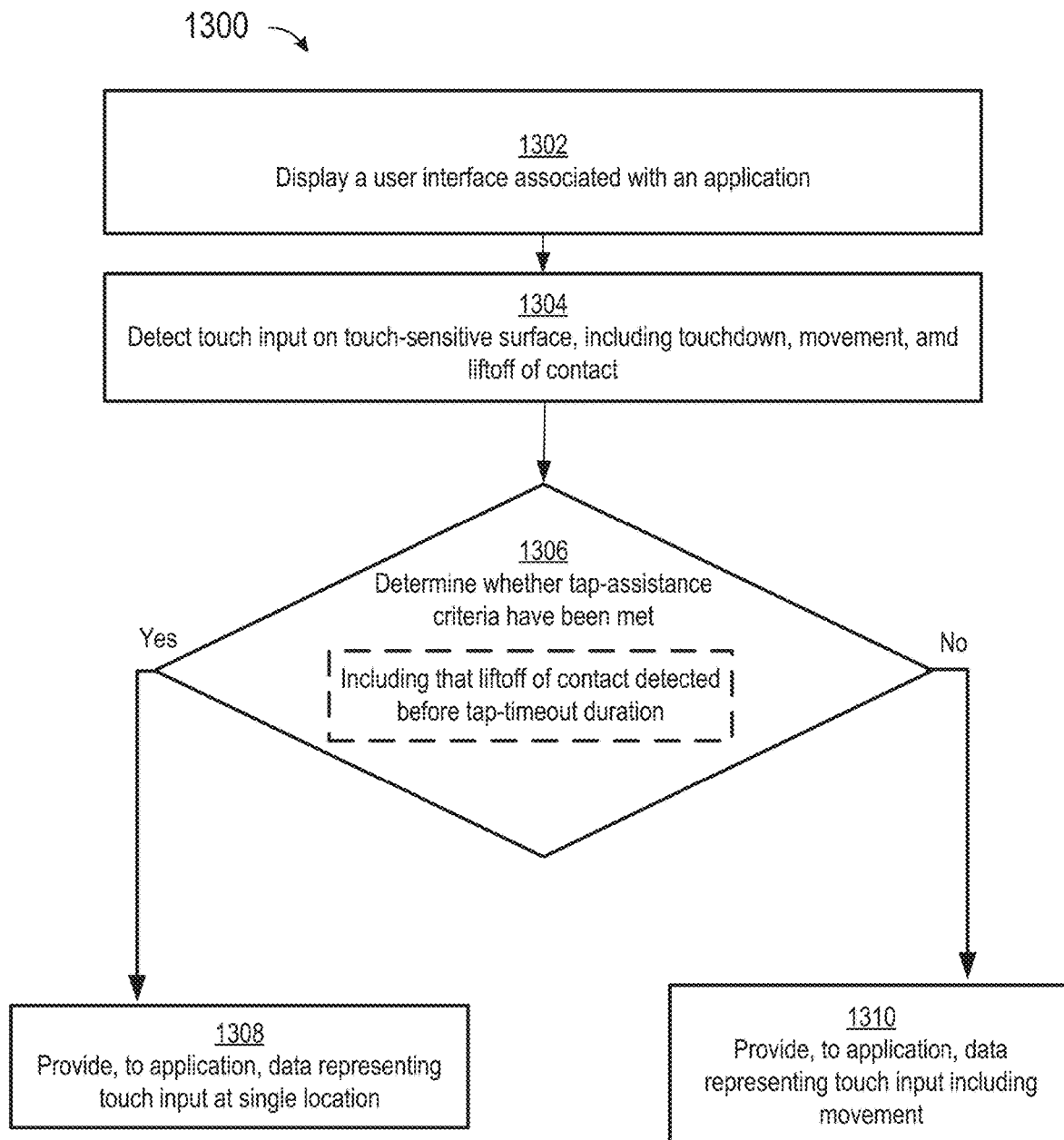
FIGS. 13A-13B are flow diagrams illustrating a process for providing touch accommodations in accordance with some embodiments.

FIG. 13A is a flow diagram illustrating a method for providing touch accommodations using an electronic device in accordance with some embodiments. Method 1300 is performed at a device (e.g., 100, 300, 500) with a display and a touch-sensitive surface. Some operations in method 1300 can optionally be combined, the order of some operations can optionally be changed, and some operations can optionally be omitted.

As described below, method 1300 provides intuitive touch accommodations for users with tremors or other motor impairments. The method reduces the cognitive burden on a user by increasing the accuracy of touch inputs and reducing the frequency of unintended touch inputs, thereby creating a more efficient human-machine interface. For battery-operated computing devices, helping a user provide more accurate touch inputs enables more efficient use of touch-based user interfaces and fewer unwanted device responses, thereby conserving power and increasing the time between battery charges.

At block 1302, the device displays, on the display (e.g., touch screen 602), a user interface associated with an application. For example, FIG. 6A depicts the device displaying a user interface 604 associated with the Springboard application, while FIGS. 6D-6F depict the device displaying a user interface 610 for a mapping application.

At block 1304, the device detects a touch input on the touch-sensitive surface (e.g., touch screen 602), including a touchdown of a contact, a movement of a contact, and a lift-off of the contact. At block 1306, the device determines whether tap-assistance criteria have been met. For example, the tap-assistance criteria can optionally include a criterion that is met when the tap-assistance mode is enabled, and, optionally, a criterion that is met when the contact does not exceed a tap-timeout time period. As previously described, the tap-timeout time period enables a user to intentionally provide, e.g., a swipe gesture while the device is operating in the tap assistance mode.

In accordance with a determination that the tap-assistance criteria have been met, at block 1308, the device provides data representing a touch input at a single location to the application. For example, as previously discussed, if the device detects a touch input that included a movement (such as a swipe), and the tap-assistance criteria have been met, the device can optionally provide, to the application, data representing a tap input.

In accordance with a determination that the tap-assistance criteria have not been met, at block 1312, the device provides, to the application, data representing the touch input including the movement of the contact. For example, as previously discussed, if the device detects a swipe gesture and the tap-assistance criteria have not been met (either because the tap-assistance mode is not enabled, or because the duration of the contact exceeded the tap-timeout time period), the device provides, to the application, data representing the swipe gesture.

Figure 13B:
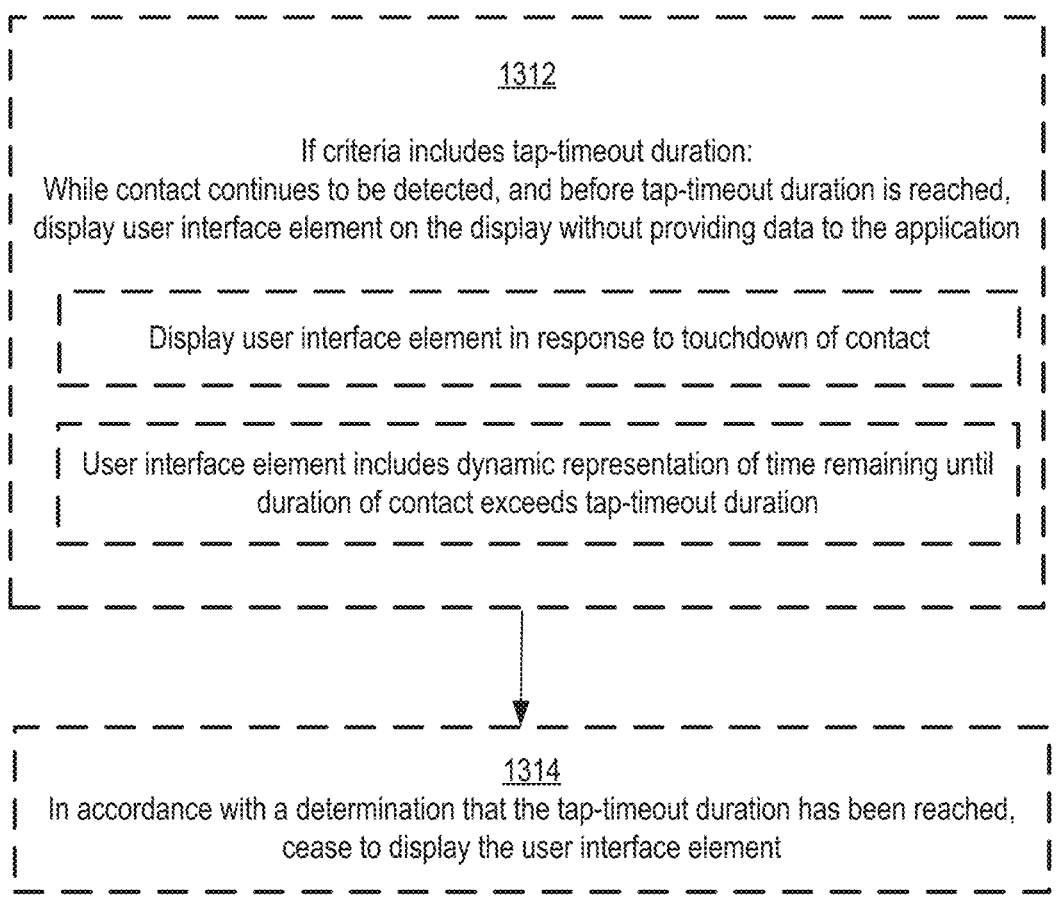

FIG. 13B is a flow diagram illustrating optional sub-processes within block 1308 of process 1300 (FIG. 13A). At block 1312, while the contact continues to be detected, and before the tap-timeout duration is reached, the device displays a user interface element on the display (e.g., touch screen 602) without providing data to the application. For example, FIG. 6A depicts a user interface element 606 that the device can display in response to detecting a contact.

In some embodiments, the device displays the user interface element in response to detecting the touchdown of the contact. In some embodiments, the user interface element includes a dynamic representation of the time remaining until the duration of the contact exceeds the tap-timeout time period. For example, FIG. 6B depicts a user interface element 606 with a dynamic indication 608 of the amount of time remaining before the contact exceeds a predetermined time period, such as the tap-timeout time period. At block 1320, in accordance with a determination that the tap-timeout duration has been reached, the device ceases to display the user interface element.

Note that details of the processes described above with respect to method 1300 (e.g., FIGS. 13A-B) are also applicable in an analogous manner to the methods described above. For example, methods 700 and/or 1000 can optionally include one or more of the characteristics of the various methods described above with reference to method 1200. Additionally, it should be noted that details of other processes described herein with respect to other methods described herein (e.g., methods 700 and 1000) are also applicable in an analogous manner to method 1300 described above with respect to FIGS. 13A-B. For example, the touch inputs, contacts, user interface elements, user interfaces, settings, and criteria described above with reference to method 700 optionally have one or more of the characteristics of the touch inputs, contacts, user interface elements, user interfaces, settings, and criteria described herein with reference to other methods described herein (e.g., methods 700 and 1000).

Figure 14:
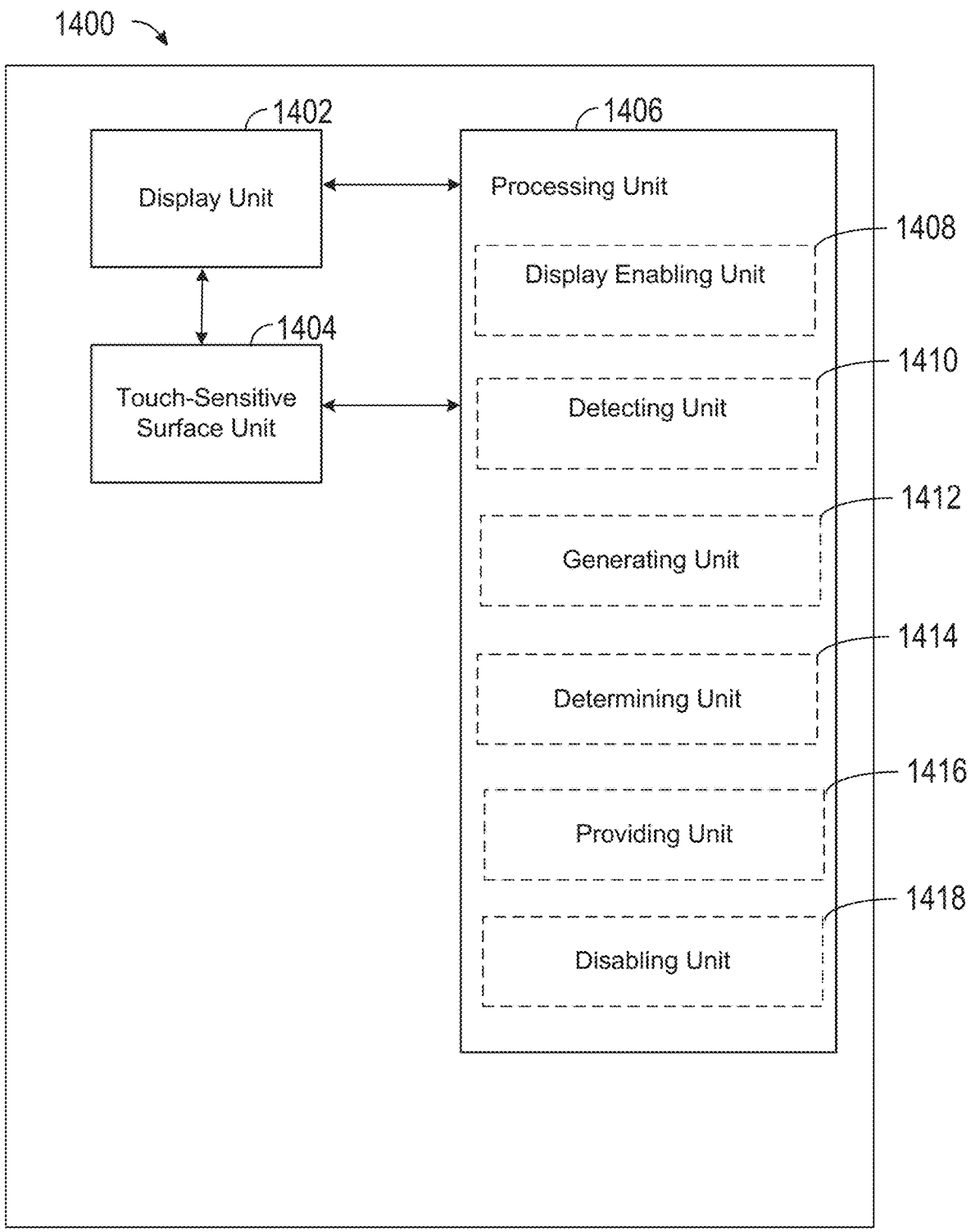
FIG. 14 illustrates a functional block diagram of an electronic device in accordance with some embodiments.

FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a user interface associated with an application, a touch-sensitive surface unit 1404 configured to receive touch inputs, and a processing unit 1406 coupled to the display unit 1402 and the touch-sensitive surface unit 1404. In some embodiments, the processing unit 1406 includes a display enabling unit 1408, a detecting unit 1410, a generating unit 1412, a determining unit 1414, and a providing unit 1416.

The processing unit 1406 is configured to: enable display (e.g., using display enabling unit 1108), on the display unit 1402, a user interface associated with an application; detect (e.g., using detecting unit 1410) a touch input that includes detecting touchdown of a contact at a first location on the touch-sensitive surface unit 1404, movement of the contact across the touch-sensitive surface unit, and liftoff of the contact from the touch-sensitive surface unit at a second location on the touch-sensitive surface unit that is different from the first location on the touch-sensitive surface unit. In response to detecting at least a portion of the touch input on the touch-sensitive surface, the processing unit 1406 is further configured to, in accordance with a determination that a set of one or more tap-assistance criteria have been met, providing, to the application, data representing the touch input at a single location on the touch-sensitive surface, and in accordance with a determination that the a set of one or more tap-assistance criteria have not been met, the processing unit is configured to provide (e.g., using providing unit 1416) to the application, data representing the touch input including the movement of the contact.

In some embodiments, the set of one or more tap-assistance criteria include a criterion that is met when a tap-assistance mode is enabled.

In some embodiments, the set of one or more tap-assistance criteria includes a criterion that is met when the liftoff of the contact is detected before the contact has been detected on the touch-sensitive surface unit 1404 for longer than a predefined tap-timeout duration.

In some embodiments, the single location is a location, on the touch-sensitive surface unit, associated with a touchdown of the contact.

In some embodiments, the single location is a location, on the touch-sensitive surface unit, associated with a liftoff of the contact.

In some embodiments, the user configures whether the single location is a location, on the touch-sensitive surface, associated with the touchdown of the contact, or a location, on the touch-sensitive surface unit, associated with the liftoff of the contact.

In some embodiments, in accordance with a determination that the set of one or more tap-assistance criteria have been met, the data representing the touch input at a single location on the touch-sensitive surface unit 1404 is provided to the application in response to detecting the liftoff of the contact.

In some embodiments, in accordance with a determination that the set of one or more tap-assistance criteria have not been met, the data representing the touch input including the movement of the contact is provided to the application at the time when the contact has been detected on the touch-sensitive surface unit 1404 for longer than the predefined tap-timeout duration.

In some embodiments, in response to a determination that the contact has been detected on the touch-sensitive surface unit 1404 for longer than the predefined tap-timeout duration, the data provided to the application includes an indication of the location, on the touch-sensitive surface unit, of the contact at the time when the tap-timeout duration was reached.

In some embodiments, in accordance with the determination that the tap-assistance criteria have not been met, the data representing the touch input including the movement is provided to the application in response to detecting the touchdown of the contact.

In some embodiments, the movement is an amount of movement that indicates a drag or swipe input.

In some embodiments, the data representing the touch input including the movement represents a drag or swipe gesture.

In some embodiments, the data representing the touch input represents a tap input.

In some embodiments, in response to a determination that the tap-assistance criteria have not been met, the application ignores the data representing the touch input including the movement of the contact.

In some embodiments, the processing unit 1406 is further configured to, in response to detecting the touchdown of the contact, and if the tap-assistance criteria includes the criterion that is met when a liftoff of the contact is detected before the contact has been detected on the touch-sensitive surface for longer than a predefined tap-timeout duration: enable display (e.g., using display enabling unit 1408) of a first user interface element, on the display unit 1402, at a location on the display that is associated with the location of the contact on the touch-sensitive surface unit 1404, without providing any data representing the touch input to the application. The first user interface element is not associated with the application.

In some embodiments, the processing unit 1406 is further configured to, in accordance with a determination that the contact has been detected on the touch-sensitive surface unit 1404 for longer than the predefined tap-timeout duration, cease to enable display of the first user interface element.

In some embodiments, the displayed location of the first user interface element remains stationary during the movement of the contact.

In some embodiments, the processing unit 1406 is further configured to, in response to detecting the movement of the contact, change the displayed location (e.g., using display enabling unit 1408) of the first user interface element, on the display unit 1402, in accordance with the movement of the contact.

In some embodiments, the first user interface element is a circle.

In some embodiments, the first user interface element includes a dynamic indication of a time remaining until the contact exceeds the predefined tap-timeout duration.

In some embodiments, the processing unit 1406 is further configured to, in accordance with detecting the touchdown of the contact and in accordance with a determination that a hold duration setting is enabled, enable display (e.g., using display enabling unit 1408) a first dynamic indication of an amount of time remaining until the duration of the contact exceeds a hold duration time period that corresponds to the hold duration setting; determine (e.g., using determining unit 1414) whether a set of one or more hold duration criteria have been met for the contact, wherein the hold duration criteria are based on the hold duration time period; in accordance with a determination that the set of one or more hold duration criteria have been met for the contact, wherein the hold duration criteria include a hold duration criterion that is met when a duration of the contact exceeds the hold duration time period, enable display (e.g., using display enabling unit 1408), on display unit 1402, of a second dynamic indication of an amount of time remaining until the duration of the contact exceeds the tap-timeout duration time period; wherein providing data representing at least a portion of the touch input to the application includes, in accordance with the determination that a set of one or more tap-assistance criteria have been met, providing data representing the touch input at a single location on the touch-sensitive surface unit, and in accordance with the determination that the set of one or more tap-assistance criteria have not been met, providing data representing the touch input including the movement of the contact to the application; and in accordance with a determination that the set of one or more hold duration criteria have not been met, forgo providing any data representing the touch input to the application. In some embodiments, the processing unit 1406 is further configured to, in accordance with a determination that the set of one or more hold duration criteria have not been met, forgo providing any data representing the touch input to the application.

In some embodiments, the first dynamic indication of an amount of time remaining until the duration of the contact exceeds a hold duration time period is a first progress bar.

In some embodiments, the second dynamic indication of an amount of time remaining until the duration of the contact exceeds a tap-timeout duration time period is a second progress bar, and wherein the second progress bar is visually distinguished from the first progress bar.

In some embodiments, the tap-assistance setting is enabled in response to detecting a user request.

In some embodiments, the tap-timeout time period is configured by a user.

In some embodiments, enabling the tap-assistance setting causes an option for disabling the tap-assistance setting to be automatically added as an item in a settings menu.

In some embodiments, the processing unit 1406 is further configured to, while the tap-assistance setting is enabled, detect (e.g., using detecting unit 1410) a user input, and in response to detecting the user input, determine (e.g., using determining unit 1414) whether the settings menu includes at least two items, including the option for disabling the tap-assistance setting. The processing unit 1406 is further configured to, in accordance with a determination that the settings menu does not include at least two items, disable (e.g., using disabling unit 1418) the tap-assistance setting; and in accordance with a determination that the settings menu includes at least two items, enable display (e.g., using display enabling unit 1408) of a user interface including an ignore-repeat affordance associated with the ignore-repeat duration setting.

In some embodiments, the processing unit 1406 is further configured to detect (e.g., using detecting unit 1410) a selection of the tap-assistance affordance; and in response to detecting the selection of the tap-assistance affordance, disable (e.g., using disabling unit 1418) the tap-assistance setting.

In some embodiments, the application is an active application.

The operations described above with reference to FIGS. 13A-B are, optionally, implemented by components depicted in FIGS. 1A-1B or FIG. 14. For example, detecting operation 1302, determining operation 1306, and providing operations 1308, 1310 can optionally be implemented by operating system 126, event sorter 170, event recognizer 180, and/or event handler 190. Event monitor 171 in event sorter 170 can optionally detect a touch input on touch-sensitive display 112. Event dispatcher module 174 can optionally deliver the event information to operating system 126. A respective event recognizer 180 of operating system 126 can optionally compare the event information to respective event definitions 186, and can optionally determine whether the touch input triggers a predefined event or sub event, such as the touch input meeting a set of tap-assistance criteria. When a respective predefined event or sub-event is detected, event recognizer 180 can optionally activate an event handler 190 associated with the detection of the event or sub-event. Event handler 190 can optionally provide data representing the touch input to an application (e.g., application 137-147). Similarly, it would be clear to a person having ordinary skill in the art how other processes can be implemented based on the components depicted in FIGS. 1A-1B or FIG. 14.

Combinations of Touch Accommodation Options

The three touch accommodation options described above—hold duration, ignore-repeat, and tap assistance—can be combined to provide additional touch accommodations. Combinations of touch accommodations can be enabled and configured via the user interface 612 depicted in FIG. 6G, for example. Such combinations include hold duration plus ignore repeat; hold-duration plus tap assistance; hold duration plus ignore-repeat plus tap assistance; and ignore-repeat plus tap assistance. The combinations that include tap assistance can also, optionally, include the tap-timeout setting.

For example, in some embodiments, if both the hold-duration setting and the ignore-repeat setting are enabled, the device requires that both the hold-duration criteria is met (e.g., a first and/or second touch input have been detected on the touch-sensitive surface for longer than the hold-duration time period, as described with respect to FIGS. 6A-6J and 7A-B), and the ignore-repeat criteria is not met (e.g., the second touch input is detected after the ignore-repeat duration relative to a first touch input, as described earlier with respect to FIG. 10) in order for the device to provide data representing the first and/or second touch input to the application.

In some embodiments, if the hold-duration setting is enabled along with the tap-assistance setting, touch input with movement must first meet the hold duration criteria to be interpreted as an intentional touch input (e.g., as described with respect to FIGS. 6A-6J and 7A-7B) before being processed under the tap-assistance setting (e.g., as described with respect to FIGS. 13A-13B). Thus, for example, once the device determines that a touch input that includes a movement meets the hold duration criteria, the device then determines whether the touch input meets the tap-assistance criteria. Depending on the outcome of the determination, the device provides data representing either a touch input including a movement, or a touch input at a single location, to the application. Alternatively, if the touch input never meets the hold duration criteria, the device does not provide, to the application, any data representing the touch input.

In some embodiments, if the hold duration setting is enabled along with both the tap assistance and tap timeout settings, a touch input with movement (e.g., such as the movement depicted in FIGS. 12A-12B) must first meet the hold duration criteria to be interpreted as an intentional touch input (e.g., as described with respect to FIGS. 6A-6J and 7A-7B), then exceed the tap-timeout duration in order to be interpreted as a swipe or drag gesture (as described with respect to FIGS. 13A-13B). In this scenario, in some embodiments, the device displays a user interface element (e.g., user interface element 606) in response to detecting the contact, as described with respect to FIG. 6B. The user interface element can include a progress bar (e.g., dynamic indication 608) that indicates the amount of time remaining before the contact exceeds the hold duration time period.

After the hold duration time period has elapsed, but the tap-timeout time period has not yet elapsed, in some embodiments, the device continues to display the user interface element (e.g., user interface element 606) and a progress bar (which can optionally be a continuation of the hold-duration progress bar or a new progress bar) to indicate the amount of time remaining before the contact exceeds the tap-timeout time period and is interpreted as a swipe or drag gesture. In some embodiments, a visual characteristic of the user interface element and/or progress bar changes at the time when the hold duration elapses and the tap-timeout time period continues (e.g., assuming the tap-timeout time period is longer than the hold-duration time period). For example, the user interface element (e.g., 606) and/or progress bar (e.g., 608) can optionally be displayed in a different color, a different shade, a different line thickness, and/or a different pattern.

In some embodiments, the tap timeout time period begins when the duration of the contact exceeds the hold duration time period; e.g., they elapse sequentially. In some embodiments, both the tap timeout time period and the hold duration time period begin when the touch input is detected; e.g., they elapse in parallel.

In some embodiments, if the ignore-repeat setting is enabled along with the tap-assistance setting, a touch input must first not meet the ignore-repeat criteria (e.g., the touch input must not be within the ignore-repeat time duration relative to a previous touch input, as described with respect to FIG. 10) before being processed under the tap-assistance setting. That is, a touch input that does not meet the ignore-repeat criteria, and does meet the tap-assistance criteria, can optionally be interpreted as a single tap input (as described earlier with respect to FIGS. 13A-13B) even if the touch input includes a movement (such as the movement depicted in FIGS. 12A-12B).

In some embodiments, the device can operate with all of touch accommodation settings enabled. In this case, a touch input must meet the hold duration criteria (as described with respect to FIGS. 7A-7B), and not meet the ignore-repeat criteria (as described with respect to FIG. 10), before being processed under the tap-assistance setting (as described with respect to FIGS. 13A-13B).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   a touch-sensitive surface;
   one or more processors;
   a memory; and
   one or more programs, wherein the one or more programs are stored in the memory and are configured to be executed by the one or more processors, the one or more programs including instructions for:
   displaying, on the display, a user interface associated with an application;
   detecting a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; and
   in response to detecting at least a portion of the touch input on the touch-sensitive surface:
   in accordance with a determination that a set of one or more tap-assistance criteria have been met, providing, to the application, data representing the touch input at a single location on the touch-sensitive surface; and
   in accordance with a determination that the set of one or more tap-assistance criteria have not been met, providing, to the application, data representing the touch input including the movement of the contact.

2. The electronic device of claim 1, wherein the set of one or more tap-assistance criteria includes a criterion that is met when a tap-assistance mode is enabled.

3. The electronic device of claim 2, wherein the set of one or more tap-assistance criteria includes a criterion that is met when the liftoff of contact is detected before the contact has been detected on the touch-sensitive surface for longer than a predefined tap-timeout duration.

4. The electronic device of claim 3, wherein, in response to a determination that the contact has been detected on the touch-sensitive surface for longer than the predefined tap-timeout duration, the data provided to the application includes an indication of the location, on the touch-sensitive surface, of the contact at the time when the tap-timeout duration was reached.

5. The electronic device of claim 3, wherein the one or more programs further include instructions for:
   in response to detecting the touchdown of the contact, and wherein the tap-assistance criteria includes the criterion that is met when a liftoff of the contact is detected before the contact has been detected on the touch-sensitive surface for longer than the tap-timeout duration:
   while the contact continues to be detected on the touch-sensitive surface, displaying a first user interface element, on the display, at a location on the display that is associated with the location of the contact on the touch-sensitive surface, without providing any data representing the touch input to the application, wherein the first user interface element is not associated with the application.

6. The electronic device of claim 5, wherein the one or more programs further include instructions for:
   in accordance with a determination that the contact has been detected on the touch-sensitive surface for longer than the tap-timeout duration, ceasing to display the first user interface element.

7. The electronic device of claim 5, wherein the displayed location of the first user interface element remains stationary during the movement of the contact.

8. The electronic device of claim 5, wherein the one or more programs further include instructions for:
   in response to detecting the movement of the contact, changing the displayed location of the first user interface element, on the display, in accordance with the movement of the contact.

9. The electronic device of claim 5, wherein the first user interface element includes a dynamic indication of a time remaining until the duration of the contact exceeds the tap-timeout duration.

10. The electronic device of claim 3, wherein the one or more programs further include instructions for:
    in accordance with detecting the touchdown of the contact and in accordance with a determination that a hold duration setting is enabled:
    displaying a first dynamic indication of an amount of time remaining until the duration of the contact exceeds a hold duration time period that corresponds to the hold duration setting;
    determining whether a set of one or more hold duration criteria have been met for the contact, wherein the hold duration criteria are based on the hold duration time period;

in accordance with a determination that the set of one or more hold duration criteria have been met for the contact, wherein the hold duration criteria include a hold duration criterion that is met when a duration of the contact exceeds the hold duration time period, displaying a second dynamic indication of an amount of time remaining until the duration of the contact exceeds the tap-timeout duration, and wherein providing data representing at least a portion of the touch input to the application includes:
  in accordance with the determination that the set of one or more tap-assistance criteria have been met, providing data representing the touch input at the single location on the touch-sensitive surface; and
  in accordance with the determination that the set of one or more tap-assistance criteria have not been met, providing data representing the touch input including the movement of the contact to the application; and
in accordance with a determination that the set of one or more hold duration criteria have not been met, forgoing providing any data representing the touch input to the application.

11. The electronic device of claim 1, wherein a user configures whether the single location is a location, on the touch-sensitive surface, associated with a touchdown of the contact, or a location, on the touch-sensitive surface, associated with a liftoff of the contact.

12. The electronic device of claim 1, wherein, in accordance with a determination that the set of one or more tap-assistance criteria have been met, the data representing the touch input at the single location on the touch-sensitive surface is provided to the application in response to detecting the liftoff of the contact.

13. The electronic device of claim 1, wherein, in accordance with a determination that the set of one or more tap-assistance criteria have not been met, the data representing the touch input including the movement of the contact is provided to the application at a time when the contact has been detected on the touch-sensitive surface for longer than a predefined tap-timeout duration.

14. The electronic device of claim 1, wherein, in accordance with the determination that the tap-assistance criteria have not been met, the data representing the touch input including the movement is provided to the application in response to detecting the touchdown of the contact.

15. The electronic device of claim 1, wherein in response to a determination that the tap-assistance criteria have not been met, the application ignores the data representing the touch input including the movement of the contact.

16. The electronic device of claim 1, wherein the tap-assistance setting is enabled in response to detecting a user request.

17. The electronic device of claim 16, wherein enabling the tap-assistance setting causes an option for disabling the tap-assistance setting to be automatically added as an item in a settings menu.

18. The electronic device of claim 17, wherein the one or more programs further include instructions for:
  while the tap-assistance setting is enabled, detecting a user input;
  in response to detecting the user input, determining whether the settings menu includes at least two items, including the option for disabling the tap-assistance setting;
  in accordance with a determination that the settings menu does not include at least two items, disabling the tap-assistance setting; and
  in accordance with a determination that the settings menu includes at least two items, displaying a user interface including a tap-assistance affordance associated with a hold duration setting.

19. A non-transitory computer-readable storage medium storing one or more programs configured to be executed by one or more processors of an electronic device with a display and a touch-sensitive surface, the one or more programs including instructions for:
  displaying, on the display, a user interface associated with an application;
  detecting a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; and
  in response to detecting at least a portion of the touch input on the touch-sensitive surface:
    in accordance with a determination that a set of one or more tap-assistance criteria have been met, providing, to the application, data representing the touch input at a single location on the touch-sensitive surface; and
    in accordance with a determination that the set of one or more tap-assistance criteria have not been met, providing, to the application, data representing the touch input including the movement of the contact.

20. A method, comprising:
at an electronic device with a touch-sensitive surface and a display:
  displaying, on the display, a user interface associated with an application;
  detecting a touch input that includes detecting touchdown of a contact at a first location on the touch-sensitive surface, movement of the contact across the touch-sensitive surface, and liftoff of the contact from the touch-sensitive surface at a second location on the touch-sensitive surface that is different from the first location on the touch-sensitive surface; and
  in response to detecting at least a portion of the touch input on the touch-sensitive surface:
    in accordance with a determination that a set of one or more tap-assistance criteria have been met, providing, to the application, data representing the touch input at a single location on the touch-sensitive surface; and
    in accordance with a determination that the set of one or more tap-assistance criteria have not been met, providing, to the application, data representing the touch input including the movement of the contact.

21. The non-transitory computer-readable storage medium of claim 19, wherein the set of one or more tap-assistance criteria includes a criterion that is met when a tap-assistance mode is enabled.

22. The non-transitory computer-readable storage medium of claim 21, wherein the set of one or more tap-assistance criteria includes a criterion that is met when the liftoff of contact is detected before the contact has been detected on the touch-sensitive surface for longer than a predefined tap-timeout duration.

23. The non-transitory computer-readable storage medium of claim 22, wherein, in response to a determination that the contact has been detected on the touch-sensitive surface for longer than the predefined tap-timeout duration, the data provided to the application includes an indication of the location, on the touch-sensitive surface, of the contact at the time when the tap-timeout duration was reached.

24. The non-transitory computer-readable storage medium of claim 22, wherein the one or more programs further include instructions for:
in response to detecting the touchdown of the contact, and wherein the tap-assistance criteria includes the criterion that is met when a liftoff of the contact is detected before the contact has been detected on the touch-sensitive surface for longer than the tap-timeout duration:
while the contact continues to be detected on the touch-sensitive surface, displaying a first user interface element, on the display, at a location on the display that is associated with the location of the contact on the touch-sensitive surface, without providing any data representing the touch input to the application, wherein the first user interface element is not associated with the application.

25. The non-transitory computer-readable storage medium of claim 24, wherein the one or more programs further include instructions for:
in accordance with a determination that the contact has been detected on the touch-sensitive surface for longer than the tap-timeout duration, ceasing to display the first user interface element.

26. The non-transitory computer-readable storage medium of claim 24, wherein the displayed location of the first user interface element remains stationary during the movement of the contact.

27. The non-transitory computer-readable storage medium of claim 24, wherein the one or more programs further include instructions for:
in response to detecting the movement of the contact, changing the displayed location of the first user interface element, on the display, in accordance with the movement of the contact.

28. The non-transitory computer-readable storage medium of claim 24, wherein the first user interface element includes a dynamic indication of a time remaining until the duration of the contact exceeds the tap-timeout duration.

29. The non-transitory computer-readable storage medium of claim 22, wherein the one or more programs further include instructions for:
in accordance with detecting the touchdown of the contact and in accordance with a determination that a hold duration setting is enabled:
displaying a first dynamic indication of an amount of time remaining until the duration of the contact exceeds a hold duration time period that corresponds to the hold duration setting;
determining whether a set of one or more hold duration criteria have been met for the contact, wherein the hold duration criteria are based on the hold duration time period;
in accordance with a determination that the set of one or more hold duration criteria have been met for the contact, wherein the hold duration criteria include a hold duration criterion that is met when a duration of the contact exceeds the hold duration time period, displaying a second dynamic indication of an amount of time remaining until the duration of the contact exceeds the tap-timeout duration, and wherein providing data representing at least a portion of the touch input to the application includes:
in accordance with the determination that the set of one or more tap-assistance criteria have been met, providing data representing the touch input at the single location on the touch-sensitive surface; and
in accordance with the determination that the set of one or more tap-assistance criteria have not been met, providing data representing the touch input including the movement of the contact to the application; and
in accordance with a determination that the set of one or more hold duration criteria have not been met, forgoing providing any data representing the touch input to the application.

30. The non-transitory computer-readable storage medium of claim 19, wherein a user configures whether the single location is a location, on the touch-sensitive surface, associated with a touchdown of the contact, or a location, on the touch-sensitive surface, associated with a liftoff of the contact.

31. The non-transitory computer-readable storage medium of claim 19, wherein, in accordance with a determination that the set of one or more tap-assistance criteria have been met, the data representing the touch input at the single location on the touch-sensitive surface is provided to the application in response to detecting the liftoff of the contact.

32. The non-transitory computer-readable storage medium of claim 19, wherein, in accordance with a determination that the set of one or more tap-assistance criteria have not been met, the data representing the touch input including the movement of the contact is provided to the application at a time when the contact has been detected on the touch-sensitive surface for longer than a predefined tap-timeout duration.

33. The non-transitory computer-readable storage medium of claim 19, wherein, in accordance with the determination that the tap-assistance criteria have not been met, the data representing the touch input including the movement is provided to the application in response to detecting the touchdown of the contact.

34. The non-transitory computer-readable storage medium of claim 19, wherein in response to a determination that the tap-assistance criteria have not been met, the application ignores the data representing the touch input including the movement of the contact.

35. The non-transitory computer-readable storage medium of claim 19, wherein the tap-assistance setting is enabled in response to detecting a user request.

36. The non-transitory computer-readable storage medium of claim 35, wherein enabling the tap-assistance setting causes an option for disabling the tap-assistance setting to be automatically added as an item in a settings menu.

37. The non-transitory computer-readable storage medium of claim 36, wherein the one or more programs further include instructions for:
while the tap-assistance setting is enabled, detecting a user input;
in response to detecting the user input, determining whether the settings menu includes at least two items, including the option for disabling the tap-assistance setting;

in accordance with a determination that the settings menu does not include at least two items, disabling the tap-assistance setting; and in accordance with a determination that the settings menu includes at least two items, displaying a user interface including a tap-assistance affordance associated with a hold duration setting.

38. The method of claim 20, wherein the set of one or more tap-assistance criteria includes a criterion that is met when a tap-assistance mode is enabled.

39. The method of claim 38, wherein the set of one or more tap-assistance criteria includes a criterion that is met when the liftoff of contact is detected before the contact has been detected on the touch-sensitive surface for longer than a predefined tap-timeout duration.

40. The method of claim 39, wherein, in response to a determination that the contact has been detected on the touch-sensitive surface for longer than the predefined tap-timeout duration, the data provided to the application includes an indication of the location, on the touch-sensitive surface, of the contact at the time when the tap-timeout duration was reached.

41. The method of claim 39, further comprising:
in response to detecting the touchdown of the contact, and wherein the tap-assistance criteria includes the criterion that is met when a liftoff of the contact is detected before the contact has been detected on the touch-sensitive surface for longer than the tap-timeout duration:
while the contact continues to be detected on the touch-sensitive surface, displaying a first user interface element, on the display, at a location on the display that is associated with the location of the contact on the touch-sensitive surface, without providing any data representing the touch input to the application, wherein the first user interface element is not associated with the application.

42. The method of claim 41, further comprising:
in accordance with a determination that the contact has been detected on the touch-sensitive surface for longer than the tap-timeout duration, ceasing to display the first user interface element.

43. The method of claim 41, wherein the displayed location of the first user interface element remains stationary during the movement of the contact.

44. The method of claim 41, further comprising:
in response to detecting the movement of the contact, changing the displayed location of the first user interface element, on the display, in accordance with the movement of the contact.

45. The method of claim 41, wherein the first user interface element includes a dynamic indication of a time remaining until the duration of the contact exceeds the tap-timeout duration.

46. The method of claim 39, further comprising:
in accordance with detecting the touchdown of the contact and in accordance with a determination that a hold duration setting is enabled:
displaying a first dynamic indication of an amount of time remaining until the duration of the contact exceeds a hold duration time period that corresponds to the hold duration setting;
determining whether a set of one or more hold duration criteria have been met for the contact, wherein the hold duration criteria are based on the hold duration time period;

in accordance with a determination that the set of one or more hold duration criteria have been met for the contact, wherein the hold duration criteria include a hold duration criterion that is met when a duration of the contact exceeds the hold duration time period, displaying a second dynamic indication of an amount of time remaining until the duration of the contact exceeds the tap-timeout duration, and wherein providing data representing at least a portion of the touch input to the application includes:
in accordance with the determination that the set of one or more tap-assistance criteria have been met, providing data representing the touch input at the single location on the touch-sensitive surface; and
in accordance with the determination that the set of one or more tap-assistance criteria have not been met, providing data representing the touch input including the movement of the contact to the application; and
in accordance with a determination that the set of one or more hold duration criteria have not been met, forgoing providing any data representing the touch input to the application.

47. The method of claim 20, wherein a user configures whether the single location is a location, on the touch-sensitive surface, associated with a touchdown of the contact, or a location, on the touch-sensitive surface, associated with a liftoff of the contact.

48. The method of claim 20, wherein, in accordance with a determination that the set of one or more tap-assistance criteria have been met, the data representing the touch input at the single location on the touch-sensitive surface is provided to the application in response to detecting the liftoff of the contact.

49. The method of claim 20, wherein, in accordance with a determination that the set of one or more tap-assistance criteria have not been met, the data representing the touch input including the movement of the contact is provided to the application at a time when the contact has been detected on the touch-sensitive surface for longer than a predefined tap-timeout duration.

50. The method of claim 20, wherein, in accordance with the determination that the tap-assistance criteria have not been met, the data representing the touch input including the movement is provided to the application in response to detecting the touchdown of the contact.

51. The method of claim 20, wherein in response to a determination that the tap-assistance criteria have not been met, the application ignores the data representing the touch input including the movement of the contact.

52. The method of claim 20, wherein the tap-assistance setting is enabled in response to detecting a user request.

53. The method of claim 52, wherein enabling the tap-assistance setting causes an option for disabling the tap-assistance setting to be automatically added as an item in a settings menu.

54. The method of claim 53, further comprising:
while the tap-assistance setting is enabled, detecting a user input;
in response to detecting the user input, determining whether the settings menu includes at least two items, including the option for disabling the tap-assistance setting;
in accordance with a determination that the settings menu does not include at least two items, disabling the tap-assistance setting; and in accordance with a determination that the settings menu includes at least two items, displaying a user interface including a tap-assistance affordance associated with a hold duration setting.

* * * * *